US012570530B2

(12) United States Patent
Bepete et al.

(10) Patent No.: US 12,570,530 B2
(45) Date of Patent: Mar. 10, 2026

(54) METHODS FOR PREPARING ALKALI METAL-INTERCALATED HEXAGONAL BORON NITRIDE MATERIALS, RESULTANT PRODUCTS AND USES THEREOF

(71) Applicant: THE PENN STATE RESEARCH FOUNDATION, University Park, PA (US)

(72) Inventors: George Bepete, University Park, PA (US); Yanglin Zhu, University Park, PA (US); Yu Lei, University Park, PA (US); Pedro Rafael Trinidad Perez, University Park, PA (US); Nestor Perea Lopez, University Park, PA (US); Zhiqiang Mao, University Park, PA (US); Vincent Henry Crespi, University Park, PA (US); Mauricio Terrones, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/793,203

(22) Filed: Aug. 2, 2024

(65) Prior Publication Data

US 2024/0391785 A1      Nov. 28, 2024

Related U.S. Application Data

(63) Continuation of application No. PCT/US2022/082544, filed on Dec. 29, 2022.

(Continued)

(51) Int. Cl.
*C01B 21/064*      (2006.01)
*B01J 21/02*      (2006.01)

(Continued)

(52) U.S. Cl.
CPC ........... *C01B 21/0648* (2013.01); *B01J 21/02* (2013.01); *B01J 23/04* (2013.01); *B01J 35/33* (2024.01);

(Continued)

(58) Field of Classification Search
CPC ..................... C01B 21/064; C01B 21/064811
See application file for complete search history.

(56) References Cited

U.S. PATENT DOCUMENTS

2013/0323150 A1      12/2013   Jeon et al.

FOREIGN PATENT DOCUMENTS

| CN | 104402053 B | 5/2016 |
| CN | 107337185 A | 11/2017 |

(Continued)

OTHER PUBLICATIONS

Jedrzejczak-Silicka, Magdalena, et al. "Hexagonal boron nitride functionalized with Au nanoparticles—properties and potential biological applications." Nanomaterials 8.8 (2018): 605.*

(Continued)

*Primary Examiner* — Richard M Rump
(74) *Attorney, Agent, or Firm* — Buchanan Ingersoll & Rooney PC

(57)      ABSTRACT

Embodiments relate to the field of hexagonal boron nitride (hBN). In particular, to an alkali metal (A) intercalated hBN material. The A-intercalated hBN is chemically active, electrically conducting, and superconducting. The A-intercalated hBN is spontaneously soluble in aprotic organic solvents to form dispersions of exfoliated reduced 2-dimensional hBN sheets in organic solvents. The dispersions of exfoliated reduced 2-dimensional hBN materials in organic solvents materials can be reacted with metal salts to form 2-dimensional hBN-supported metal and/or metal oxide nanoparticle composites. The solutions/dispersions of (Continued)

Preparation method of the alkali metal-intercalated hBN materials

Step (1) : under an inert environment, heating and mixing of an hBN material with an alkali metal in a container to obtain a uniformly mixed hBN material-alkali metal composite material Step (2) : under an inert environment, letting the uniformly mixed hBN material-alkali metal composite material to stand on the heater and mixing occasionally for a certain time, to cause an alkali metal intercalation reaction until the composite material changes from white to another color or completely black alkali metal-intercalated hBN exfoliated reduced 2-dimensional hBN materials in organic solvents can be transferred to water or organic solvents to form stable aqueous and organic suspensions of 2-dimensional hBN.

10 Claims, 50 Drawing Sheets

Related U.S. Application Data

(60) Provisional application No. 63/267,561, filed on Feb. 4, 2022.

(51) Int. Cl.

| | | |
|---|---|---|
| *B01J 23/04* | (2006.01) |
| *B01J 35/33* | (2024.01) |
| *B01J 37/00* | (2006.01) |
| *B01J 37/04* | (2006.01) |
| *B01J 37/12* | (2006.01) |
| *C01D 13/00* | (2006.01) |

(52) U.S. Cl.
CPC ........... *B01J 37/0018* (2013.01); *B01J 37/04* (2013.01); *B01J 37/12* (2013.01); *C01D 13/00* (2013.01); *C01P 2002/20* (2013.01); *C01P 2002/60* (2013.01); *C01P 2004/64* (2013.01)

(56) References Cited

FOREIGN PATENT DOCUMENTS

| CN | 110835099 A | 2/2020 |
| CN | 111137866 A | 5/2020 |
| CN | 111320150 A | 6/2020 |

OTHER PUBLICATIONS

Lin, Liangxu, et al. "Fabrication and luminescence of monolayered boron nitride quantum dots." Small (Weinheim an der Bergstrasse, Germany) 10.1 (2013): 60-65.*

Mukhopadhyay, Titas Kumar, and Ayan Datta. "Deciphering the role of solvents in the liquid phase exfoliation of hexagonal boron nitride: A molecular dynamics simulation study." the Journal of Physical Chemistry C 121.1 (2017): 811-822.*

Chen, Jia, et al. "Enhancement of mechanical and wear resistance performance in hexagonal boron nitride-reinforced epoxy nanocomposites." Polymer International 66.5 (2017): 659-664.*

Li, Hao, Jingzhe Zhao, and Jianfeng Wang. "Total-conversion, high-concentration exfoliation of two-dimensional boron nitride by paste-based sand milling strategy for massively producing high-performance nanocomposites." Composites Science and Technology 201 (2021): 108545.*

Wang, Ning, et al. "A universal method for large-yield and high-concentration exfoliation of two-dimensional hexagonal boron nitride nanosheets." Materials Today 27 (2019): 33-42.*

Gonzalez Ortiz, Danae, et al. "Exfoliation of hexagonal boron nitride (h-BN) in liquide phase by ion intercalation." Nanomaterials 8.9 (2018): 716.*

Cao, Yang, et al. "Quality heterostructures from two-dimensional crystals unstable in air by their assembly in inert atmosphere." Nano letters 15.8 (2015): 4914-4921.*

International Search Report and Written Opinion for PCT/US2022/082544, filed Dec. 29, 2022 dated Apr. 25, 2023.

* cited by examiner

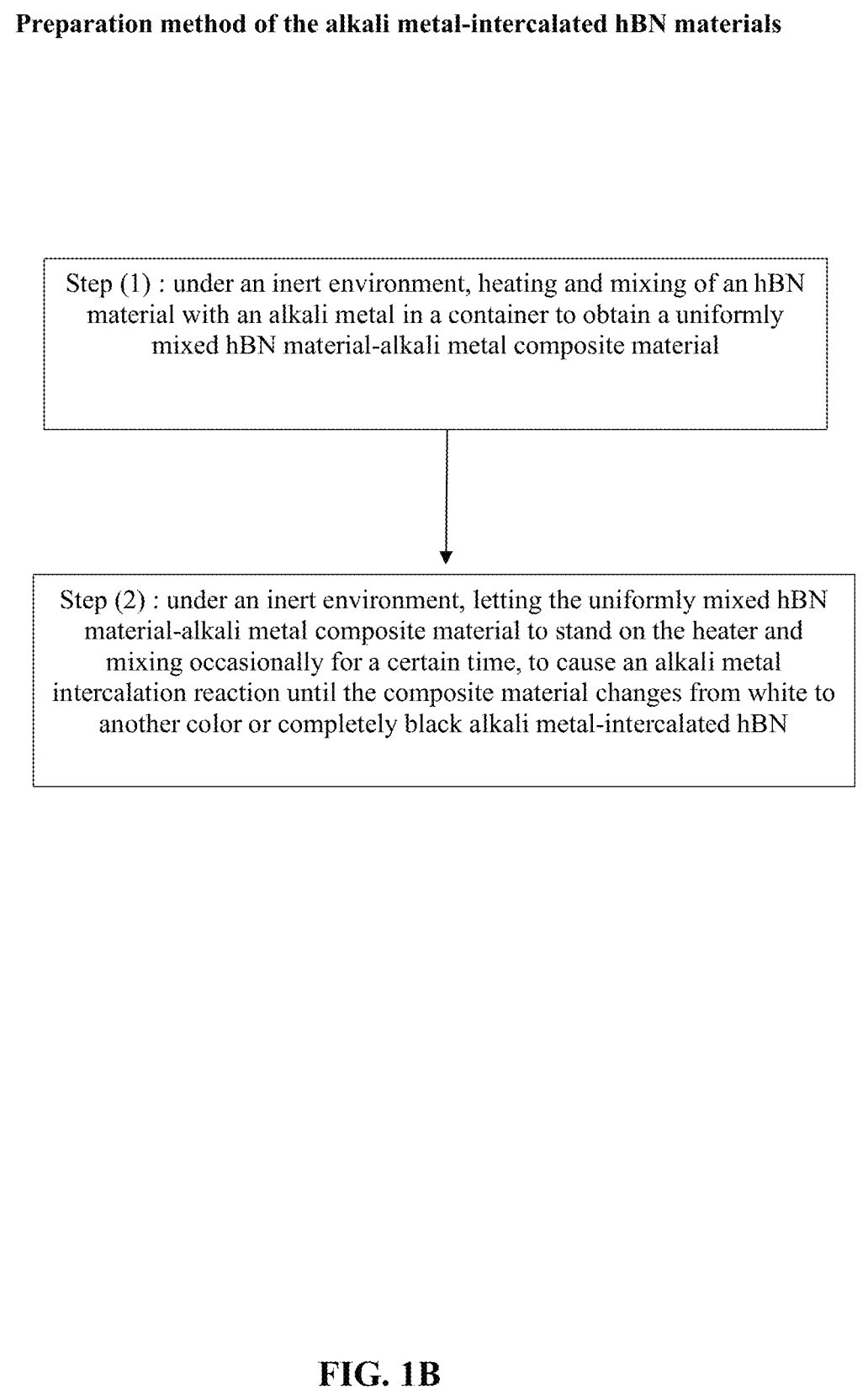

Preparation method of the alkali metal-intercalated hBN materials

Step (1) : under an inert environment, heating and mixing of an hBN material with an alkali metal in a container to obtain a uniformly mixed hBN material-alkali metal composite material Step (2) : under an inert environment, letting the uniformly mixed hBN material-alkali metal composite material to stand on the heater and mixing occasionally for a certain time, to cause an alkali metal intercalation reaction until the composite material changes from white to another color or completely black alkali metal-intercalated hBN

FIG. 1B

Conductivity of a K(hBN)$_x$ device

| Na(hBN)₄ | K(hBN)₄ | K(hBN)₃ | K(hBN)₂ | K(hBN)₄ |
|----------|---------|---------|---------|---------|
| White/Pink | Black | Black | Black | Black |

| K(hBN)₄ | K(hBN)₄ | Rb(hBN)₄ | Cs(hBN)₄ | hBN |
|---------|---------|----------|----------|-----|
| Dark grey | Grey | Black | Black | White |

FIG. 2C

1. Oxidation
2. Water
3. THF evaporation

4. R-I

5. PtCl₂

Reduced 2D hBN 2D hBN-supported Pt NPs hBN

K(hBN)$_X$

METHODS FOR PREPARING ALKALI METAL-INTERCALATED HEXAGONAL BORON NITRIDE MATERIALS, RESULTANT PRODUCTS AND USES THEREOF

CROSS-REFERENCE TO RELATED APPLICATIONS

This patent application is related to and claims the benefit of priority of U.S. Provisional Patent Application No. 63/267,561, filed on Feb. 4, 2022, the entire contents of which is incorporated herein by reference.

STATEMENT REGARDING FEDERALLY SPONSORED RESEARCH OR DEVELOPMENT

This invention was made with government support under Grant No. IIP2113864 awarded by the National Science Foundation. The Government has certain rights in the invention.

FIELD OF THE INVENTION

Embodiments relate to a method to produce an alkali metal-intercalated hexagonal boron nitride material, its subsequent use in producing fully exfoliated dispersions of 2-dimensional hexagonal boron nitride in organic and aqueous environments, functionalized 2-dimensional hexagonal boron nitride sheets, and 2-dimensional hexagonal boron nitride-supported metal and/or metal oxide nanoparticles. Additional embodiments relate to providing an alkali metal-intercalated hBN material, and the uses of the alkali metal-intercalated hexagonal boron nitride material as a semiconducting material, as an electrical material, as a superconducting material, as a magnetic material, as a reducing agent for liquid phase chemical reactions, as a precursor for exfoliated 2-dimensional hexagonal boron nitride, as a precursor for production of fully exfoliated 2-dimensional hexagonal boron nitride dispersions in organic and aqueous environments, as a precursor for exfoliated functionalized 2-dimensional hexagonal boron nitride, and as a precursor for 2-dimensional hexagonal boron nitride-supported metal and/or metal oxide nanoparticles. Some aspects relate to: (1) alkali metal intercalated-hexagonal boron nitride obtained, via a step of reacting the hexagonal boron nitride with an alkali metal, by embodiments of the disclosed process; (2) exfoliated 2-dimensional hexagonal boron nitride dispersions in organic solvents obtained, via a step of dispersing/dissolving the alkali metal intercalation compound, by embodiments of the disclosed process; (3) exfoliated 2-dimensional hexagonal boron nitride dispersions in water obtained, via a step of solvent transfer, by embodiments of the disclosed process; (4) functionalized 2-dimensional hexagonal boron nitride obtained, via a functionalization step, by embodiments of the disclosed process; and (5) 2-dimensional hexagonal boron nitride-supported metal and/or metal oxide nanoparticles or metallic and/or metallic oxide alloy nanoparticles obtained, via a metal salt reduction step, by embodiments of the disclosed process. The present invention finds applications in the industrial technical field, in particular in the materials, chemical production and electrical, electronic and magnetism technical fields.

BACKGROUND OF THE INVENTION

Hexagonal boron nitride (hBN) is a layered material comprising of planar hexagonal networks of B and N atoms.

It is of particular interest due to its chemical and thermal stability. Hexagonal boron nitride is isoelectronic with graphite; however, its electronic structure is quite different. Due to the chemical difference between B and N atoms, hBN is an insulator with a large bandgap. Graphite is a semimetal whereas hBN is a wide band gap (5.5 eV) insulator. Hexagonal boron nitride is an excellent lubricant, but unlike graphite, boron nitride does not readily oxidize in air.

Both graphite- and hBN-monolayer sheets are known to form nanotubes, fullerenes and similar structures. Several studies have shown that graphite can be intercalated by various atoms and molecules onto the 2-dimensional interlayer spaces between the graphene layers to form graphite intercalation compounds (GICs). Hundreds of redox-driven GIC with interesting structural, electrical and optical properties, have been synthesized and characterized by several experimental and theoretical tools. In addition, GICs can be readily exfoliated down to single-layer graphene (SLG), for example K-intercalated graphite (KCs) can be dissolved in aprotic solvents to yield thermodynamically stable graphenide (negatively charged graphene) dispersions. As graphenide is a very strong reducing agent, these solutions have been employed as a platform to graft transition-metal nanoparticles and transition-metal oxide nano-particles, generating materials for catalytic purposes without requiring any kind of stabilization or capping agents.

Hexagonal boron nitride intercalation refers to the process of forming a new material with heteroatoms or molecules residing between the original hBN layers without the loss of planarity of the hBN layers. Because of its structural similarity to graphite, there has been several theoretical calculations predicting host-guest redox-driven hBN intercalation compounds. To "intercalate" is to insert (something) between or among layers or components. Based on the analogy with GICs, the hybrid structure of hBN and atoms and molecular species that are intercalated into the interlayer spacing may also exhibit interesting electronic properties. Indeed, in some studies it has been predicted that alkali metal-intercalated hBN is a metallic material, in sharp contrast to the insulating character of the pristine hBN. Other studies have predicted that alkali metal-intercalated hBN e.g., Li-intercalated hBN are superconducting at temperatures much higher than that of related GICs.

A number of experimental studies have attempted to intercalate hBN with alkali metals (Li and K). However, the intercalation of hBN has proven to be considerably more difficult than graphite, and many contradictory findings have been reported in the literature. Most of these reports have reported minute quantities of the intercalated product and have not reported any fundamental properties of these new materials. Therefore, there is a real need to develop methods for preparing large scale quantities of alkali metal-intercalated hBN that overcome the above drawbacks, notably the intercalation extent and scalability of the product.

Like graphite which can be exfoliated to form graphene, hBN can be exfoliated down to few-layered and mono-layered insulating 2-dimensional hBN sheets using mechanical exfoliation. As a monolayer, 2-dimensional hBN is an insulating inorganic compound that is structurally similar to graphene. Hexagonal boron nitride is mostly available as white powders that can be exfoliated down to few layer 2-dimensional hBN by ultrasonication in water and organic solvents in the presence of surface-active agents. The best 2-dimensional hBN dispersions are a compromise between several factors such as thickness of the material dispersed (typically between 4 and 30 layers), lateral size (a few tens of nanometres) and concentration.

Another concern is the use of surfactants and high boiling point solvents such as N-methyl 2-pyrrolidone to assist liquid phase exfoliation (LPE), which can result in the trapping of these molecules between 2-dimensional hBN sheets, thus inhibiting strong interlayer coupling in thin films, membranes and coatings. A key step to achieve high performance solution processed 2-dimensional hBN based membranes and coatings is to start with 2-dimensional hBN crystals of uniform thickness and avoiding surface contaminations by reducing as much as possible the use of surfactants and high boiling point solvents.

Chemical intercalation followed by dissolution in suitable solvents, is currently the most efficient way to exfoliate layered crystals down to uniform ultrathin 2D layers. In this process, the intercalated atoms and molecules are removed from the galleries and dissolve in the solvent used to exfoliate the crystals. Advantageously, when alkali metal-intercalated layered materials are used as precursors, they become spontaneously soluble in polar aprotic solvents as dispersions of fully exfoliated negatively charged 2-dimensional sheets. To "exfoliate" is to cast off in flakes, scales or layers from a material. For example, K-intercalated graphite of the formular (KCs) can be dissolved in aprotic solvents to yield graphenide (negatively charged graphene layers) thermodynamically stable dispersions. Even though a number of studies have claimed to produce redox-driven intercalation compounds of hBN, their dispersion and/or exfoliation into 2-dimensional hBN sheets has not been demonstrated. Therefore, there remains a need for a method of efficiently exfoliating and dispersing 2-dimensional hBN that remedy the problems, drawbacks and obstacles known in the art, more particularly a method allowing to obtain suspensions of 2-dimensional hBN sheets that can readily be used for processing 2-dimensional hBN for a given application and improving accessibility to fully exfoliated 2-dimensional hBN in large quantity with high purity.

2-dimensional materials such as graphene, 2-dimensional hBN, 2-dimensional TMDs etc., are currently being utilized as catalyst materials or supports to various metal nanoparticle (NP) catalysts for different chemical reactions, including, electrochemical, photochemical as well as traditional heterogeneous reactions. The physical and chemical properties of metal and/or metal oxide nanoparticles depend on the metal choice and particle size. These particles can be broadly divided into two main groups: noble-metal (Au, Pt, Ag, etc.)-supported metal nanoparticles and non-noble-metal (Fe, Cu, Ni, Co, etc.)-based nanoparticles. Based on their physicochemical properties, metal nanoparticles (NPs) are used in various industrial fields such as electronics, optics, fluorescent materials, sensors, and mostly as catalysts. Metal nanoparticles (NPs) exhibit desired activities in various catalytic reactions. For example, metal nanoparticles with high surface area and more active sites promote faster reactions and increase product yield. However, the aggregation and sintering of metal NPs during a chemical reaction usually cause the loss of catalytic performance in practical reaction processes.

Supported metal NPs are essential materials and play an indispensable role in heterogeneous catalysis. In general, mesoporous materials such as carbon, $Al_2O_3$, $SiO_2$, and zeolite etc., have been used as supports for metal NP catalysts. Numerous studies have concentrated on enhancing the catalytic performance of metal NPs via a variety of nanoscale engineering strategies, including, but not limited to, tuning the particle size, morphology, and chemical composition, and supporting the metal NPs on exotic materials such as graphitic carbon-based supports. Metal NPs are especially decorated on graphitic carbon-based supports to mitigate their aggregation, to achieve long-term performance durability, develop new properties due to synergistic effects with the aid of the strong coupling between the NPs and the graphitic carbon supports.

2-dimensional materials have unique physical properties which endow them with the following advantages, high specific surface area, excellent mechanical properties, high thermal and electrical conductivities that make them suitable metal NP support materials. Additionally, the combination of 2-dimensional material with metal NP can produce enhanced catalytic properties because of synergistic effects from the interface of the 2-dimensional material and active metal NPs. Graphene and its analogues, particularly reduced graphene oxide and graphene nanosheets, have been extensively investigated and are well known for enhancing the catalytic activity, selectivity, and prevent catalyst leaching in different chemical reactions. Unfortunately, there are some major issues, including, but not limited to, the instability of graphene materials at high temperatures and operating potentials, leading to the decomposition of the catalyst support and as a result the agglomeration of metal NPs and poor catalytic activity.

Hexagonal boron nitride, unlike graphitic carbon and graphene, has superior chemical stability at high temperatures and high operating electrochemical potentials. Hexagonal boron nitride possesses exceptional chemical stability and antioxidation capability under harsh conditions. On this basis, 2-dimensional hBN is being considered as a potential multifunctional support for constructing robust 2-dimensional hBN-supported metal and/or metal oxide nanoparticle heterostructure composite catalyst materials, particularly for electrochemical reactions occurring at high potentials or other chemical reactions under high temperatures or other harsh chemical conditions. Furthermore, hBN contains large quantities of B and N atoms, which can act as unique chemical coordination sites and electronic interaction at the interfaces of the hBN supported metal NPs. However, hBN has not been widely investigated as a catalyst support, in part due to its wide band gap (low conductivity) and electrochemical inertness.

In order to generate the hBN-supported metal NPs, the hBN framework, the metal salts and the reducing agent are all mixed together. However, this method lacks control over metal NP size, particle density, and side reactions of the reducing agent often occurs with the surfactant or functional groups as well as trapping thereof in-between the hBN sheets. Consequently, the performances of the hBN-supported metal NPs heterostructures are drastically impacted.

Recently, the research group of Mauricio Terrones at Penn State University, has used cryomilling of hBN powders to create chemically reactive sites on the hBN, so called reductive hBN (R-hBN). The R-hBN was used to spontaneously reduce metal salts on the hBN surface to form hBN-supported metal NPs. The changes in the band structure in R-hBN allows the charge transfer between hBN and metal cations to happen so that the metal cations can be spontaneously reduced at the hBN surface. This method produces a clean and efficient catalyst. It is possible to improve the performance of this catalyst by forming a 2-dimensional hBN-supported metal NPs instead of bulk hBN-supported metal NPs.

High-quality graphene nanosheet-supported metal and metal oxide NP heterostructure composite materials were prepared using a reductive dissolution approach and shown to exhibit excellent activity for the oxygen reduction reaction (ORR), oxygen evolution reaction (OER) and hydrogen evolution reaction (HER). These graphene nanosheet-supported metal and metal oxide NP heterostructure composite materials were prepared using the following steps; (1) intercalation of graphitic nanomaterials with K metal to form a graphite intercalation compound KCs, (2) dissolution of the KCs in a polar aprotic organic solvent to form a solution of negatively charged graphene (graphenide solution), and (3) reduction of metal salts using the highly reducing graphenide solution to form graphene nanosheet-supported metal NPs. The method is useful for both non precious metal and precious metal NPs nanoparticles such as Fe, Ni, Mn, Cu and Co, and Pt, Pd, Re, and Ru respectively. This method is highly efficient and versatile, producing very small metal and metal-oxide NPs, in the range of a 1-10 nm, grafted directly onto the ultrathin graphene sheets. There is a real need to develop similar methods of using alkali metal-intercalated hBN materials as a platform for the synthesis of 2-dimensional hBN-supported metal and/or metal oxide nanoparticle, and or metallic and/or metallic oxide alloy nanoparticle composites that overcome the drawbacks known in the art, notably in terms of metal/metal oxide nanoparticle size, metal/metal oxide nanoparticle loading and overall performance of the resulting heterostructured composite.

If alkali metal-intercalated hBN materials can be produced in large enough quantities, their physical properties, including, electrical, semiconducting, magnetic, and superconducting properties can be measured, and they can find use in critically needed applications. The dissolution of the alkali metal-intercalated hBN will be useful in the production of dispersions of fully exfoliated reduced 2-dimensional hBN materials, functionalization of 2-dimensional hBN materials, and production of 2-dimensional hBN-supported metal and/or metal oxide nanoparticle, or metallic and/or metallic oxide alloy nanoparticle composites.

A method to produce an alkali metal-intercalated hBN material, its dissolution/dispersion to produce exfoliated 2-dimensional hBN dispersions in organic and aqueous environments, and 2-dimensional hBN-supported metal and/or metal oxide nanoparticles, and metallic and/or metallic oxide alloy nanoparticles is urgently required.

SUMMARY OF THE INVENTION

As will be explained herein, embodiments disclosed herein provide for an alkali metal-intercalated hBN material for use in different applications. The donor type alkali metal species intercalated between the hBN layers may donate electrons to the adjacent hBN layers, causing their fermi level to shift and as a result cause the physical and chemical properties to change. The insertion of foreign species may weaken/break the hBN interlayer bonds, making hBN readily exfoliable down to monolayers without the use of ultrasonication or high-shear mixing, which often introduces structural defects on the 2-dimensional hBN lattice. These objectives can be achieved by reacting hBN with a molten alkali metal to form an alkali metal-intercalated hBN material. The alkali metal-intercalated hBN is dispersed in polar aprotic organic solvents to form reduced/negatively charged 2-dimensional hBN. The negatively charged 2-dimensional hBN solutions/dispersions in aprotic organic solvents can be mixed with water followed by evaporating the aprotic organic solvent to remain with surfactant free aqueous dispersion of 2-dimensional hBN. The negatively charged 2-dimensional hBN solutions/dispersions in aprotic organic solvents can be mixed other organic solvents to form dispersions of 2-dimensional hBN in organic solvents. The negatively charged 2-dimensional hBN solutions/dispersions in aprotic organic solvents can be reacted with reactive alkyl halides to form alkyl functionalized 2-dimensional hBN. Transition metal salts or complexes can be reacted with the dispersions of exfoliated negatively charged 2-dimensional hBN to form metal nanoparticles and/or metal oxide nanoparticles, or metallic and/or metallic oxide alloy nanoparticles anchored on the 2-dimensional hBN sheets.

Embodiments disclosed herein relate to the field of hexagonal boron nitride (hBN), and in particular to an alkali metal (A) intercalated hBN material. The A-intercalated hBN is chemically active, electrically conducting, and superconducting. The A-intercalated hBN is spontaneously soluble in aprotic organic solvents to form dispersions of exfoliated reduced 2-dimensional hBN sheets in organic solvents. The dispersions of exfoliated reduced 2-dimensional hBN materials in organic solvents materials can be reacted with metal salts to form 2-dimensional hBN-supported metal and/or metal oxide nanoparticle composites. The solutions/dispersions of exfoliated reduced 2-dimensional hBN materials in organic solvents can be transferred to water or organic solvents to form stable aqueous and organic suspensions of 2-dimensional hBN.

In view of the deficiencies in the art, an object of the present invention aims at meeting such a need by providing methods for preparing alkali metal-intercalated hBN materials. An embodiment of the method can involve the following steps:

In an inert environment, an hBN powder and an alkali metal are heated and mixed in a glass vial to obtain a uniformly mixed alkali metal-hBN composite material.

In an inert environment, the uniformly mixed alkali metal-hBN composite material is left to stand while heating and mixing occasionally for a certain time, to cause an alkali metal intercalation reaction until the composite material changes from white to a dark color.

The alkali metal can be any alkali metal allowing the implementation of the present invention. It can be chosen for example in the group comprising lithium, sodium, potassium, rubidium and cesium. More particularly, the alkali metal is sodium, potassium, rubidium, or cesium. Preferably, the alkali metal is potassium.

The hBN material may be hBN powders, hBN flakes, hBN films, or hBN slabs.

Further, the stoichiometric ratio of the hBN material to the alkali metal is any value between 1 and 120.

The inert environment is an argon atmosphere and/or a nitrogen atmosphere and is allowed to stand over a hotplate at a temperature above the melting point of the alkali metal until the hBN changes color from white to another color such as pink, dark gray or completely black, generally 5 hours or more.

The mixing can be done using a glass or an anti-magnetic stainless-steel stirrer.

The obtained alkali metal-intercalated hBN material has the following features:

The alkali metal intercalation into hBN layers leads to carrier injection into the nearly-free-electron states of hBN.

The alkali metal intercalation into hBN layers is capable of reducing the bandgap of hBN from an insulator (5 to 6 eV) to a semiconducting alkali metal-intercalated hBN (0.2 to 4.99 eV), and to metallic alkali metal-intercalated hBN (0 eV).

The alkali metal intercalated hBN compound is electrically conductive and shows a superconducting transition at temperatures above 0 K.

Embodiments can also relate to an alkali metal-intercalated hBN material obtained by any of the methods disclosed herein. For instance, an object of the present invention can be to provide an alkali metal-intercalated hBN material obtained by an embodiment of the production method. The alkali metal-intercalated hBN can be made up of 1 to 2 atomic layers of alkali metal intercalated in between hBN layers.

Beneficial effects of the invention can include: The preparation of alkali metal-intercalated hBN is done at low temperatures. It is done at normal pressure and is suitable for the preparation of alkali metal-intercalated hBN materials on a large scale. The preparation method of the present invention abandons the conventional ultra-low vacuum and the high temperature preparation method used for other intercalation processes. The preparation method is solvent free, fast, low in energy consumption and small in pollution, and is suitable for industrial large-scale production. The alkali metal-intercalated hBN is a precursor for the preparation of electronically charged and neutral organic suspensions of fully exfoliated 2-dimensional hBN, suspensions of 2-dimensional hBN in water, functionalized 2-dimensional hBN, and 2-dimensional hBN-supported metal and/or metal oxide nanoparticle heterostructure composites.

Another object of the present invention aims at meeting such need by providing a method for preparing organic suspensions of fully exfoliated 2-dimensional hBN comprising the following steps:

In an inert environment, an hBN material and an alkali metal are heated in a glass container or any other container made from a suitable material to obtain an alkali metal-intercalated hBN material.

In an inert environment, exposing the alkali metal-intercalated hBN material to an aprotic organic solvent (A) or a mixture (A') of aprotic organic solvents to lead to a dispersion of reduced/negatively charged 2-dimensional hBN; and Continued stirring of the dispersion of the reduced 2-dimensional hBN sheets in a polar aprotic solvent to lead to a suspension of slightly reduced and fully exfoliated 2-dimensional hBN materials.

The alkali metal can be any alkali metal allowing the implementation of the present invention. It can be chosen for example in the group comprising lithium, sodium, potassium, rubidium, and cesium. More particularly, the alkali metal is sodium, potassium, rubidium, or cesium. Preferably, the alkali metal is potassium.

The hBN material may be hBN powders or hBN flakes.

The aprotic organic solvent used in the mixing and exfoliation step can have a dielectric constant between 25 and 200.

The mixing is conducted in a glass or other suitable container at a temperature between −22 to 202° C.

The mixing is achieved by mechanical stirring for a time longer than 0 min.

The obtained organic suspensions of fully exfoliated 2-dimensional hBN are negatively charged or slightly negatively charged and are stable indefinitely as long as they are kept under an inert environment but will reaggregate when air exposed.

The negatively charged suspensions of 2-dimensional hBN contains 2-dimensional hBN sheets with a thickness of 1-5 layers and a lateral dimension of 0.01-5 μm.

The method can also involve preparing suspensions of fully exfoliated 2-dimensional hBN materials obtained by methods disclosed herein.

Another object of the present invention aims at meeting such a need by providing a method for preparing air stable suspensions of fully exfoliated 2-dimensional hBN obtained by the production method. As such, there is provided a method for preparing air stable aqueous or organic dispersions of fully exfoliated 2-dimensional hBN materials, comprising of the following additional step:

Mixing the slightly negatively charged organic suspension of 2-dimensional hBN with a suitable amount of water, ionic aqueous solution, organic solvent (B), or mixture (B') of organic solvents, or mixture of (B) or (B') with water or an aqueous ionic solution.

Solvent (A) or solvent mixture (A') is fully or partially water miscible or fully or partially miscible with solvent (B) or solvent mixture (B'); thereby leading to an air-metastable aqueous or organic suspension of 2-dimensional hBN material.

The aprotic solvent will be fully miscible with water include, but are not limited to tetrahydrofuran (THF), acetone, acetonitrile, dimethoxyethane (DME), sulfolane, dimethyl sulfoxide (DMSO), dimethylformamide (DMF), N-methylpyrrolidone (NMP), N-methylformamide, acetone, acetonitrile, dichloromethane, dimethylformamide (DMF), dimethylpropyleneurea, ethyl acetate, or hexamethylphosphoric triamide.

The organic and aqueous suspensions of 2-dimensional hBN contains 2-dimensional hBN sheets with a thickness of 1-5 layers and a lateral dimension of 0.01-5 μm.

The organic and aqueous suspensions of fully exfoliated 2-dimensional hBN materials obtained by the method of the present invention are prepared.

Beneficial effects of the invention can include: An alkali metal-intercalated hBN material is used as the precursor, and the preparation of suspensions of fully exfoliated 2-dimensional hBN sheets is done at room temperature and mild stirring. It is suitable for preparation of 2-dimensional hBN sheets on a large scale. The preparation method of the present invention abandons the conventional high-energy preparation method such as ultrasonication or mechanical shearing. The suspensions of 2-dimensional hBN obtained contain predominantly single layer 2-dimensional hBN sheets and few layer 2-dimensional hBN sheets. The suspensions are surfactant free and in low boiling point solvents.

Another object of the present invention aims at meeting such a need by providing a method for preparing 2-dimensional hBN-supported metal and/or metal oxide nanoparticle, or metallic and/or metallic oxide alloy nanoparticle composite heterostructures comprising the following steps:

Step (a): In an inert environment, an hBN material and an alkali metal are reacted in a glass container to obtain an alkali metal-intercalated hBN material.

Step (b): In an inert environment, dissolving the alkali metal-intercalated hBN material in an aprotic organic solvent (A) or a mixture (A') of aprotic organic solvents in a glass container, preferably in the absence of sonication; thereby leading to an organic dispersion of reduced 2-dimensional hBN sheets.

Step (c): In an inert environment, reacting the organic dispersion of reduced 2-dimensional hBN sheets obtained in step (a) with a suitable amount of at least one metal salt and/or at least one metal complex or a mixture of at least two metal salts and/or metal complexes in a glass container; thereby leading to a suspension of 2-dimensional hBN-supported metal nanoparticles; and Optionally oxidizing the metal nanoparticles present on the 2-dimensional hBN support by heating in air.

The process is free of reducing agents other than the reduced 2-dimensional hBN sheets formed in step (a).

The lateral size of the 2-dimensional hBN sheets have lateral dimensions of 0.01-5 m; and the thickness of the 2-dimensional hBN sheets is typically between 1 to 30 hBN layers.

The aprotic organic solvent used in the mixing step (b) and (c) has a dielectric constant between 25 and 200.

The metal salt or metal complex used in step (c) may be derived from any suitable metal on the periodic table. For example, the metal may be selected from lanthanides, actinides, transition metals, and/or post-transition metals.

Step (c) may be carried out by addition, preferably dropwise addition, of a solution of at least one metal salt and/or at least one metal complex or a mixture of at least two metal salts and/or metal complexes in an aprotic organic solvent, preferably solvent (A) or mixture (A') used above, to the organic solution of reduced 2-dimensional hBN obtained in step (b).

The mixing is conducted in a glass container at a temperature between −22 to 202° C.

The mixing for both (a), (b), and (c) is achieved by mechanical stirring for a time longer than 0 min.

The 2-dimensional hBN-supported metal and/or metal oxide nanoparticle or metallic and/or metallic oxide alloy nanoparticle composites obtained by the method of the present invention are prepared.

Beneficial effects of the invention can include: A reduced 2-dimensional hBN solution/dispersion in an aprotic organic solvent prepared by dissolving an alkali metal-intercalated hBN material in an aprotic organic solvent is used as the precursor to prepare 2-dimensional hBN-supported metal and/or metal oxide nanoparticle composites. No additional reducing agent is required as the reduced 2-dimensional hBN solution/dispersion is the reducing agent. The preparation of 2-dimensional hBN-supported metal and/or metal oxide nanoparticle composites is done at room temperature and mild stirring. It is suitable for preparation of 2-dimensional hBN-supported metal and/or metal oxide nanoparticle composites on a large scale. The 2-dimensional hBN-supported metal and/or metal oxide nanoparticle composites can be used as catalytic material, in electrocatalysis, as catalyst for gas-phase chemical reactions, as slurry catalyst for liquid phase chemical reactions, for water purification and wastewater treatment, in the treatment of cancerous tumors, and/or in magnetic resonance imagery (MRI). The present invention finds applications in the industrial technical field, in particular in the material, chemical and pharmaceutical technical fields.

An exemplary embodiment relates to a method for preparing an alkali metal-intercalated hexagonal boron nitride (hBN) material of the form $A(hBN)_x$. The method involves the following steps: (i) under an inert environment, mixing an hBN powder and an alkali metal to form a mixture while simultaneously heating the mixture to obtain a uniformly mixed white/grey colored alkali metal-hBN composite material; and (ii) under an inert environment, continuing to mix the mixture and allowing the uniformly mixed alkali metal-hBN composite material to heat for a period of time such that a metal intercalation reaction occurs and at least a portion of the uniformly mixed alkali metal-hBN composite material changes from the white/grey color to form a pink, brown, blue, or black alkali metal-intercalated hBN material.

In some embodiments, step (ii) is performed until an amount of the uniformly mixed alkali metal-hBN composite material changes from a white/grey color.

In some embodiments, step (ii) is performed until the uniformly mixed alkali metal-hBN composite material changes from a white/grey color to a different color, the different color including pink, brown, blue, or black.

In some embodiments, heating the mixture in step (i) involves heating the mixture at a temperature above the melting point of the alkali metal and/or above the melting point of the alkali metal alloy.

In some embodiments, the period of time is greater than 0 minutes.

In some embodiments, the hBN material is any one or combination of hBN flake, hBN powder, or hBN crystal.

In some embodiments, the hBN material is in a form comprising any one or combination of hBN flake, hBN powder, or hBN crystal having a size that is at least 10 nm.

In some embodiments, the alkali metal is any one or combination of lithium, sodium, potassium, cesium, or rubidium.

In some embodiments, $x>1$.

In some embodiments, the bandgap of the insulating hBN is from 5 to 6 eV, the bandgap of semiconducting alkali metal-intercalated hBN powder is from (0.1 to 4.99 eV), and the bandgap of metallic alkali metal-intercalated hBN powder is 0 eV.

In some embodiments, the alkali metal is selected such that: the alkali metal-hBN intercalated material forms a superconductor with transition temperatures (Tc) above 0 K; the alkali metal-hBN intercalated material exhibits ferromagnetic properties; or the alkali metal-hBN intercalated material is spontaneously exfoliable and dispersible in aprotic organic solvent (A) or a mixture (A') of aprotic organic solvents to yield suspensions of exfoliated charged 2D hBN in an aprotic organic solvent (A) or mixture (A') of aprotic organic solvents.

An exemplary embodiment relates to a method for preparing a dispersion of exfoliated reduced/negatively charged 2-dimensional hexagonal boron nitride (hBN) sheet in a polar aprotic organic solvent. The method involves the following steps: (i) providing an alkali metal-intercalated hBN, the alkali metal-intercalated hBN comprising hBN with an alkali metal intercalated between the hBN layers; (ii) adding an organic polar aprotic solvent (A) or a mixture (A') of polar aprotic solvents under anhydrous inert atmosphere to the alkali metal-intercalated hBN; and (iii) agitating the mixture formed by (i) and (ii) until a dispersion of reduced/negatively charged exfoliated 2-dimensional hBN sheet is formed.

In some embodiments, agitation occurs for an amount of time.

In some embodiments, agitation occurs longer than 0 minutes.

In some embodiments, the organic aprotic solvent is tetrahydrofuran (THF).

In some embodiments, the alkali metal is potassium.

In some embodiments, agitation involves mechanical stirring, magnetic stirring, and/or agitation without stirring.

In some embodiments, the method further involves centrifugation.

In some embodiments, step (iii) is performed in the absence of sonication.

In some embodiments, the organic aprotic solvent (A) has a dielectric constant between 25 and 200.

In some embodiments, the method involves depositing the dispersion on a substrate.

In some embodiments, the method involves depositing the dispersion on a substrate via stamping, spin coating, printing, spray coating, or electroplating under an inert atmosphere to form a film, a membrane, or a coating.

An exemplary embodiment relates to a method for preparing an air stable dispersion of exfoliated 2-dimensional hexagonal boron nitride (hBN) sheet in water. The method involves the following steps: (i) providing an alkali metal-intercalated hBN, the alkali metal-intercalated hBN comprising hBN with an alkali metal intercalated between the hBN layers; and (ii) adding an organic polar aprotic solvent (A) or a mixture (A') of polar aprotic solvents under anhydrous inert atmosphere to the alkali metal-intercalated hBN; (iii) agitating the mixture formed by (i) and (ii) until a dispersion of reduced/negatively charged exfoliated 2-dimensional hBN sheet is formed; (iv) mixing the dispersion in organic polar aprotic solvent (A) or a mixture (A') organic polar aprotic with water, or ionic aqueous solution; and (v) evaporating the organic polar aprotic solvent (A) or the mixture (A') of polar aprotic solvents to generate an air stable dispersion exfoliated 2-dimensional hBN sheet in water.

In some embodiments, the organic polar aprotic solvent (A) or the mixture (A') of organic polar aprotic solvents of step (ii) and/or step (iv) is fully or partially water miscible.

In some embodiments, the method involves depositing suspensions on a substrate.

In some embodiments, the method involves depositing suspensions on a substrate via stamping, spin coating, printing, electroplating, or spray coating in air to form a film, a membrane, or a coating.

An exemplary embodiment involves a method for preparing air stable dispersions of exfoliated 2-dimensional hexagonal boron nitride (hBN) sheet in organic solvents The method involves the following steps: (i) providing an alkali metal-intercalated hBN, the alkali metal-intercalated hBN comprising hBN with an alkali metal intercalated between the hBN layers; (ii) adding an organic polar aprotic solvent (A) or a mixture (A') of polar aprotic solvents under anhydrous inert atmosphere to the alkali metal-intercalated hBN; and (iii) agitating the mixture formed by (i) and (ii) under anhydrous inert atmosphere until a dispersion of reduced/negatively charged exfoliated 2-dimensional hBN sheet is formed.

In some embodiments, the method involves (iv) mixing the dispersion in organic polar aprotic solvent (A) or a mixture (A') organic polar aprotic with organic solvent (B), or a mixture (B') of organic solvents.

In some embodiments, the method-involves (vi) optionally evaporating the organic polar aprotic solvent (A) or the mixture (A') of polar aprotic solvents to generate an air stable dispersion exfoliated 2-dimensional hBN sheet in organic solvents.

In some embodiments, the organic polar aprotic solvent (A) or the mixture (A') of organic polar aprotic solvents is fully or partially miscible with organic solvent (B), or a mixture (B') of organic solvents.

In some embodiments, the method involves depositing suspensions on a substrate.

In some embodiments, the method involves depositing suspensions on a substrate via stamping, spin coating, printing, electroplating, or spray coating in air to form a film, a membrane, or a coating.

An exemplary embodiment relates to a method for preparing 2-dimensional hexagonal boron nitride (hBN)-supported metal nanoparticles composites. The method involves the following steps: (i) providing an alkali metal-intercalated hBN, the alkali metal-intercalated hBN comprising hBN with an alkali metal intercalated between the hBN layers; (ii) adding an organic polar aprotic solvent (A) or a mixture (A') of polar aprotic solvents under anhydrous inert atmosphere to the alkali metal-intercalated hBN; (iii) agitating the mixture formed by (i) and (ii) under anhydrous inert atmosphere until a suspension of reduced exfoliated 2-dimensional hBN is formed; (iv) adding a solution of a metal salt and/or metal complex in an organic polar aprotic solvent (A) or a mixture (A') of polar aprotic solvents under anhydrous inert atmosphere to the suspension; and (v) agitating the mixture formed by step (iv) to form a 2-dimensional hBN-supported metal or metal oxide nanoparticle heterostructure composite.

In some embodiments, metal atoms and/or metal compounds of the metal salt and/or metal complex comprise any one or combination of lanthanides, actinides, transition metals, or post-transition metals.

In some embodiments, the 2-dimensional hBN-supported metal nanoparticle composite comprises nanoparticles with an average size ranging from 0.5 nm to 10 nm.

An exemplary embodiment relates to a method of performing a catalytic reaction. The method involves using the 2-dimensional hBN-supported metal or metal oxide nanoparticle composite as a catalyst in a catalytic reaction involving a hydrogen evolution reaction and/or an oxygen reduction reaction.

An exemplary embodiment relates to a method of performing a catalytic reaction. The method involves using the 2-dimensional hBN-supported metal or metal oxide nanoparticle composite as a catalyst in a catalytic reaction involving catalytic reactions above 25° C.

In some embodiments, the 2-dimensional hBN-supported metal nanoparticle composite comprises nanoparticles, and the method further involves: (vi) oxidizing the metal nanoparticles by annealing in air to yield 2-dimensional hBN-supported metal oxide nanoparticles.

In some embodiments, the 2-dimensional hBN-supported metal oxide nanoparticles comprise iron oxide, nickel oxide, and/or cobalt oxide.

In some embodiments, the 2-dimensional hBN-supported metal oxide nanoparticle composite exhibits magnetic properties.

In some embodiments, dispersion of exfoliated reduced/negatively charged 2-dimensional hexagonal boron nitride (hBN) sheet in a polar aprotic organic solvent are reacted with reactive organic molecules to form 2D hBN flakes functionalized with organic chain functional groups.

In some embodiments, the functional groups comprise of an organic group and hydrogen.

In some embodiments, the method involves: mixing a suspension of fully exfoliated reduced 2-dimensional hBN with a polymer to form a polymer nanocomposite; mixing a suspension of fully exfoliated reduced 2-dimensional hBN with a ceramic to form a ceramic nanocomposite; and/or mixing a suspension of fully exfoliated reduced 2-dimensional hBN with a metal to form a metal nanocomposite.

In some embodiments, the method involves: mixing the air stable dispersion exfoliated 2-dimensional hBN sheets with a polymer to form a polymer nanocomposite; mixing the air stable dispersion exfoliated 2-dimensional hBN sheet with a ceramic to form a ceramic nanocomposite; and/or mixing the air stable dispersion exfoliated 2-dimensional hBN sheet with a metal to form a metal nanocomposite.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which:

FIG. 1B is a block diagram of an exemplary process for preparation of an embodiment of the alkali metal-intercalated hBN material.

FIG. 2C is a table presenting colors of the alkali metal-intercalated hBN materials made using different amounts of K metal and other alkali metals relative to the hBN.

FIG. 10E is XRD of 2-dimensional hBN-supported platinum metal nanoparticle heterostructure showing peaks 26.6°, 39.9°, 45.5° and 67.5° that can be attributed to the (002) pattern of the hBN material and the (111), (200) and (220) patterns of platinum nanoparticles.

FIG. 11A is STEM of 2-dimensional hBN-supported platinum nanoparticle composites. FIG. 11B is HR-STEM of 2-dimensional hBN-supported platinum NP composites. FIG. 11C is HR-STEM/EDX element map of 2-dimensional hBN-supported platinum NP composite, the nitrogen edge is depicted in blue, whereas the platinum edge is depicted in pink. The spatial distribution of the platinum NPs on the hBN is evident. FIG. 11D is TEM of 2-dimensional hBN-supported platinum nanoparticle heterostructures. FIG. 11E is TEM of 2-dimensional hBN-supported platinum nanoparticle heterostructures. Inset: particle size distribution of platinum NPs of measured from NPs in the same figure. FIG. 11F is HRTEM of 2-dimensional hBN-supported platinum NPs.

FIG. 13A shows a schematic illustration of potassium intercalation in hBN, FIG. 13B shows photographs of hBN powder before and after K intercalation. The left vial contains a sample of white pristine hBN powder while the right vial contains black K-intercalated hBN powder. FIG. 13C shows X-ray diffraction of pristine hBN powder compared with K-intercalated hBN and Na-intercalated hBN powders. FIGS. 13D and 13E show high-resolution XPS spectra from the (FIG. 13D) N1s and the (FIG. 13E) B1s regions of pristine hBN compared with K-intercalated hBN powder. FIG. 13F shows formation energies for mono- and bilayers of K for $\sqrt{3}\times\sqrt{3}$ or 2×2 supercells with vdW-DF and DFT-D3 corrections. Full (hollow) markers represent energies after (before) adjustment for pillaring. FIG. 13G shows band structure of potassium monolayer in $\sqrt{3}\times\sqrt{3}$ supercell using DFT-D3. Density of states is shown on the side.

DETAILED DESCRIPTION OF THE INVENTION

Figure 1A:
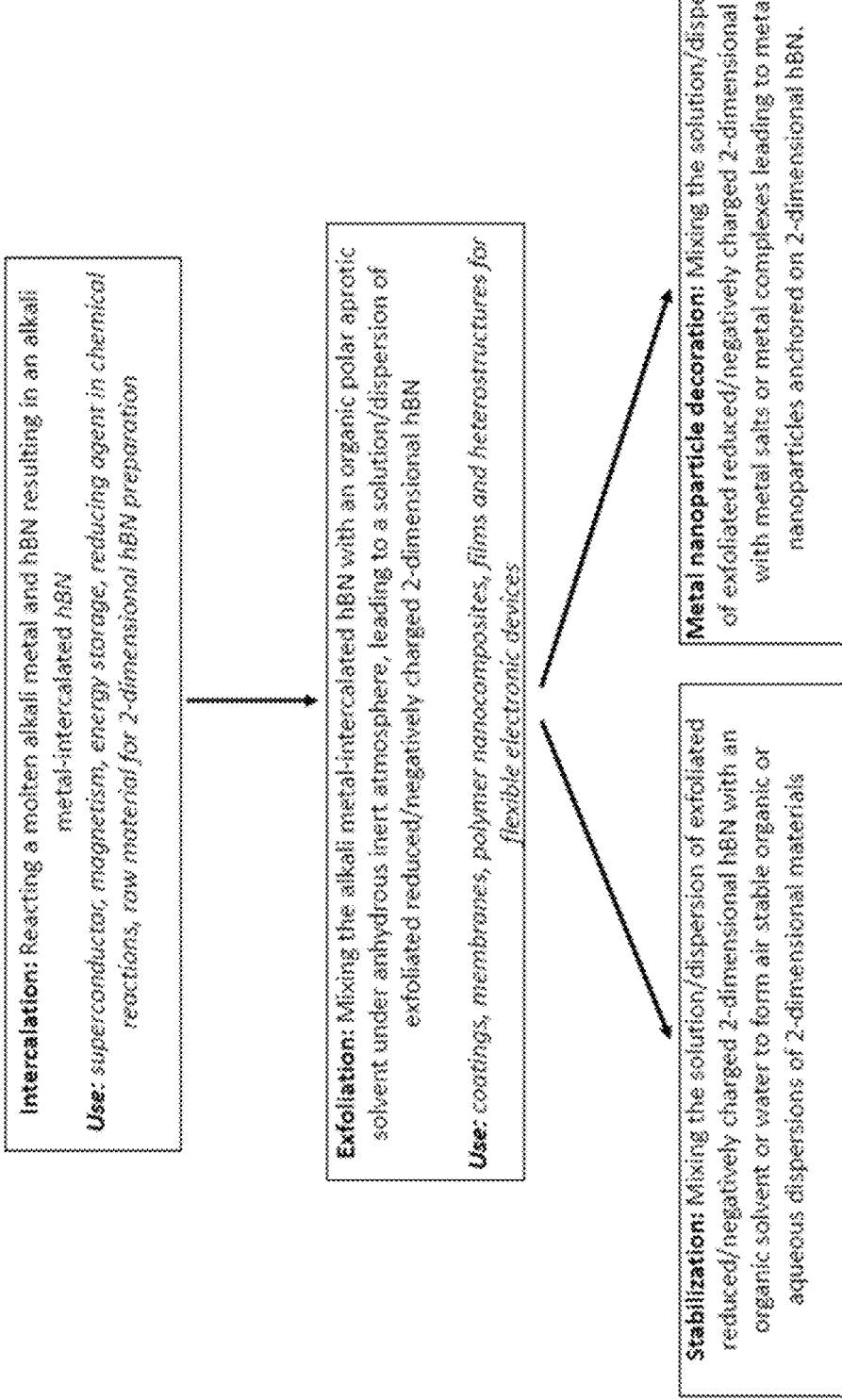
FIG. 1A is a scheme showing the different chemical processes leading to the preparation of alkali metal-intercalated hBN, dispersions of exfoliated reduced/negatively charged 2-dimensional hBN, air stable organic or aqueous dispersions of 2-dimensional hBN, and 2-dimensional hBN-supported metal nanoparticles.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

In an exemplary embodiment, a method for preparing an alkali metal-intercalated hexagonal boron nitride (hBN) material of the form A(hBN)$_x$ can involve under an inert environment, mixing an hBN powder and an alkali metal to form a mixture in a glass or other suitable container while simultaneously heating the mixture to obtain a uniformly mixed alkali metal-hBN composite material. This can be step (i). x in A(hBN)$_x$ can be greater than 1. The container can be a glass or other suitable material container. The uniformly mixed alkali metal-hBN composite material can exhibit a white/grey color. The method can involve, under an inert environment, continuing to mix the mixture and allowing the uniformly mixed alkali metal-hBN composite material to heat for a predetermined period of time, (from 1-minute up to 24 hours), such that a metal intercalation reaction proceeds and at least a portion of the uniformly mixed alkali metal-hBN composite material changes from a white/grey color. The change in color can be from white/ grey to pink, brown, blue, black, etc. This can be step (ii). Step (ii) can be performed until an amount of the uniformly mixed alkali metal-hBN composite material changes from a white/grey color. This amount of uniformly mixed alkali metal-hBN composite material can be the entire amount of uniformly mixed alkali metal-hBN composite material.

Heating the mixture in step (i) can involve heating the mixture at a temperature above the melting point of the alkali metal (e.g., lithium, sodium, potassium, cesium, or rubidium) and/or above the melting point of the alkali metal alloy.

The predetermined period of time resulting in a metal intercalation reaction that changes the uniformly mixed alkali metal-hBN composite material from a white/grey color can be greater than 0 minutes up to 24 hours.

The disclosed method can make use of hBN flakes, hBN powder, hBN crystal or any one of their combinations to produce an alkali metal-hBN composite material.

The hBN materials used in the disclosed method are insulating materials. The insulating hBN can have a bandgap from 5 to 6 eV.

The disclosed method can produce an alkali metal-intercalated hBN in the form of a semiconducting alkali metal-intercalated hBN material. The semiconducting alkali metal-intercalated hBN material can have a bandgap from 0.1 to 4.99 eV. The band gap can be tuned between 0.1 eV and 4.99 eV by varying the reacted alkali metal to hBN ratio.

The disclosed method can produce an alkali metal-intercalated hBN in the form of metallic alkali metal-intercalated hBN material by reacting predetermined amounts of alkali metal and hBN materials. The metallic alkali metal-intercalated hBN powder can have a bandgap of 0 eV.

In some embodiments, the alkali metal is selected from the metals in group 1 of the periodic table such that the alkali metal-intercalated hBN material forms a superconductor with transition temperatures (Tc) above 0 K.

In some embodiments, the alkali metal is selected from the metals in group 1 of the periodic table such that the alkali metal-hBN composite material exhibits interesting magnetic properties, including but not limited to ferromagnetism.

In some embodiments, the alkali metal is selected from the metals in group 1 of the periodic table such that the alkali metal-hBN composite material is spontaneously exfoliable and dispersible in aprotic organic solvent (A) or a mixture (A') of aprotic organic solvents to yield suspensions of exfoliated charged 2-dimensional hBN in an aprotic organic solvent (A) or mixture (A') of aprotic organic solvents.

Some embodiments can involve mixing (adding together fully exfoliated reduced 2-dimensional hBN and a polymer) a suspension of fully exfoliated reduced 2-dimensional hBN with a polymer to form a polymer nanocomposite.

Some embodiments can involve mixing a suspension of fully exfoliated reduced 2-dimensional hBN with a ceramic to form a ceramic nanocomposite.

Some embodiments can involve mixing a suspension of fully exfoliated reduced 2-dimensional hBN with a metal to form a metal nanocomposite.

Another exemplary embodiment includes a method for preparing a dispersion of exfoliated reduced/negatively charged 2-dimensional hexagonal boron nitride (hBN) sheet in a polar aprotic organic solvent. The method can involve providing an alkali metal-intercalated hBN (e.g., hBN with an alkali metal intercalated between the hBN layers). The alkali metal can be potassium. This can be step (i). The method can involve adding 20 mL of an organic polar aprotic solvent (A) or a mixture (A') of polar aprotic solvents under anhydrous inert atmosphere to 100 mg of the alkali metal-intercalated hBN. This can be step (ii). The organic aprotic solvent can be tetrahydrofuran (THF). The organic aprotic solvent (A) can have a dielectric constant between 25 and 200. The method can involve agitating the mixture formed by steps (i) and (ii) until a dispersion of reduced/negatively charged exfoliated 2-dimensional hBN sheets is formed. This can be step (iii). The agitation can occur for a predetermined amount of time, which can include agitation longer than 0 minutes up to 72 hours. Agitation can involve mechanical stirring, magnetic stirring, and/or agitation without stirring. In some embodiments, the agitation is performed in the absence of sonication. Some embodiments of the method further involves centrifugation to remove insoluble material. The use of sonication causes the introduction of defects in the 2-dimensional hBN plane and breaks the nanosheets into smaller flakes which is detrimental to the properties of the material.

Some embodiments of the method can involve depositing the dispersion on a substrate. For example, the dispersion can be deposited on a substrate via stamping, spin coating, printing, spray coating, or electroplating. This can be done to form a film, a membrane, or a coating comprising the exfoliated 2-dimensional hBN sheets. The deposition can be done under an inert atmosphere.

Another exemplary embodiment includes a method for preparing an air stable dispersion of exfoliated 2-dimensional hexagonal boron nitride (hBN) sheet in water. The method can involve providing an alkali metal-intercalated hBN (e.g., hBN with an alkali metal intercalated between the hBN layers). This can be step (i). The method can involve adding an organic polar aprotic solvent (A) or a mixture (A') of polar aprotic solvents under anhydrous inert atmosphere to the alkali metal-intercalated hBN. The organic aprotic solvent can be tetrahydrofuran (THF). The organic aprotic solvent (A) can have a dielectric constant between 25 and 200. This can be step (ii). The method can involve agitating the mixture formed by (i) and (ii) until a dispersion of reduced/negatively charged exfoliated 2-dimensional hBN sheet is formed. This can be step (iii). The method can involve mixing the dispersion of 2-dimensional hBN in organic polar aprotic solvent (A) or a mixture (A') organic polar aprotic with a predetermined amount of water, or ionic aqueous solution. This can be step (iv). The method can involve evaporating the organic polar aprotic solvent. (A) or the mixture (A') of polar aprotic solvents to generate an air stable dispersion exfoliated 2-dimensional hBN sheet in water. This can be step (v). The organic polar aprotic solvent (A) or the mixture (A') of organic polar aprotic solvents of step (ii) and/or step (iv) can be fully or partially water miscible.

Some embodiments of the method can involve depositing suspensions on a substrate. For example, suspensions can be deposited on a substrate via stamping, spin coating, printing, electroplating, or spray coating in air. This can be done to form a film, a membrane, or a coating comprising the 2-dimensional hBN sheets.

Another exemplary embodiment includes a method for preparing air stable dispersions of exfoliated 2-dimensional hexagonal boron nitride (hBN) sheet in organic solvents. The method can involve providing an alkali metal-intercalated hBN (e.g., hBN with an alkali metal intercalated between the hBN layers). This can be step (i). The method can involve adding an organic polar aprotic solvent (A) or a mixture (A') of polar aprotic solvents under anhydrous inert atmosphere to the alkali metal-intercalated hBN to make a 2 mg/mL suspension. This can be step (ii). The method can involve agitating the mixture formed by (i) and (ii) under anhydrous inert atmosphere until a dispersion of reduced/ negatively charged exfoliated 2-dimensional hBN sheet is formed. This can be step (iii). The method can involve mixing the dispersion in organic polar aprotic solvent (A) or a mixture (A') organic polar aprotic with an equal or other amount of organic solvent (B), or a mixture (B') of organic solvents such as benzene, toluene, hexane, ethanol, butanol and others according to the desired concentration of the final dispersion. This can be step (iv). The method can involve evaporating (using natural means of using any type of chemical evaporator) the organic polar aprotic solvent (A) or the mixture (A') of polar aprotic solvents to generate an air stable dispersion exfoliated 2-dimensional hBN sheet in organic solvents. This can be step (v).

The organic polar aprotic solvent (A) or the mixture (A') of organic polar aprotic solvents can be fully or partially miscible with organic solvent (B), or a mixture (B') of organic solvents.

Some embodiments of the method can involve depositing suspensions on a substrate. For example, suspensions can be deposited on a substrate via stamping, spin coating, printing, electroplating, or spray coating in air. This can be done to form a film, a membrane, or a coating comprising the suspension.

Some embodiments can involve mixing the air stable dispersion exfoliated 2-dimensional hBN sheets with a polymer to form a polymer nanocomposite.

Some embodiments can involve mixing the air stable dispersion exfoliated 2-dimensional hBN sheet with a ceramic to form a ceramic nanocomposite.

Some embodiments can involve mixing the air stable dispersion exfoliated 2-dimensional hBN sheet with a metal to form a metal nanocomposite.

Another exemplary embodiment includes a method for preparing 2-dimensional hexagonal boron nitride (hBN)-supported metal nanoparticles composites. The method can involve providing an alkali metal-intercalated hBN (e.g., hBN with an alkali metal intercalated between the hBN layers). This can be step (i). The method can involve adding an organic polar aprotic solvent (A) or a mixture (A') of polar aprotic solvents under anhydrous inert atmosphere to the alkali metal-intercalated hBN. This can be step (ii). The method can involve agitating the mixture formed by (i) and (ii) under anhydrous inert atmosphere until a suspension of reduced exfoliated 2-dimensional hBN is formed. This can be step (iii). The method can involve adding a solution of a metal salt and/or metal complex in an organic polar aprotic solvent (A) or a mixture (A') of polar aprotic solvents under anhydrous inert atmosphere to the suspension. The amount of salt added can be the equivalent amount or less than the total amount of metal ions that can be reduced by the total amount of alkali metal in the alkali metal-intercalated hBN dispersion. This can be step (iv). Metal atoms and/or metal compounds of the metal salt and/or metal complex can include any one or combination of lanthanides, actinides, transition metals, or post-transition metals. The method can involve agitating the mixture formed by step (iv) to form a 2-dimensional hBN-supported metal or metal oxide)nanoparticle composite. This can be step (v). In some embodiments, the 2-dimensional hexagonal boron nitride (hBN)-supported metal nanoparticles composite exhibits interesting magnetic properties, including ferromagnetic properties if the supported metal nanoparticles are ferromagnetic.

The disclosed method can produce a 2-dimensional hBN-supported metal nanoparticle composite having nanoparticles with an average size ranging from 0.5 nm to 10 nm. With embodiments producing a 2-dimensional hBN-supported metal nanoparticle composite comprising nanoparticles, the method can further involve oxidizing the metal nanoparticles by annealing in air to yield 2-dimensional hBN-supported metal oxide nanoparticles. The 2-dimensional hBN-supported metal oxide nanoparticles can include iron oxide, nickel oxide, and/or cobalt oxide.

Another exemplary embodiment includes a method of performing a catalytic reaction. The method can involve using an embodiment of the 2-dimensional hBN-supported metal or metal oxide nanoparticle composite disclosed herein as a catalyst in a catalytic reaction. The catalytic reaction can involve a hydrogen evolution reaction and/or an oxygen reduction reaction. In some embodiments, the catalytic reaction can involve a high temperature catalytic reaction (e.g., above 25° C.).

Synthesis of Alkali Metal-Intercalated hBN Materials

Embodiments of the method involve use of hexagonal boron nitride as a host for redox-derived intercalation of alkali metal guests to form alkali metal-intercalated hBN materials. The alkali metal-intercalated hBN materials that are formed have both superconducting and interesting magnetic properties. The alkali metal-intercalated hBN materials can be used as a starting material to produce suspensions of fully exfoliated reduced/negatively charged 2-dimensional hBN nanosheets, fully exfoliated organic and aqueous dispersions of 2-dimensional hBN nanosheets, functionalized 2-dimensional hBN, and 2-dimensional hBN-supported metal/metal oxide nanoparticles and depicted in the scheme in FIG. 1A.

For a further understanding of the invention, reference will now be made to the preferred embodiments of the invention by way of example, and it is to be understood that the description is intended to further illustrate features and advantages of the invention, and not to limit the scope of the claims. Based on some problems still existing in the art, the present invention provides alkali metal-intercalated hBN materials, a preparation method, resultant products and uses thereof.

Referring to FIG. 1B, in one embodiment, the preparation method of the alkali metal-intercalated hBN materials, comprises the following steps:

(1) under an inert environment, heating and mixing of an hBN material with an alkali metal in a glass container to obtain a uniformly mixed hBN material-alkali metal composite material; and (2) under an inert environment, letting the uniformly mixed hBN material-alkali metal composite material to stand on the heater and mixing occasionally for a certain time, to cause an alkali metal intercalation reaction until the composite material changes from white to another color or completely black alkali metal-intercalated hBN.

In the process of preparing the alkali metal-intercalated hBN material of the form $A(hBN)_X$, (A represents alkali metal atoms), the alkali metal-intercalated hBN material is obtained by, heating, mixing and stirring the hBN material with a molten alkali metal; in the process, the intercalation reaction takes place. The alkali metal is selected from one or more of lithium, sodium, potassium, rubidium, and cesium; taking potassium intercalated hBN as an example, it can be expressed as $K(hBN)_X$. Suitable hBN materials for use in the method of the invention include the powdered forms of hBN, flakes, films or slabs of hBN.

The present invention also provides potential application of the alkali metal-intercalated hBN materials, in electrical and magnetic devices, in particular to a device showing superconductivity or ferromagnetism. The alkali metal-intercalated hBN material has potential application prospects in the aspects of electronic materials, quantum materials, magnetic materials, chemical production, materials production, and catalytic materials, and compared with existing methods it is suitable for large-scale production. For further understanding of the present invention, the following examples are provided to illustrate the preparation method and applications of the alkali metal-intercalated hBN material, and the scope of the present invention is not limited by the following examples.

EXAMPLES

Example 1: Synthesis and Characterization of K-Intercalated hBN Materials

Figure 2A:
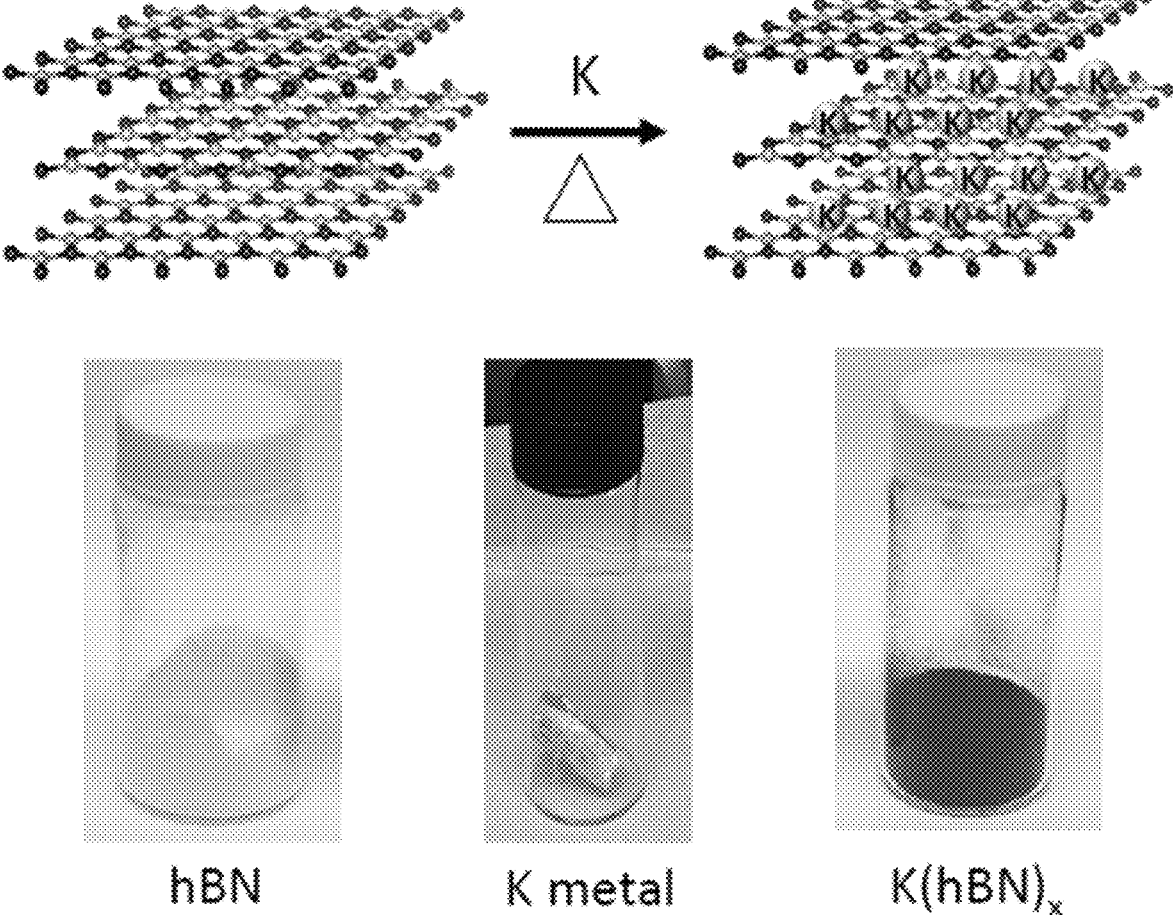
FIG. 2A is a schematic illustration of the synthesis of K-intercalated hBN material.

To form a K-intercalated hBN material, 2 g of hBN powder, and 0.81 g freshly cleaned potassium (stoichiometry $K(hBN)_4$) were placed together in a glass vial inside an argon filled glove box and heated for 5 hours at 200° C. on a heating plate under occasional stirring as illustrated in FIG. 2A. Afterwards, the vial is allowed to cool down to room temperature and the K-intercalated hBN material is collected. Other stoichiometries such as $K(hBN)_{12}$, $K(hBN)_{18}$, $K(hBN)_{36}$, $K(hBN)_{60}$ were prepared by reacting their stoichiometric equivalents of K and hBN, see FIG. 2C for colors of the resultant products. The resulting K-intercalated hBN material is directly used or stored in a tightly sealed glass vial for characterization and for further processing. All the characterization of the K-intercalated hBN material was done under an inert atmosphere using airtight sample cells.

Figure 2B:
FIG. 2B is a photograph of hBN powder, K metal, and the K-intercalated hBN material with a K-intercalated hBN material based electrical device tested using a multimeter. The devices are fabricated by filling a 1 mm diameter Teflon tubing with K-intercalated hBN and sealing the ends of the Teflon tubing using bronze plugs that also function as electrical contacts.
Figure 3A:
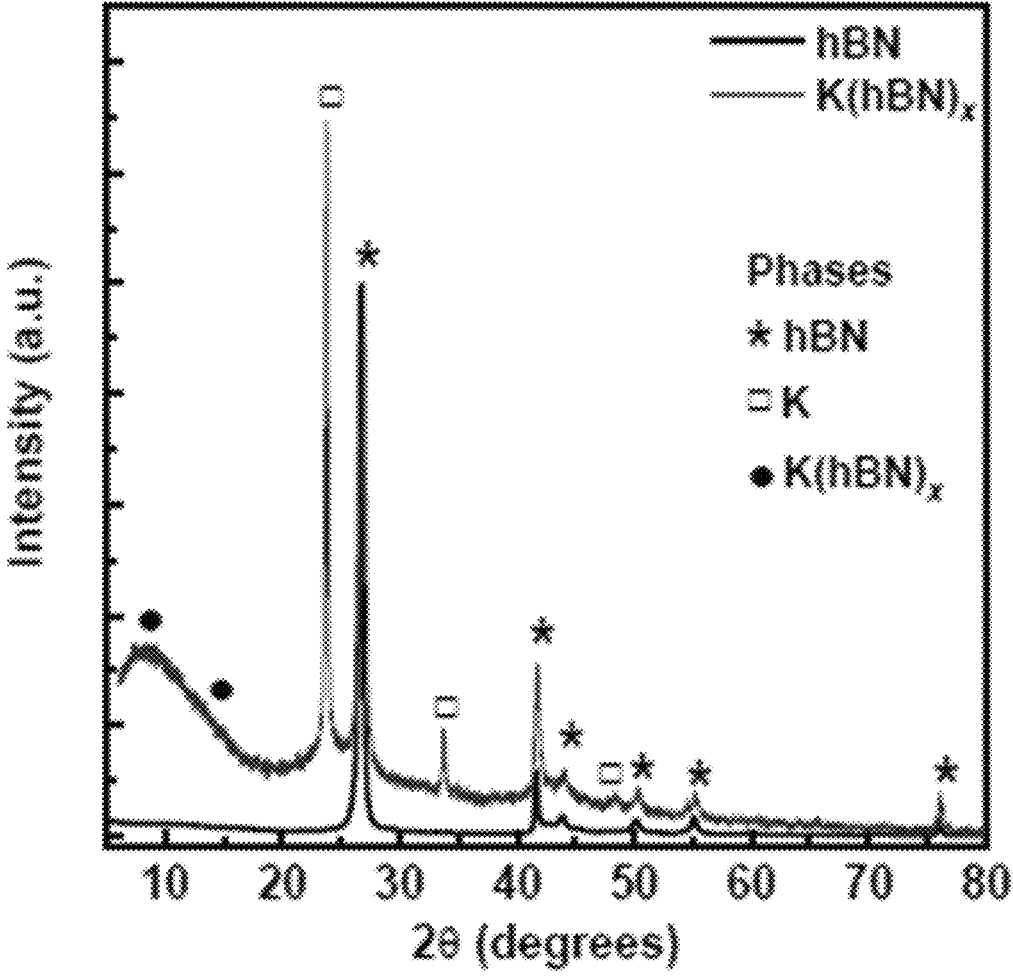
FIG. 3A is a structural characterization of alkali metal-intercalated hBN showing XRD patterns of K-intercalated hBN.
Figure 5A:
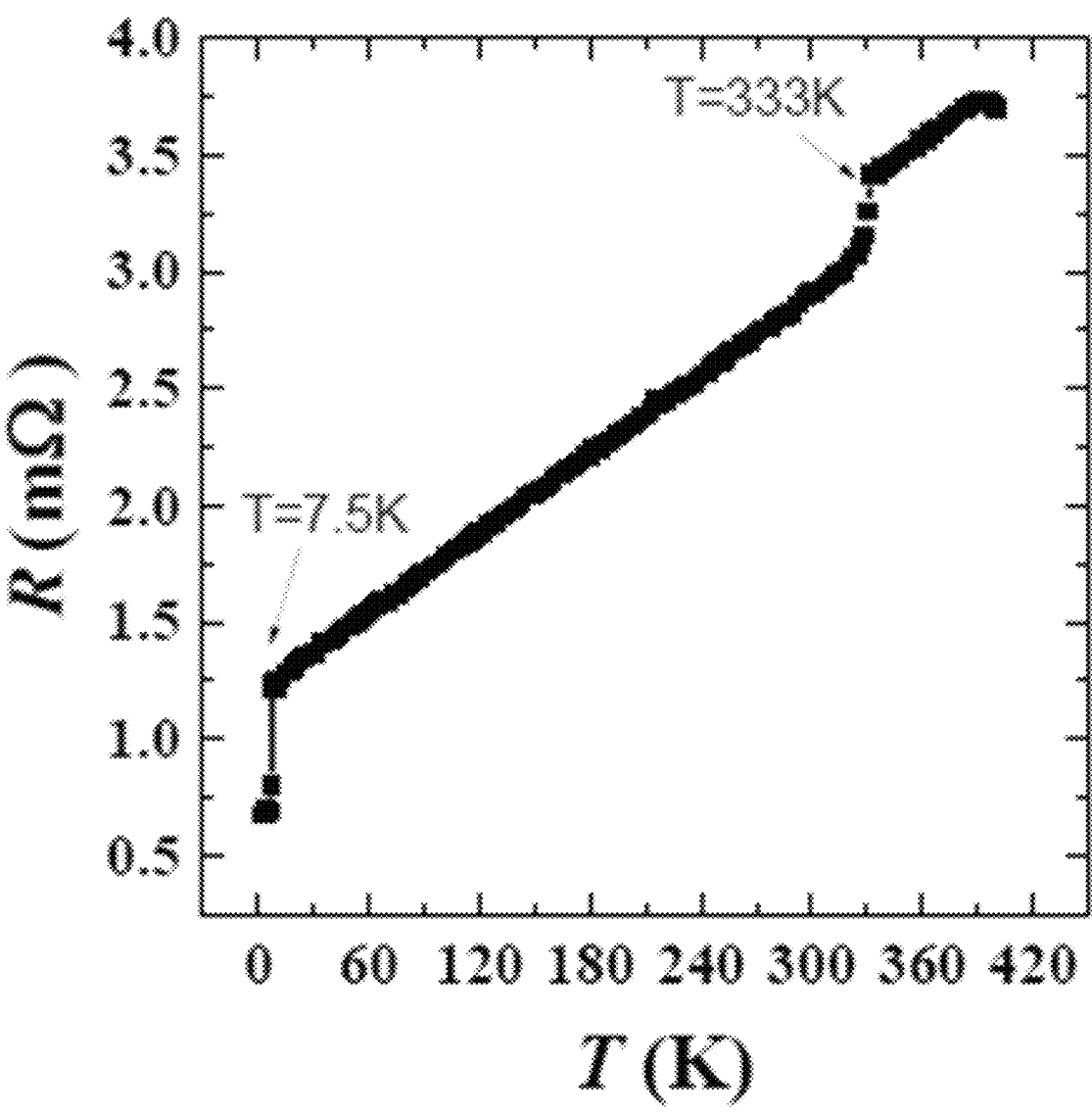
FIG. 5A is a temperature dependent two-probe electrical resistance of a K-intercalated hBN device. There is a clear transition indicating the possible existence of superconductivity.
Figure 5B:
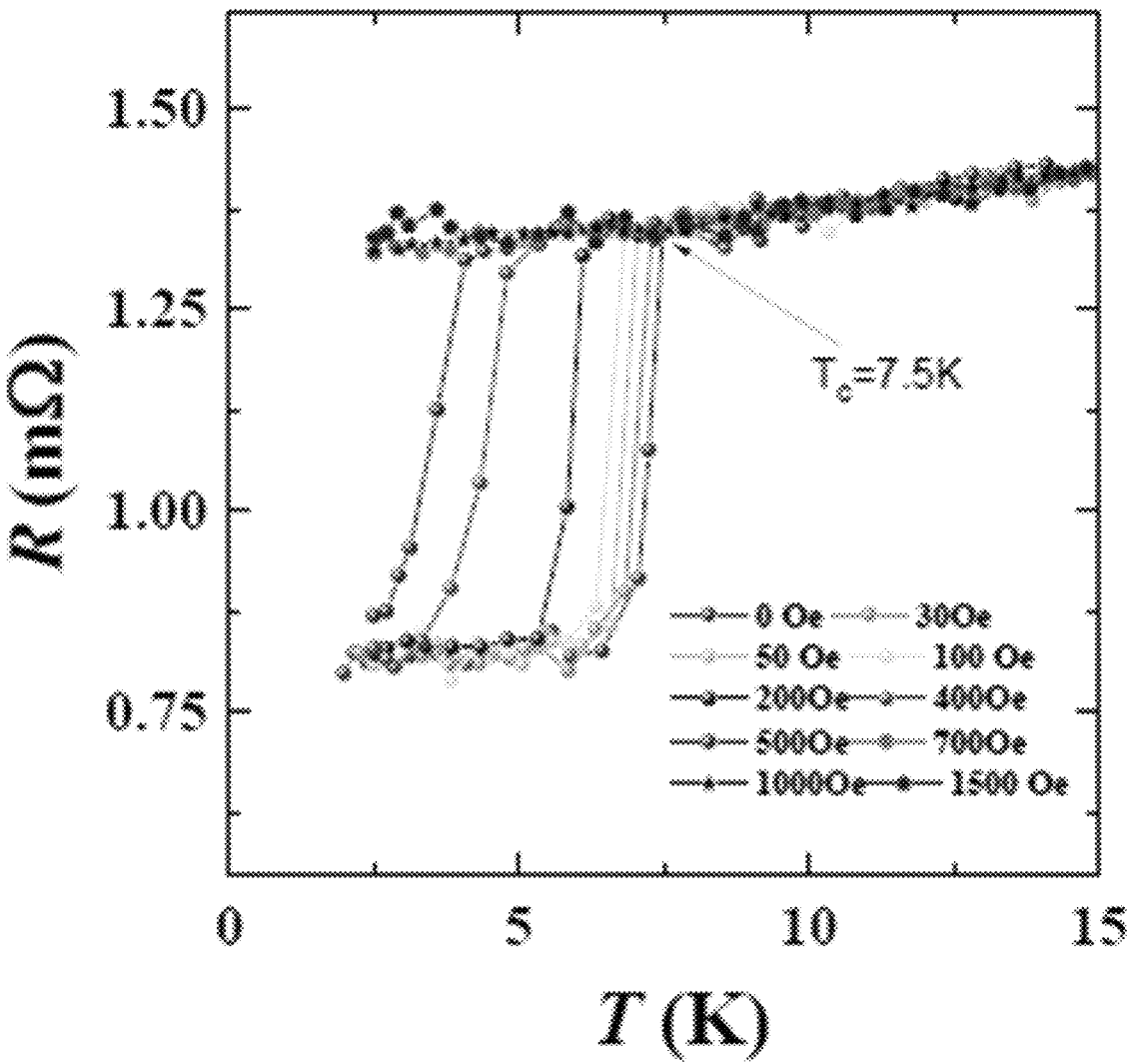
FIG. 5B shows temperature dependent two-probe electrical resistance measurements for K-intercalated hBN at different magnetic fields. There is superconductivity transition suppression by magnetic field.

During the heating and mixing of molten K with the hBN powder, the K metal is absorbed into the hBN layers and the material changes color from white to black as indicated in FIG. 2A. The K-intercalated hBN is a metallic material as indicated using conductivity measurements in FIG. 2B and FIGS. 5A-B compared to the pristine hBN which is an electrical insulator. After the intercalation reaction, the chemical structure and composition of the product was characterized by XRD and XPS. FIG. 3A shows the typical XRD patterns of the hBN and K-intercalated hBN samples. The peak at 27.8° is the (002) diffraction peak of hBN which correspond to an interlayer distance of 3.33 Å is present is present in pristine hBN and is also present after K-intercalation. A broad peak (2θ=8.10) and a shoulder at (2θ=13.0°) were formed by the reaction with K, which is an indication of interlayer expansion due to intercalation of K atoms. The shoulder at the 2θ angle of 13.0° corresponds to an interlayer distance of 0.68 nm. The difference between this distance and the interplanar spacing in h-BN (0.33 nm) indicate an average gallery height of 0.35 nm, and formation of a stage-1 hBN intercalation compound. This gallery height is sufficient to accommodate at least a single layer of intercalated K atoms. The other maxima at the 2θ angle of 8.6° corresponds to an interlayer distance of 1.09 nm. The difference between this distance and the interplanar spacing in h-BN (0.33 nm) indicate an average gallery height of 0.77 nm. This gallery height is sufficient to accommodate a bilayer of K atom clusters. The broad peaks are considered to be the (002) diffraction peaks of K-intercalated hBN, which is shifted to a lower angle by the expansion of hBN interlayer distance due to K-intercalation. The presence of peaks corresponding to the b.c.c. lattice of metallic K is typical for all samples studied and is evidence that K form single layer- or few layer-metallic clusters between the hBN sheets. In all the K-intercalated hBN systems, the new intercalated phases coexist with some amount of intact hBN.

From, this, we conclude that the intercalation occurs from the hBN flake edges up to a certain distance and the center of the flakes remain intact.

Figure 4A:
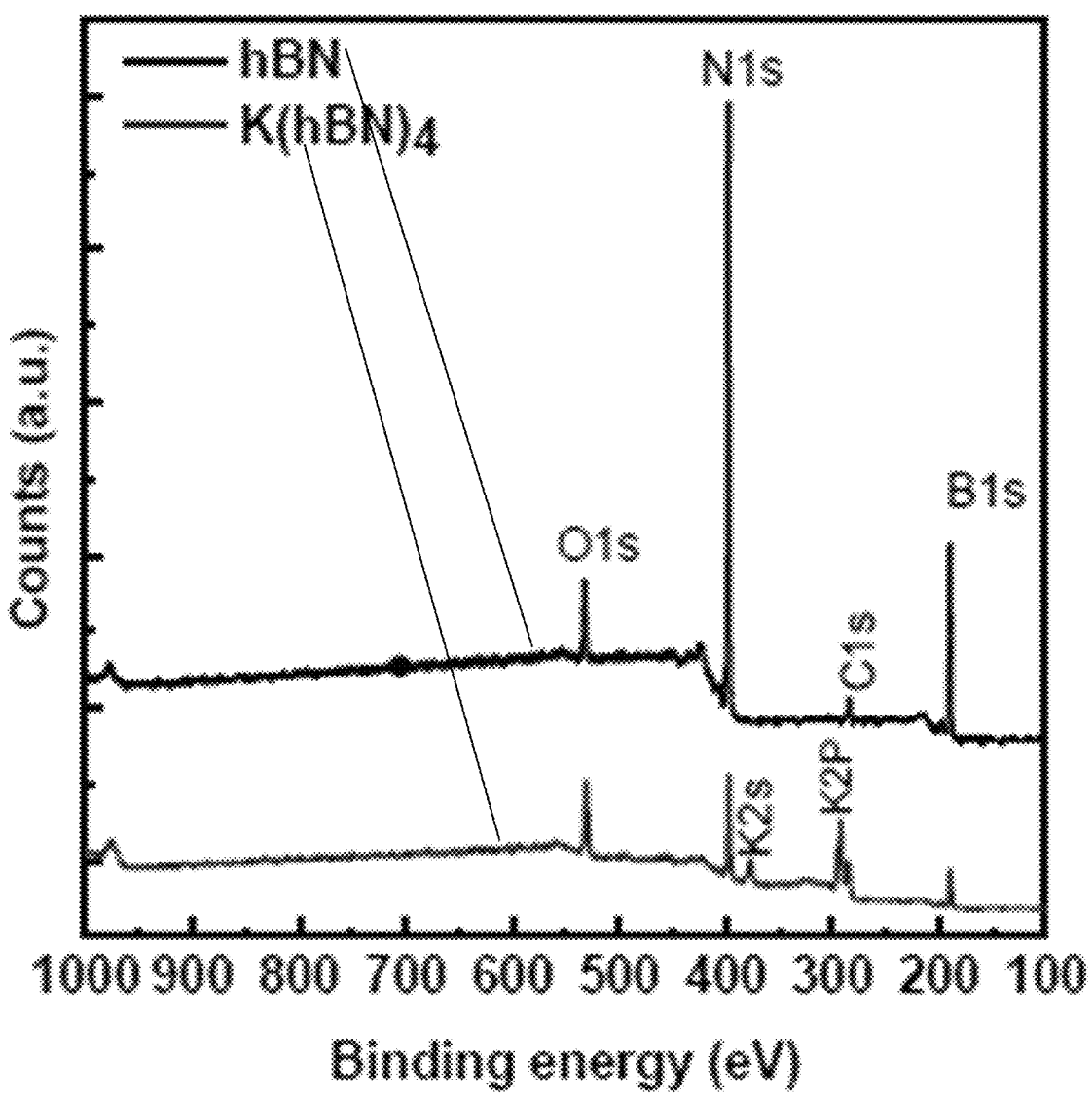
FIG. 4A is chemical composition of K-intercalated hBN showing XPS survey measurements of hBN and K-intercalated hBN.
Figure 4B:
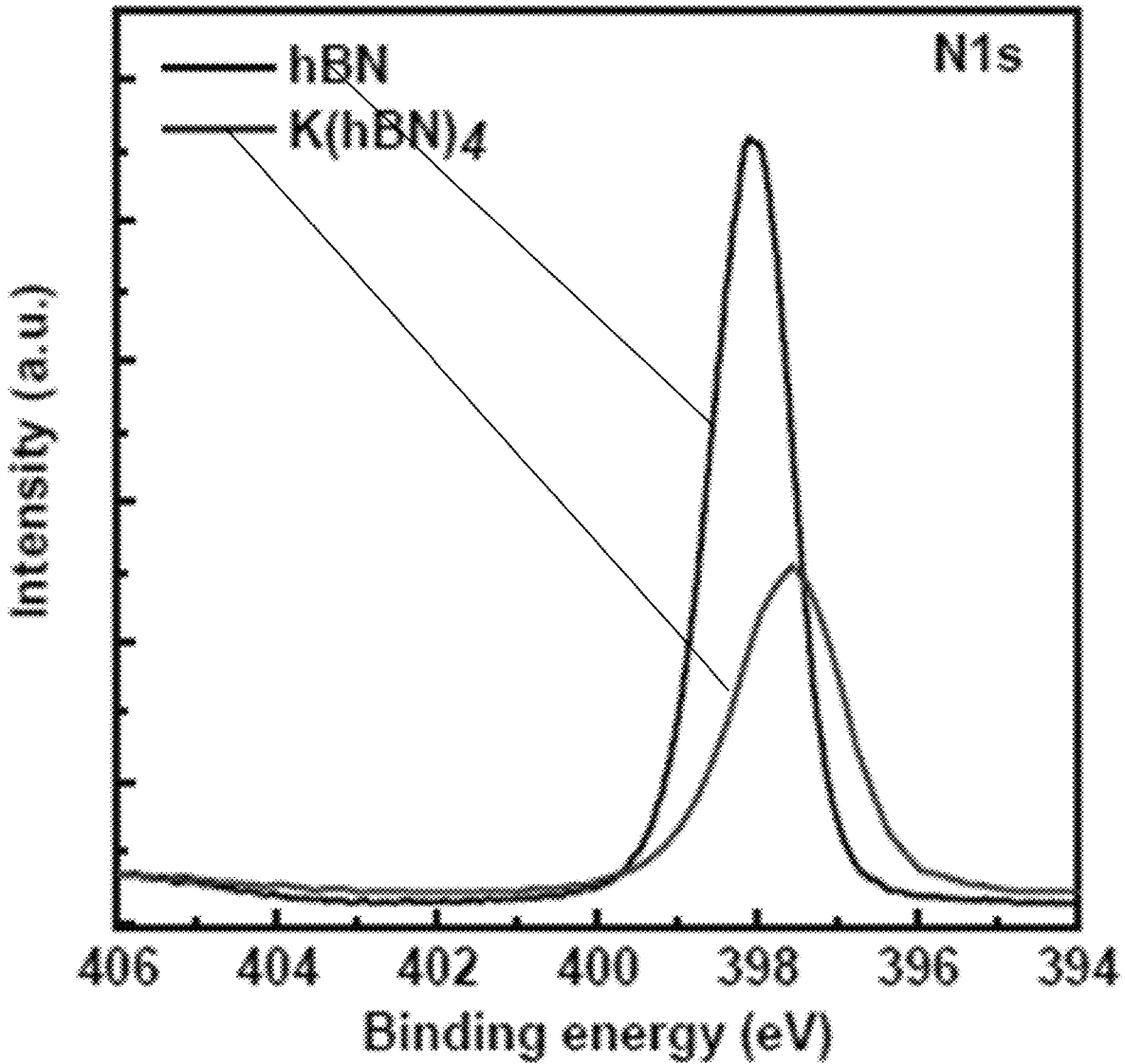
FIG. 4B is N1s core spectra of hBN and K-intercalated hBN.
Figure 4C:
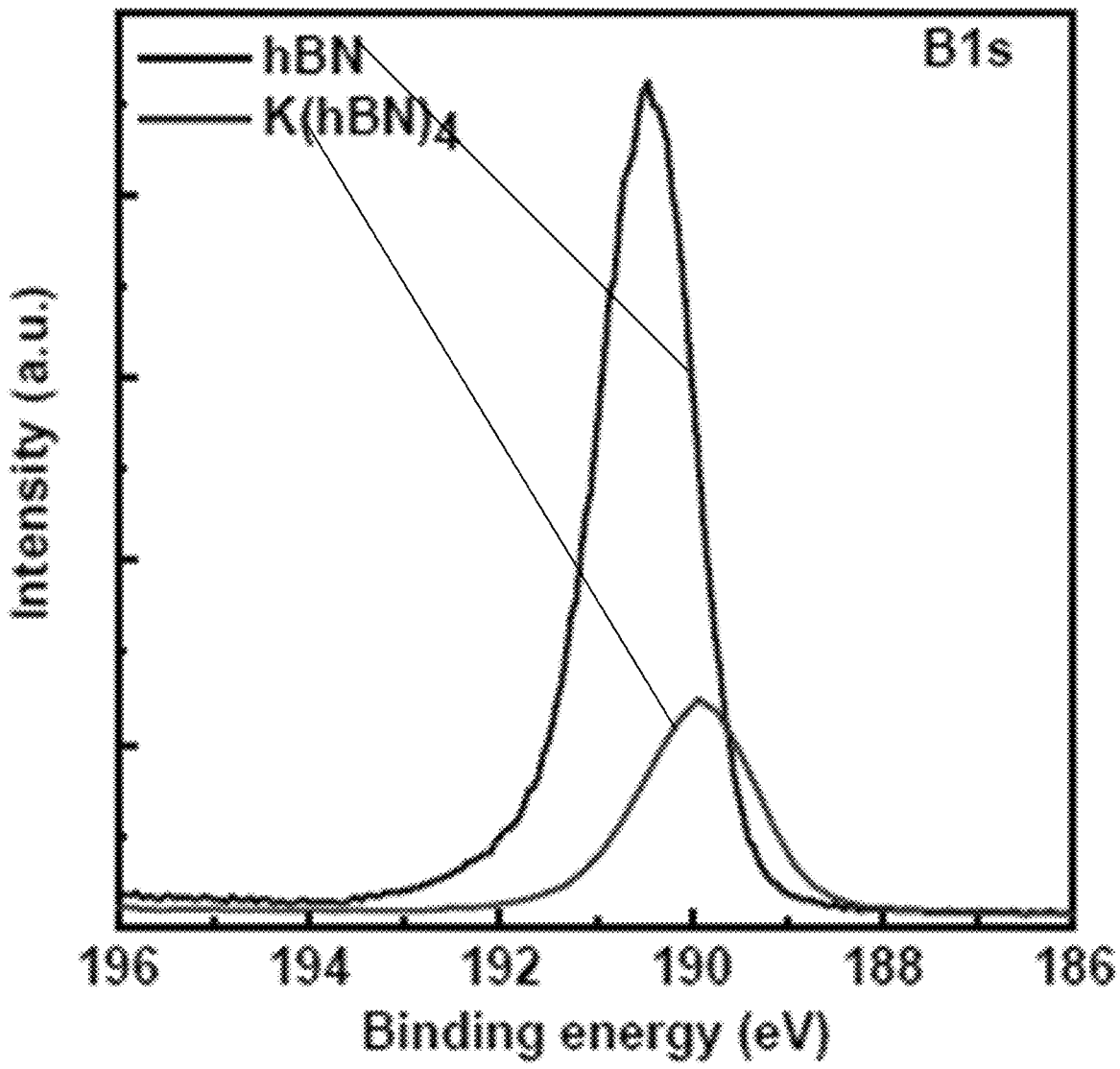
FIG. 4C is B1s core level spectra of hBN and K-intercalated hBN.

The chemical composition of the K-intercalated hBN was investigated by XPS analysis. The K-intercalated hBN materials were loaded onto an airtight vessel inside an argon filled glovebox. The airtight vessel was then connected to the XPS instrument for measurement. The XPS survey spectrum of hBN in FIG. 4A shows the presence of the N1s and B1s peaks. The O1s and C1s peaks are due to surface contamination with air and hydrocarbons. The XPS survey spectrum of a K-intercalated hBN presented in FIG. 4A also shows the presence of N1s, B1s, K1s, and K2s peaks. The O1s and C1s peaks are more prominent in the product, mostly due to the surface oxidation of the K-intercalated hBN material to potassium carbonates and oxides during transportation and measurement. The obtained spectra were analyzed for B1s, N1s, and core level peak features. The B 1s and N 1s peaks for pristine hBN presented in FIGS. 4B-C are found to be centered at 190.5 and 398.1 eV, respectively, which is in accordance with the previously reported values of B 1s and N 1s peak position in conjugated BN systems.[43] After potassium intercalation reaction, the B 1s and N 1s peaks for pristine hBN are found to be centered at 189.9 and 397.6 eV, respectively. The B1s and N1s peaks shifted to lower binding energy by 0.55 eV relative to the B1s and 0.45 eV relative to the N1s of pristine hBN, suggesting the presence of B and N atoms with higher electron density in the K-intercalated hBN. The full width at half maximum (fwhm) of the B1s and N1s peaks of the K-intercalated hBN sample are broader by 0.2 eV and 0.44 eV respectively. The higher electron density on the B and N atoms in the K-intercalated hBN may result from electron doping from the highly reducing K metal atoms intercalated in between the hBN layers.

Example 2: Determination of the Electrical and Magnetic Properties of K-Intercalated hBN Materials Temperature dependent electrical resistance properties of bulk powders of K-intercalated hBN powder were studied on tubular devices protected inside a Teflon tube and sealed by two bronze plugs as contacts as indicated in FIG. 2B. The two contact electrical devices for temperature dependent electrical resistance measurements were fabricated by loading the K-intercalated hBN powder inside a 1 mm diameter Teflon tube. The devices were completed by sealing the two tube ends by screwing in bronze plugs as electrical contacts. The electrical resistance as a function of temperature was measured during the natural warming cycle from low temperature. Due to the oxygen and moisture sensitivity of K-intercalated hBN, its exposure to air was minimized during device fabrication and measurement. The electrical resistance of the sample decreased in several orders of magnitude compared with that of pristine hBN, which is complete insulator.[44] The variation in electrical resistance with temperature of K-intercalated hBN powder of the form $(K(hBN)_4)$ is shown in FIG. 5A. While some degree of deintercalation and oxidation of the K-intercalated hBN is unavoidable outside the inert glovebox environment, interestingly, as-prepared devices consistently exhibited increasing resistance with increasing temperature as expected from the metallic character of K-intercalated hBN. The K-intercalated hBN materials are an electrically conducting metallic material: At a temperature close to ~7.5 K, abrupt change in resistance was observed, indicating an onset of superconducting transition, as shown in FIG. 5A. The observation of a superconducting transition at 7.5 K suggest that K-intercalated hBN is a superconducting material with a transition temperature an order of magnitude higher than the related potassium-GICs.[45,46] Zero-resistance state was not observed within the temperature window of this study, because of contact resistance since only two contacts were used and also suggesting that non-superconducting phases are present in the prepared K-intercalated hBN materials. Another abrupt change in resistance at ~333 K was observed. This temperature is close to the melting point of potassium 336.7 K. As such this transition may results from a change of state of the K atoms from solid to liquid, confirming that the some of the K is in small atomic clusters and not $K^+$ ions. Superconductivity in intercalation compounds of hBN has been predicted by many theoretical studies.[13,47] In this example, we report the onset of a superconducting transition in K-intercalated hBN.

To further confirm the superconducting transition, we exploit the inherent antagonism between an external magnetic field and superconductivity. FIG. 5B shows the disappearance of the superconducting transition with increasing magnetic field. With the application of a magnetic field, the superconducting transition becomes broader, and the $T_c$ decreases toward lower temperatures. The superconducting transition was suppressed completely suppressed by a magnetic field of 1000 Oe as shown in FIG. 5B, confirming a superconducting transition.

Figure 5C:
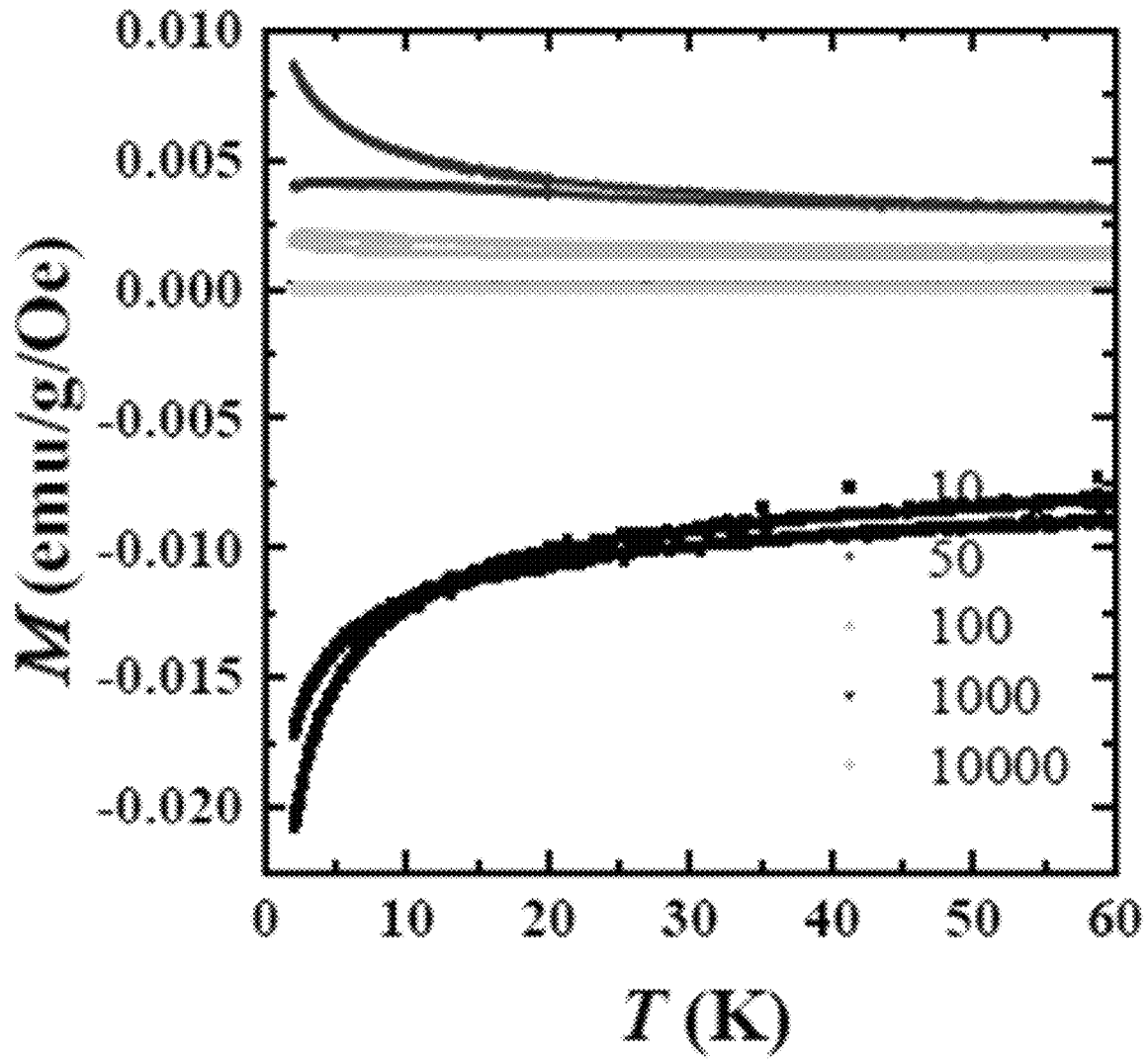
FIG. 5C shows zero field cooling (ZFC) and field cooling (FC) temperature dependent magnetization of the K-intercalated hBN at different fields.

A superior test for superconductivity is the search for a strong diamagnetic transition in the magnetic susceptibility. The superconducting transitions at different magnetic fields for K-intercalated hBN were further investigated through temperature-dependent magnetization measurements. FIG. 5C represents the DC susceptibility curves of K-intercalated hBN material using both ZFC and FC processes from 2 to 60 K at 10 Oe, 30 Oe, 50 Oe, 100 Oe, 1000 Oe, and 10 000 Oe magnetic fields measured by a SQUID magnetometer. We see a clear diamagnetic transition at 7K under a field of 10 Oe, but with no saturation of diamagnetism down to 2 K. The sharp drop of the ZFC curve from a constant magnetization value indicates the prominent supercurrent-induced diamagnetic transition under a field of 10 Oe. The sample showed a superconducting transition due to the occurrence of the Meissner shielding at ~7K. This temperature is in good agreement with the electrical resistance measurement obtained by the temperature dependent electrical resistance measurements. The existence of the hysteresis between the two magnetization curves for the zero-field cooling (ZFC) and the field cooling (FC) modes indicates that the superconducting phase in the K-intercalated hBN is a type-II superconductor.

Example 3: Synthesis and Characterization of Na-Intercalated hBN Materials

Figures 3B, 3C:
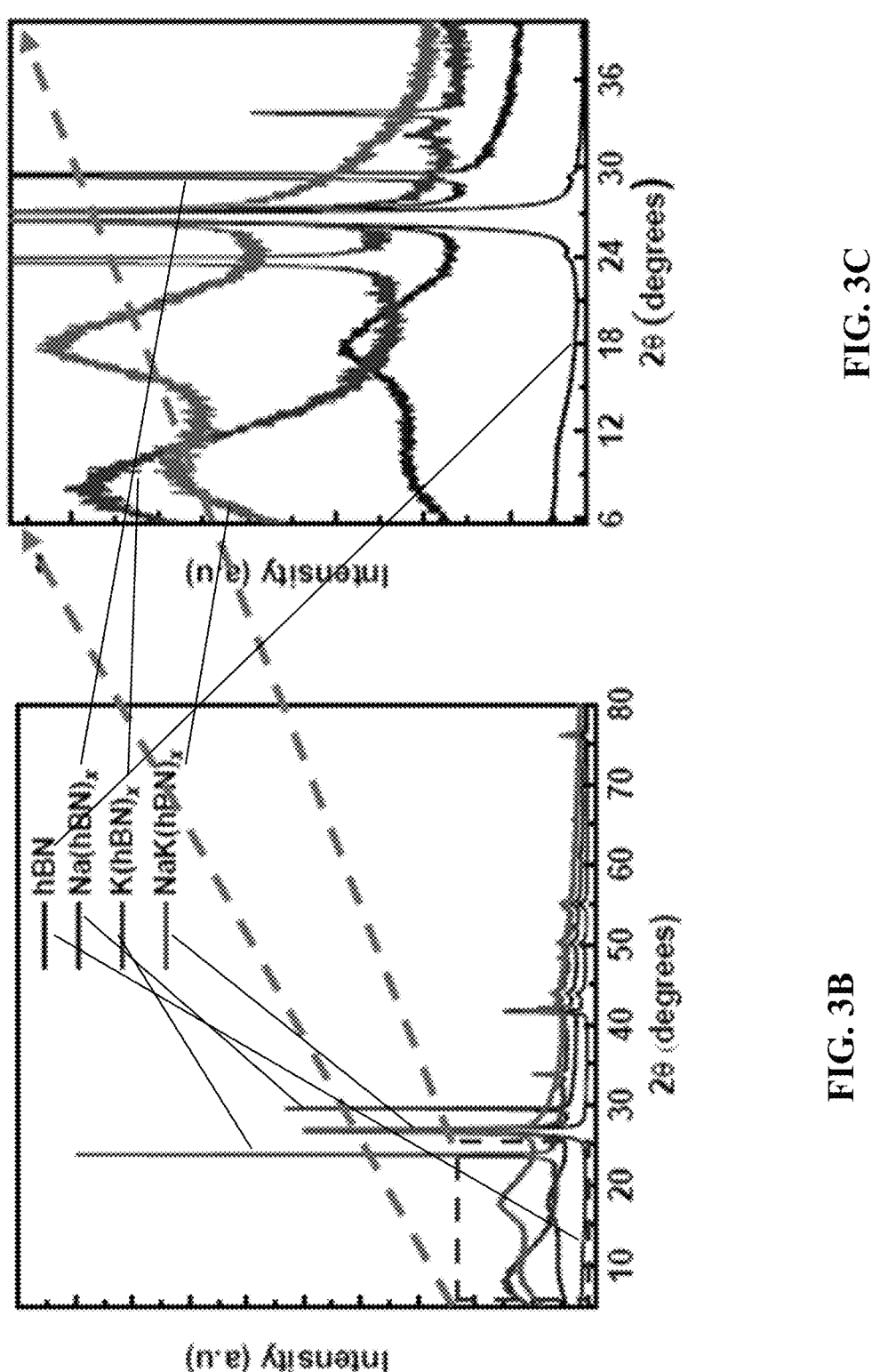
FIG. 3B shows XRD patterns of alkali metal-intercalated hBN with different alkali metal intercalants.
FIG. 3C is a zoom-in view of the XRD patterns of alkali metal-intercalated hBN with different metal intercalants (regime highlighted in red in FIG. 3B.

To form a Na-intercalated hBN material, 1.5 g of hBN powder, and 0.36 g freshly cleaned sodium metal (stoichiometry $Na(hBN)_4$) were placed together in a glass vial inside an argon filled glove box and heated for 12 hours at 300° C. on a heating plate under occasional stirring. Afterwards, the vial is allowed to cool down to room temperature and the Na-intercalated hBN material is collected. The resulting Na-intercalated hBN material is directly used or stored in a tightly sealed glass vial for characterization and for further processing. All the characterization of the Na-intercalated hBN material was done under an inert atmosphere using airtight sample cells. During heating and mixing, the molten Na metal is absorbed into the hBN layers and the material changes color from white to a light pink. After the intercalation reaction, the product was characterized by XRD and XPS. FIGS. 3B-C show the typical XRD patterns of the hBN and Na-intercalated hBN samples. The peak at 27.8° is the (002) diffraction peak of hBN which correspond to an interlayer distance of 3.33 Å is present is present in pristine hBN and is also present after Na-intercalation. A broad peak ($2\theta=17.6°$) and a shoulder at ($2\theta=9.6°$) were formed by the reaction with Na, which is an indication of interlayer expansion due to intercalation of Na atoms. The maxima at the $2\theta$ angle of 17.6° corresponds to an interlayer distance of 0.50 nm. The difference between this distance and the interplanar spacing in h-BN (0.33 nm) indicate an average gallery height of 0.17 nm, and formation of a stage-1 Na-intercalated hBN material. This gallery height is sufficient to accommodate at least a single layer of intercalated Na atoms. The other maxima at the $2\theta$ angle of 9.6° corresponds to an interlayer distance of 0.92 nm. The difference between this distance and the interplanar spacing in h-BN (0.33 nm) indicate an average gallery height of 0.59 nm. This gallery height is sufficient to accommodate a bilayer of Na atom clusters. The broad peaks are considered to be the (002) diffraction peaks of Na-intercalated hBN, which is shifted to a lower angle by the expansion of hBN interlayer distance due to Na-intercalation. The presence of peaks corresponding to the body centered cubic (b.c.c.) lattice of metallic Na is typical for all samples studied and is evidence that Na form single layer- or few layer-metallic clusters between the hBN sheets. In all the Na-intercalated hBN systems, the new intercalated phases coexist with some amount of intact hBN. From this, we conclude that the intercalation occurs from the hBN flake edges up to a certain distance and the center of the flakes remain intact. This gallery height is sufficient to accommodate at least a bilayer of intercalated Na atom clusters.

Example 4: Synthesis and Characterization of NaK-Intercalated hBN

To form a NaK-intercalated hBN material, 3.0 g of hBN powder, 0.36 g of freshly cleaned sodium, and 0.61 g of freshly cleaned potassium (stoichiometry $NaK(hBN)_8$) are placed together in a vial inside an argon filled glove box and heated for 5 hours at 200° C. on a heating plate under occasional stirring using a spatula. Afterwards, the vial is allowed to cool down to room temperature and the NaK-intercalated hBN is collected. The resulting NaK-intercalated hBN material is directly used to prepare airtight electrical and magnetic devices and also kept for different characterization and further processing. During heating and mixing, the molten NaK metal is absorbed into the hBN layers and the material changes color from white. FIGS. 3B-C show the typical XRD patterns of the hBN and NaK-intercalated hBN samples. The peak at 27.8° is the (002) diffraction peak of hBN which correspond to an interlayer distance of 3.33 Å is present is present in pristine hBN and is also present after NaK-intercalation. A broad peak ($2\theta=17.8°$) and a shoulder at ($2\theta=9.4°$) were formed by the reaction with Na and K, which is an indication of interlayer expansion due to intercalation of Na and K. The maxima at the $2\theta$ angle of 17.8° corresponds to an interlayer distance of 0.50 nm. The difference between this distance and the interplanar spacing in h-BN (0.33 nm) indicate an average gallery height of 0.17 nm, and formation of a stage-1 NaK-intercalated hBN material. The maxima at the $2\theta$ angle of 17.8° corresponds to an interlayer distance of 0.50 nm. This gallery height is sufficient to accommodate at least a single layer of intercalated Na atoms. The other maxima at the 2θ angle of 9.4° corresponds to an interlayer distance of 0.92 nm. The difference between this distance and the interplanar spacing in h-BN (0.33 nm) indicate an average gallery height of 0.69 nm. This gallery height is sufficient to accommodate at least a few layers of intercalated Na and K atom clusters. In all the NaK-intercalated hBN systems, the new intercalated phases coexist with some amount of intact hBN. From, this, we conclude that the intercalation occurs from the hBN flake edges up to a certain distance and the center of the flakes remain intact. This gallery height is sufficient to accommodate at least a bilayer of intercalated Na and K atom clusters.

Figure 6:
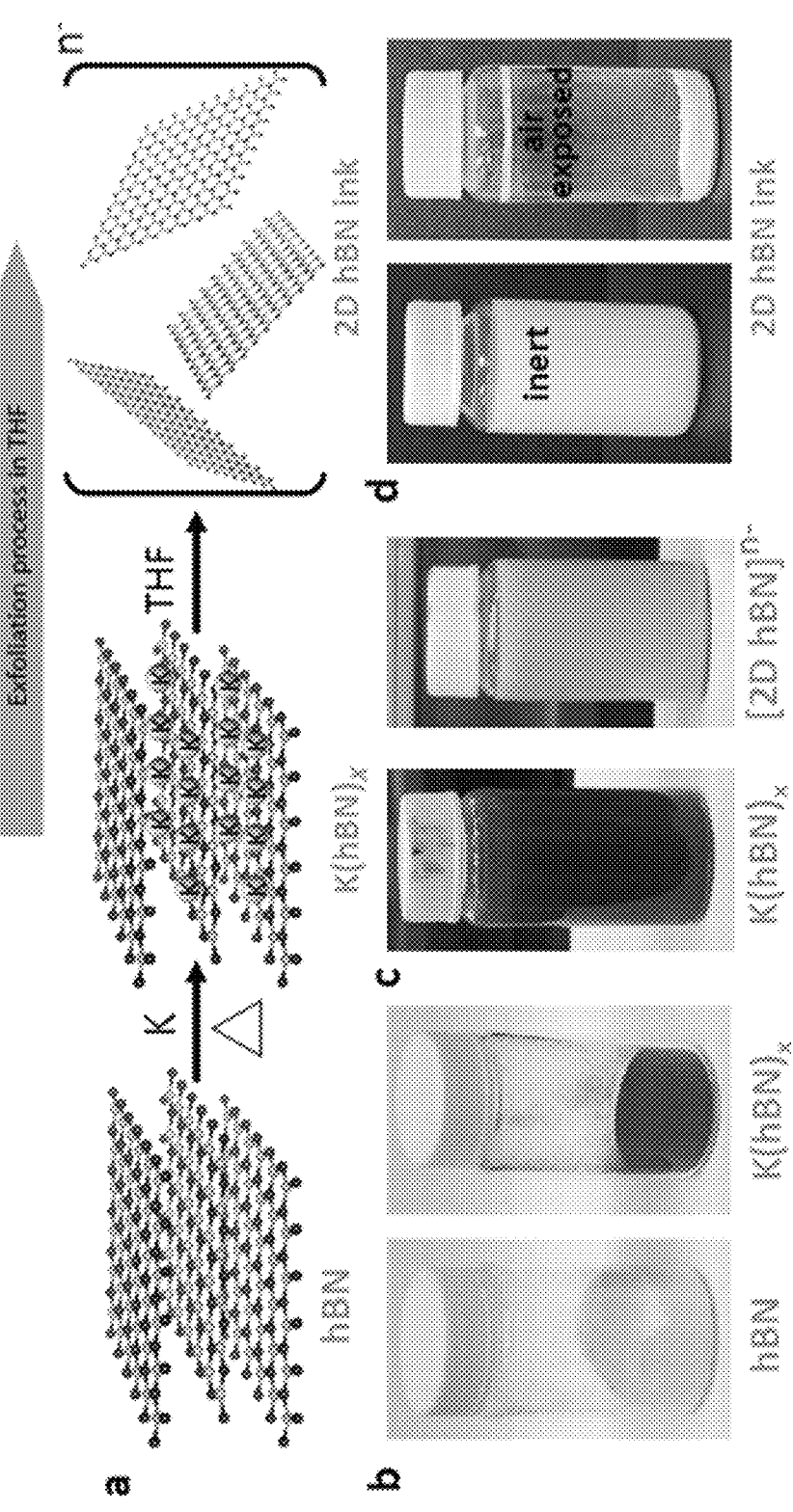
FIG. 6 shows preparation of dispersions of fully exfoliated reduced/negatively charged 2=dimensional hBN sheets in THF. Schematic (a) is an illustration of the synthesis of K-intercalated hBN material and its subsequent dispersion in THF as fully exfoliated reduced/negatively charged 2-dimensional hBN. Image (b) is a photograph of hBN powder and K-intercalated hBN material. Image (c) is K-intercalated hBN material in THF and exfoliated negatively charged 2-dimensional hBN in THF. Image (d) is stable suspension of 2-dimensional hBN sheets in THF after complete exfoliation under inert environment and precipitated 2-dimensional hBN in THF after air exposure.

Example 5: Preparation of Dispersions of Fully Exfoliated Reduced/Negatively Charged 2-Dimensional hBN in THF Under inert atmosphere, 500 mg of K-intercalated hBN powder was dispersed in 250 ml of dry THF (5 mg/mL) and this mixture (a deep blue suspension) was tightly capped and mixed for 3 days with a magnetic stirrer (600 revolutions per minute (r.p.m.)). As the mixing continued, the black suspension changed color from deep blue, sky blue, until it completely turned white after 3 days of stirring as illustrated in FIG. 6 (*b-d*). After stirring, the suspension was left to stand overnight to allow undissolved hBN aggregates to form and settle at the bottom. The well dispersed white hBN suspension in THF was extracted with a pipette and retained for characterization and further processing. The well dispersed white hBN suspension in THF was centrifuged in 10 ml glass centrifuge tubes at 1,000 r.p.m. for 20 min.

Exposure of K-intercalated hBN powder to dry tetrahydrofuran (THF), leads to spontaneous dissolution. After stirring for 3 days (to accelerate the dissolution process) and mild centrifugation to remove insoluble material, the dry extract of the suspensions gave a concentration of 1.4 mg/mL (yield=28% of the starting hBN material. Exposure of this K-intercalated hBN to THF readily and spontaneously exfoliates the intercalated hBN and yields air-sensitive dispersions of reduced/negatively charged 2-dimensional hBN sheets, affording a virtually unlimited amount of fully exfoliated 2-dimensional hBN sheets. The hBN layers in K-intercalated hBN materials carry a sufficient charge to form a polyelectrolyte that is soluble in polar organic solvents without the use of ultrasonication or chemical functionalization. These dispersions of reduced/negatively charged 2-dimensional hBN sheets can be obtained starting from different sources of hBN powders and hBN flakes of different sizes. The dispersions of reduced/negatively charged 2-dimensional hBN sheets remain stable as long as they are kept under an inert atmosphere. The reduced/negatively charged 2-dimensional hBN sheets can be deposited from these dispersions onto a variety of substrates for different application, and can be characterized by AFM, STM, optical microscopy, XPS, HRTEM, and Raman spectroscopy, all evidencing deposition of well exfoliated 2-dimensional hBN sheets. Once dried, the deposits can be freely air-exposed and the 2-dimensional hBN layers are oxidized back to the neutral state.

Functionalization of 2-Dimensional hBN Sheets

Figure 7A:
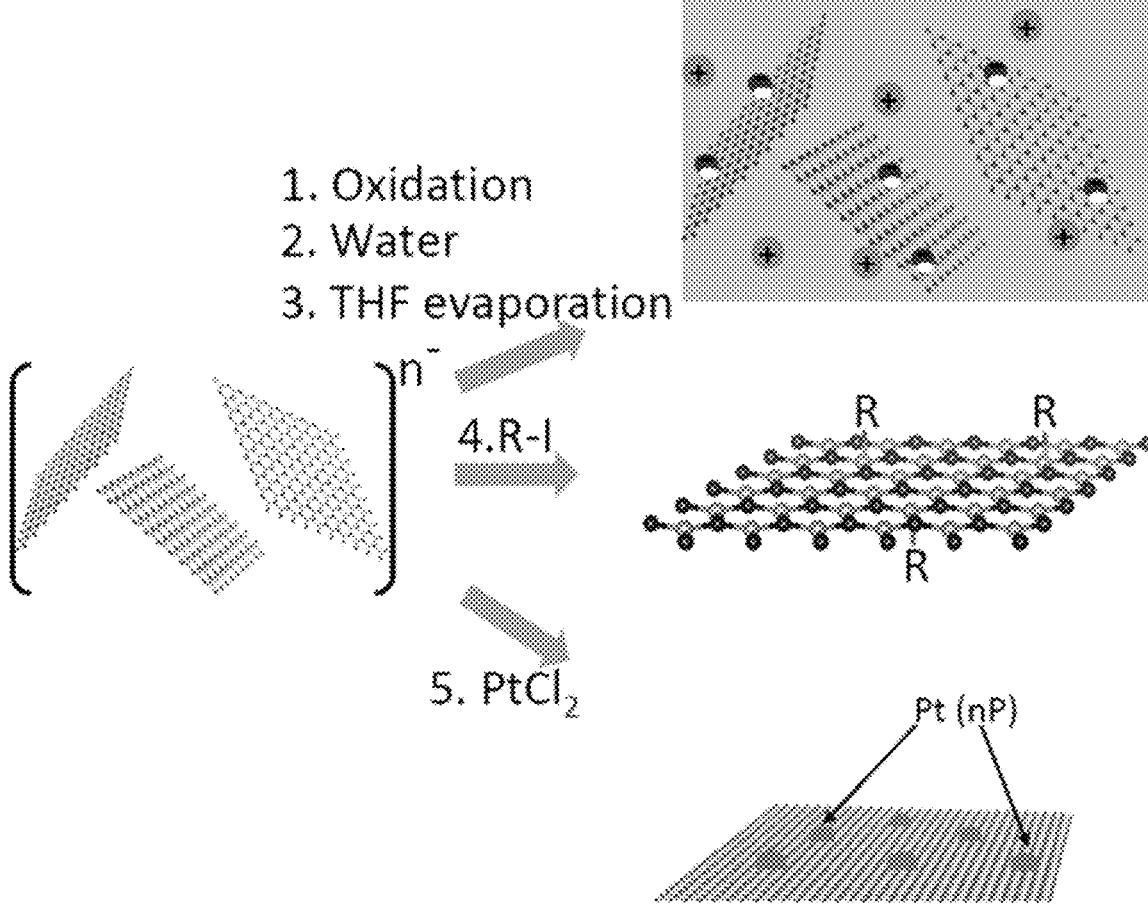
FIG. 7A shows utilization of the dispersions of fully exfoliated reduced/negatively charged 2-dimensional hBN in THF in the preparation of stable suspensions of 2-dimensional hBN in water, functionalized 2-dimensional hBN sheets and 2-dimensional hBN-supported metal NPs. The schematic illustration is of the preparation of air stable suspensions of 2-dimensional hBN in water (1-3), functionalization of the hBN surface with alkyl chains (4), and reduction of metal salts on the 2-dimensional hBN surface to form 2-dimensional hBN-supported metal NPs (5).
Figure 9A:
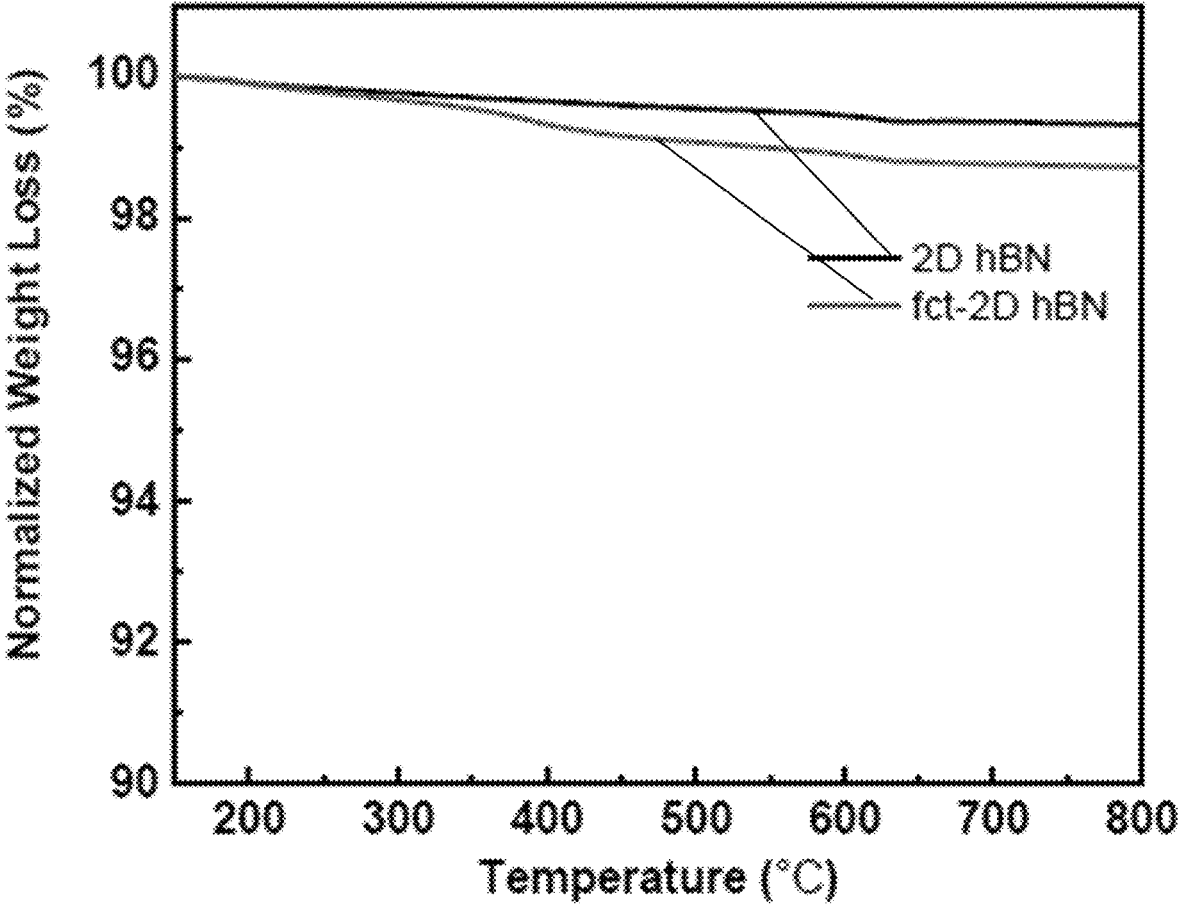
FIG. 9A is a characterization of functionalized 2-dimensional hBN nanosheets showing a TGA profile of functionalized 2-dimensional hBN showing mass loss in the region 250-400° C.
Figure 9B:
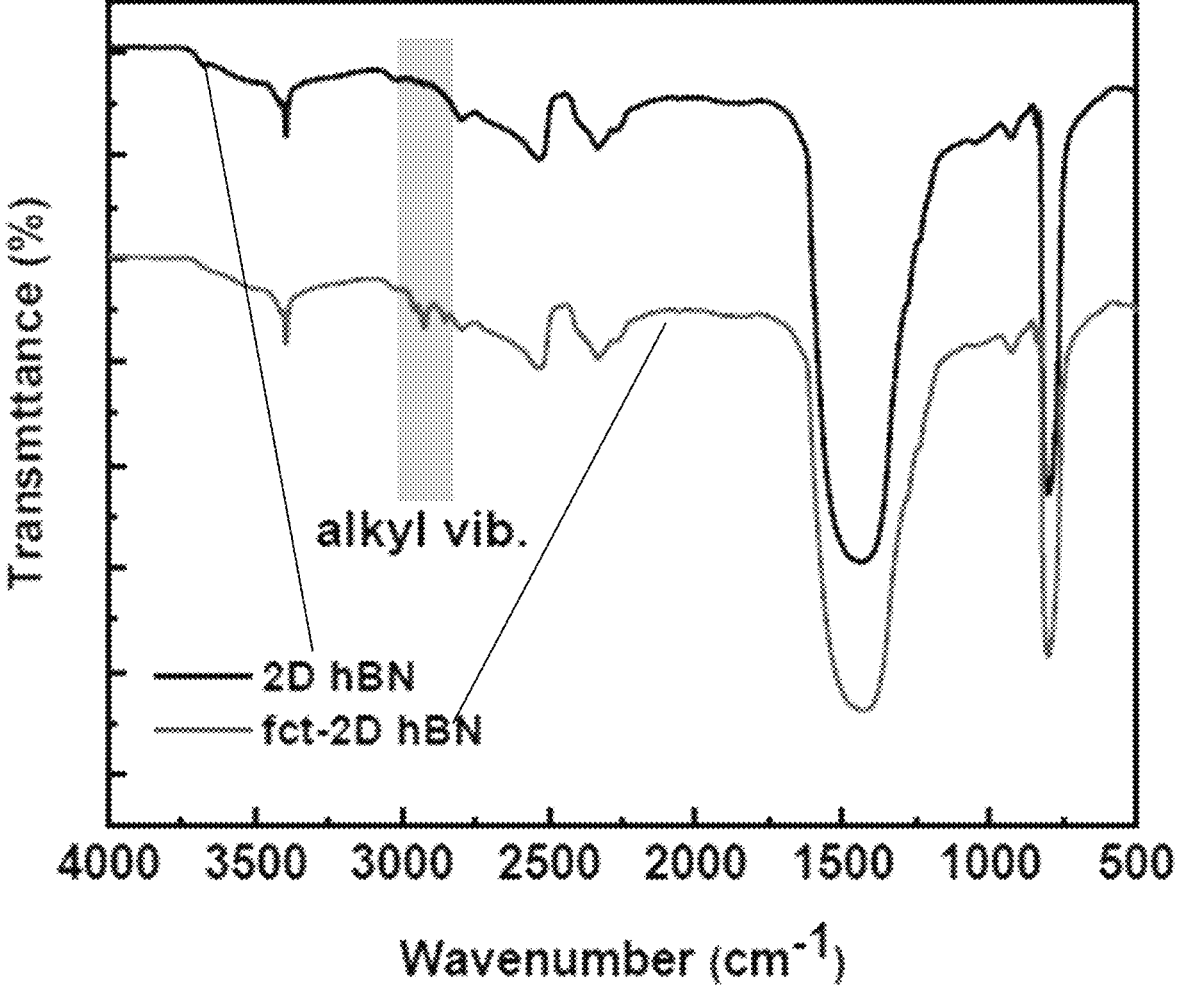
FIG. 9B is FTIR spectra of functionalized 2-dimensional hBN showing new alkyl vibration peaks indicating functionalization with hexyl groups. The mass loss in the TGA profile depicted in FIG. 9A indicates detachment of the hexyl functional groups that were attached on the 2-dimensional hBN sheets.

The dispersions of reduced 2-dimensional hBN sheets are chemically activated by the alkali metals, and this can be utilized for efficient chemical functionalization on the 2-dimensional hBN surface. In this example, the well dispersed reduced 2-dimensional hBN in THF was reacted with a reactive alkyl halide, n-hexyl iodide as illustrated in FIG. 7A. The reaction mixture of the dispersion of reduced 2-dimensional hBN sheets in THF and n-hexyl iodide was tightly capped and left stirring on a magnetic stirrer for 24 hours. The functionalized 2-dimensional hBN was precipitated and thoroughly washed using THF, ethanol, 2-propanol, and water. In order to check for the successful alkylation of 2-dimensional hBN, thermogravimetric analysis coupled with mass spectrometry (TG-MS) and FTIR were used to characterize the products from the functionalization reaction (FIGS. 9A-B). The functionalized 2-dimensional hBN samples are heated from room temperature to 800° C. under a flow of argon and the thermally detached species pass through a mass spectrometer for identification (FIG. 9A). The TGA profile of the hexyl functionalized 2-dimensional hBN show a mass loss step in the region of 350-450° C. The step can be attributed to the cleavage of the hexyl chain from the hBN. This observation is also corroborated by FTIR study of the functionalized 2-dimensional hBN sheets as indicated in FIG. 9B. In this material, the IR active modes at 2929 and 2887 $cm^{-1}$ are assigned to the hexyl C—H vibrations.

Example 6: Preparation of Air Stable Additive-Free Dispersions of Fully Exfoliated 2-Dimensional hBN in Water Under ambient atmosphere, the centrifuged exfoliated reduced/negatively charged 2-dimensional hBN solution/dispersion in THF was left exposed to air for 1 min and then added to a volume of deionized water in a glass vial as indicated in FIG. 7A. The vial was left open in a dust-free environment to allow the THF to evaporate at room temperature while stirring gently with a steel needle occasionally to yield a white dispersion of 2-dimensional hBN in water after 2-3 days (FIG. 7A). Different concentrations of 2-dimensional hBN in water were obtained by varying the amount of 2-dimensional hBN dispersion in THF added to the water.

The dispersions were characterized using absorption spectroscopy and zeta potential measurements. Deposits of 2-dimensional hBN were obtained by dip coating, spin coating and vacuum filtration on different substrates such as silicon, oxidized silicon surface ($SiO_2$), glass, quartz, or freshly cleaved mica. The deposits of 2-dimensional hBN flakes on different substrates were characterized by AFM, STM, optical microscopy, XPS, HRTEM, and Raman spectroscopy, all evidencing deposition of high quality efficiently exfoliated 2-dimensional hBN sheets.

Figure 7B:
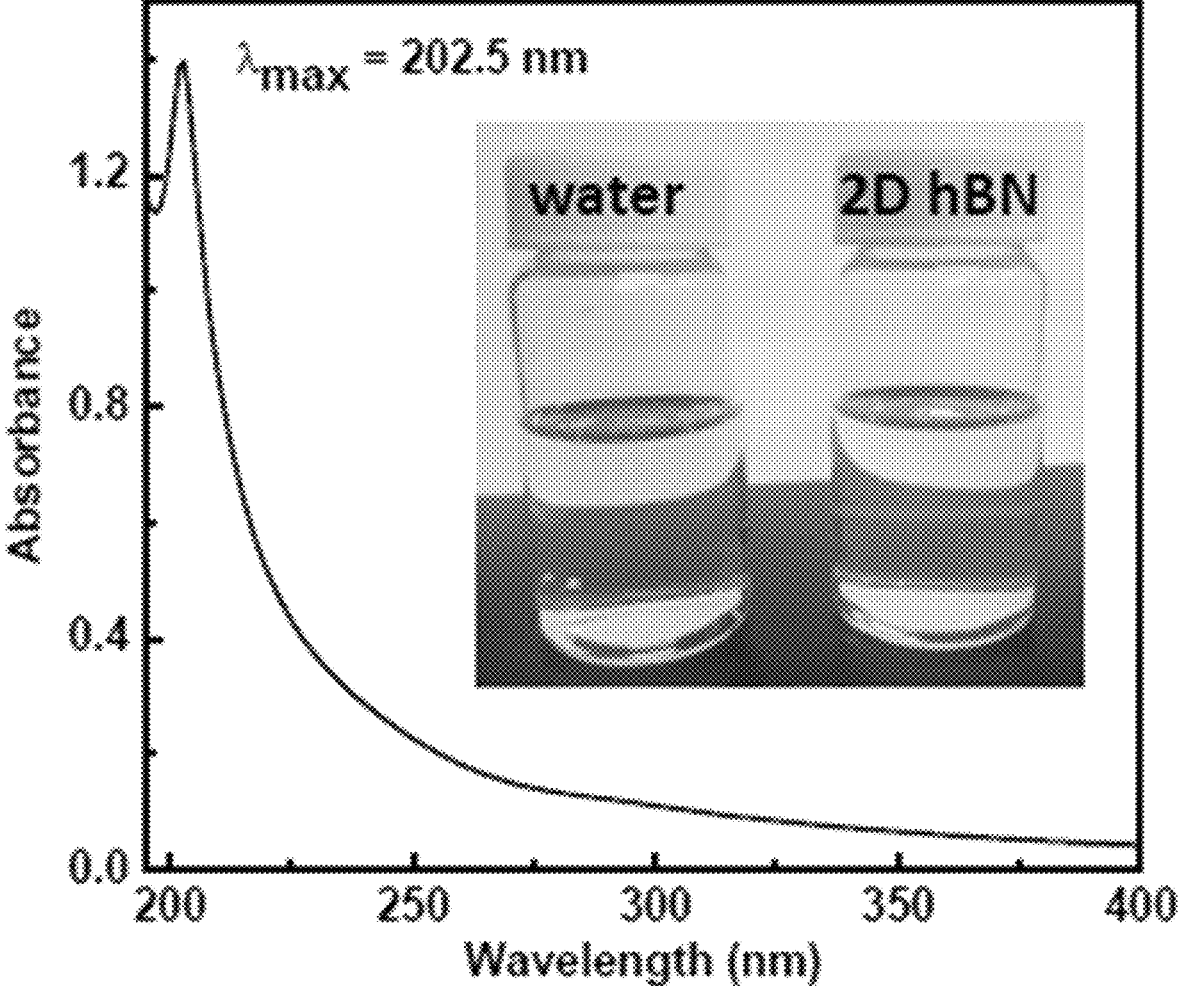
FIG. 7B is UV-vis absorption spectrum of a dilute dispersion of 2-dimensional hBN sheets in water, showing an absorption peak at 202.5 nm, the exact wavelength reported for the absorption of a single layer of hBN on a substrate. Inset: laser light goes through water unscattered (left), whereas a dilute 2-dimensional hBN dispersion in water (right) shows the Tyndall effect from the light scattered by large 2-dimensional hBN flakes.
Figure 7C:
FIG. 7C is a photograph of reduced 2-dimensional hBN and platinum II chloride solution in THF before mixing.
Figure 7D:
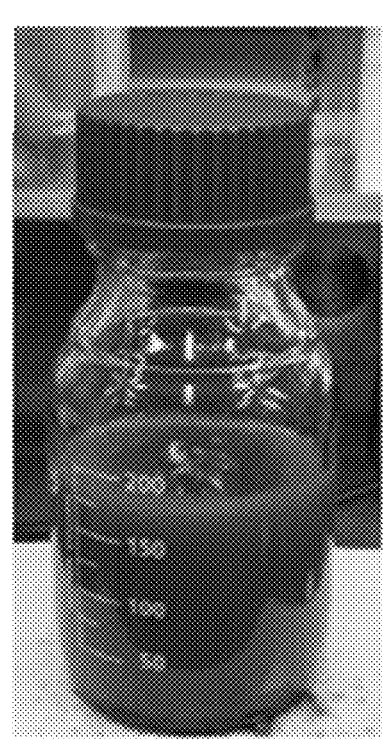
FIG. 7D is a photograph of a suspension of 2-dimensional hBN-supported Pt NPs.

When the solutions/dispersions of reduced/negatively 2-dimensional hBN in (THF) are exposed to air, and then mixed with water and the organic solvent evaporated off (as illustrated in FIG. 7A, remarkably stable additive-free aqueous dispersions of 2-dimensional hBN sheets obtained. The UV-vis absorption spectrum of 2-dimensional hBN in water shows an absorption peak at 202.5 nm (6.12 eV) (FIG. 7B), the exact wavelength reported for the absorption of a single layer of hBN on a quartz substrate. In the inset in FIG. 7B, a laser light goes through the water unscattered (right), whereas a 2-dimensional hBN dispersion (left) shows the Tyndall effect from the light scattered by large 2-dimensional hBN flakes.

Figure 8A:
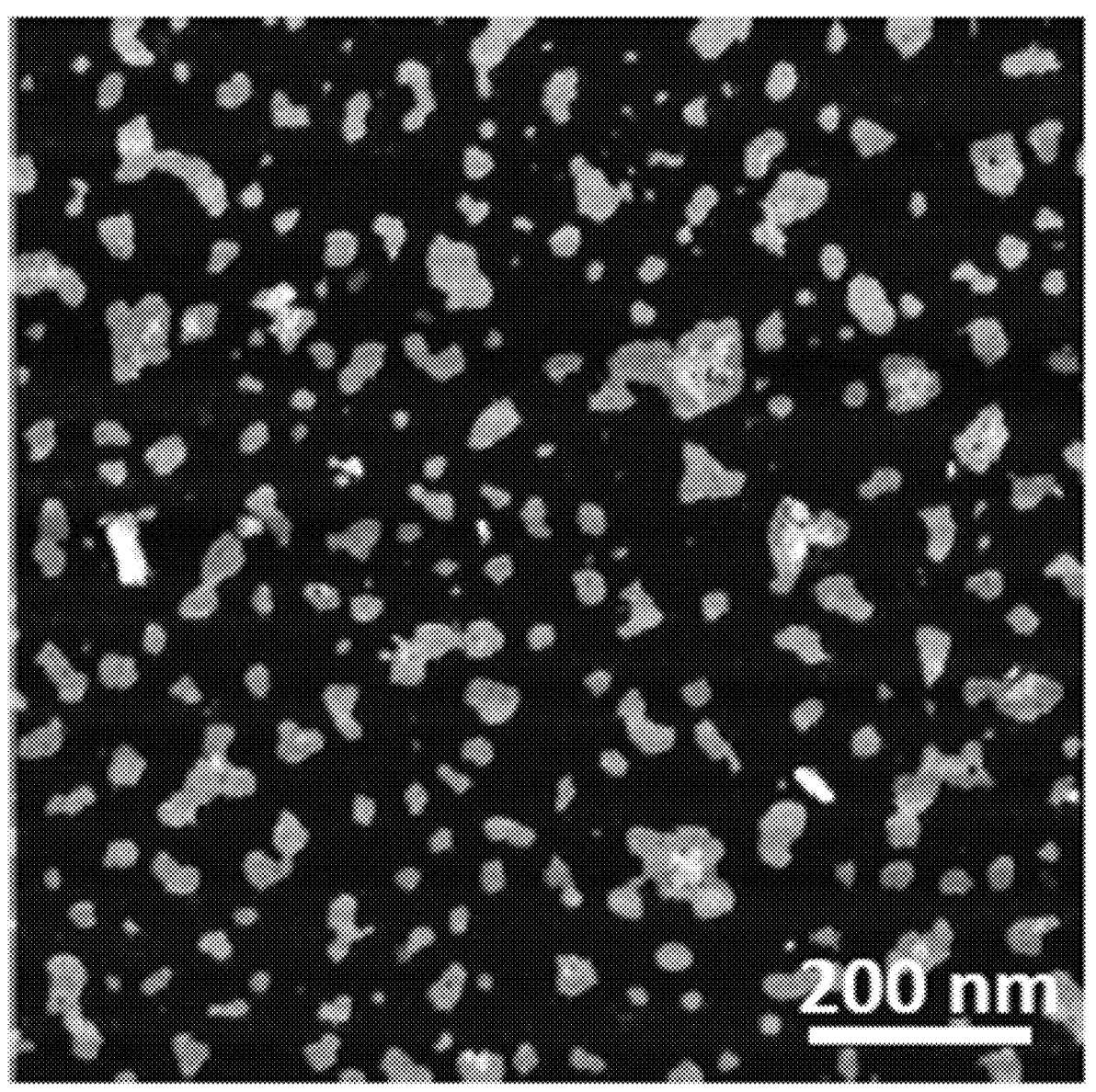
FIG. 8A is a characterization of deposits from dispersions of 2-dimensional hBN in water (deposits were made by dip coating and drop casting) showing topographic images on mica by AFM show the homogeneous thickness of the deposited 2-dimensional hBN flakes.
Figure 8B:
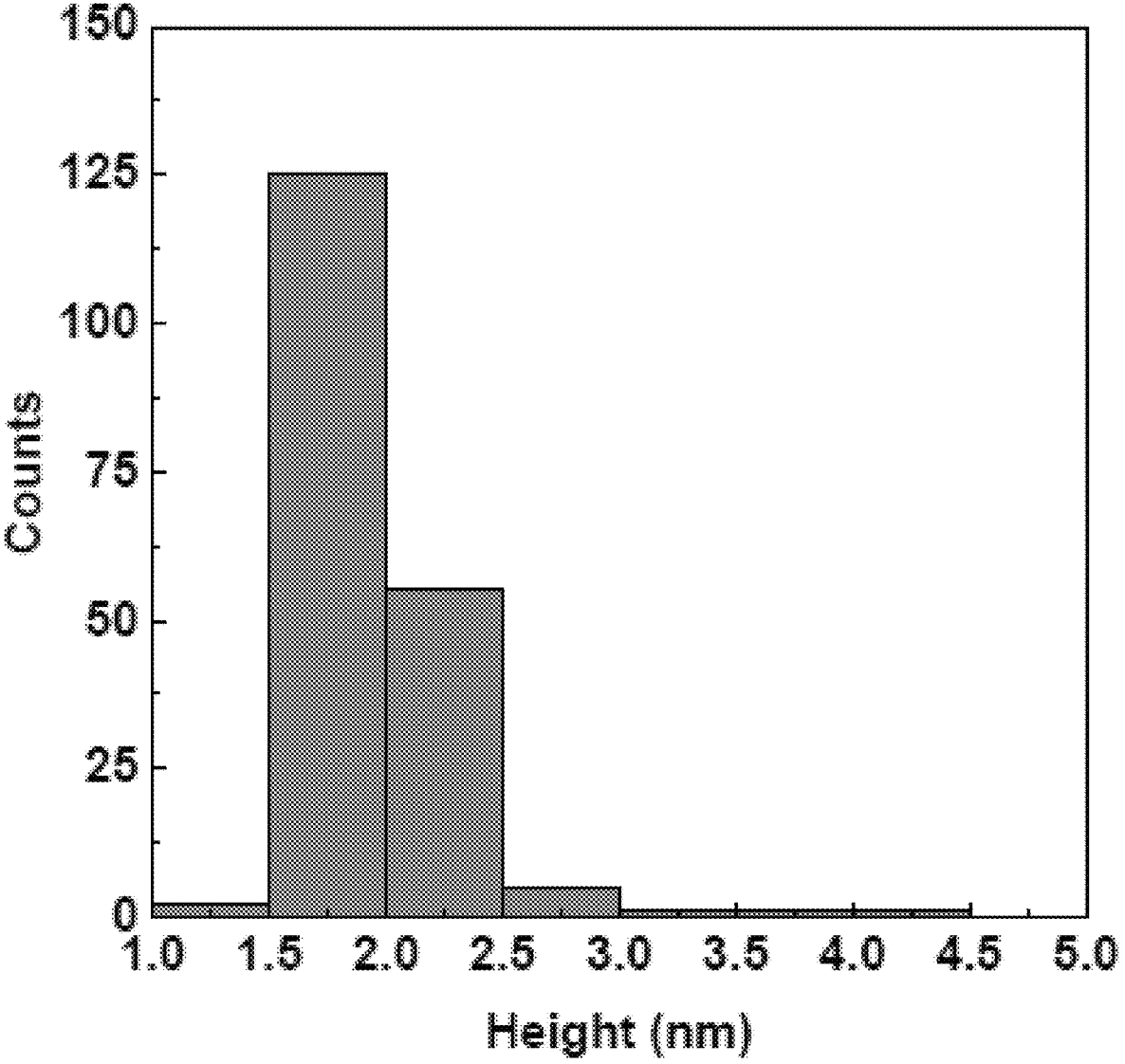
FIG. 8B is a histogram of the thickness distribution of 2-dimensional hBN deposits.
Figure 8C:
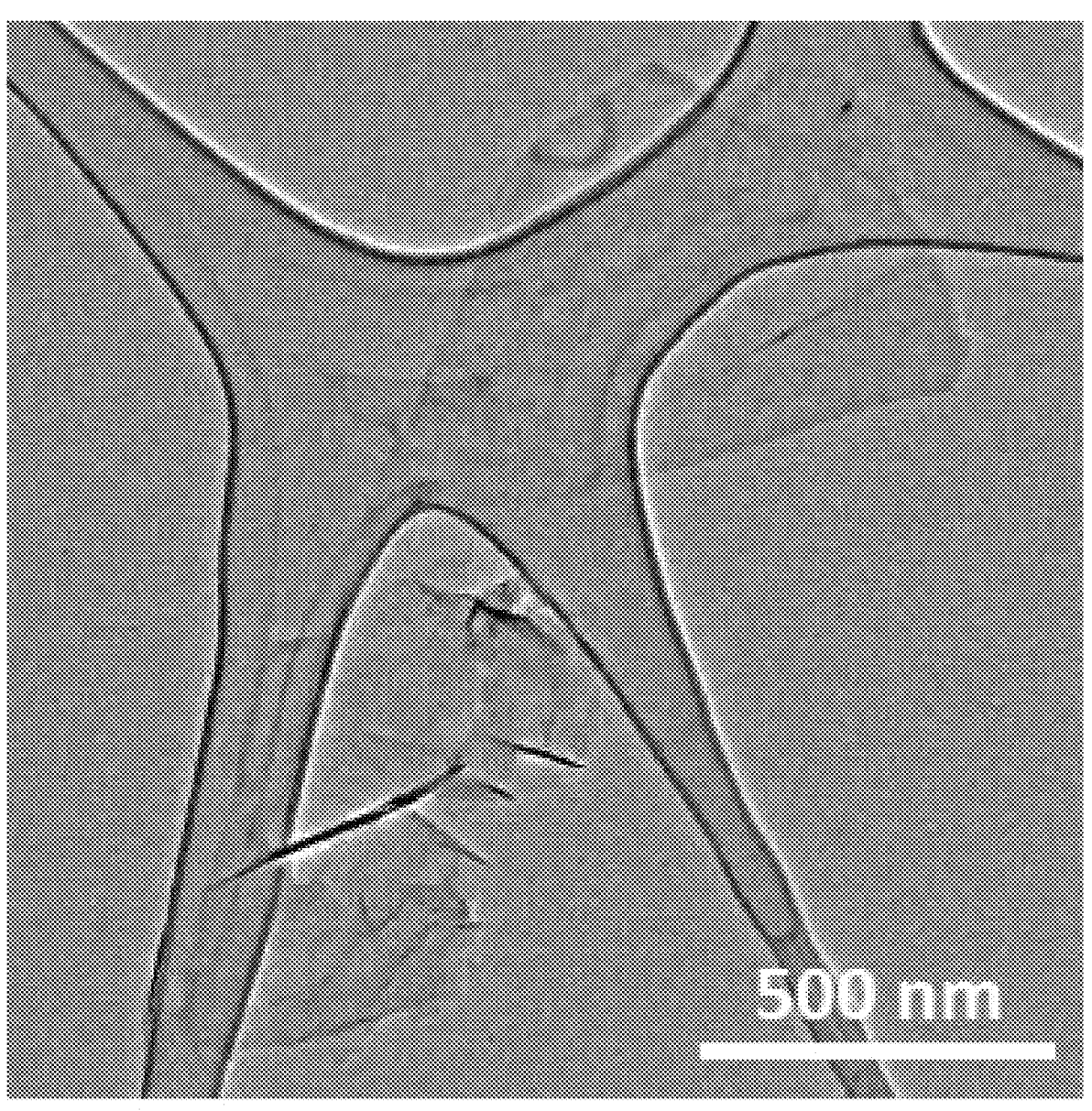
FIG. 8C is a TEM micrograph of a flake deposited from the dispersion of hBN in water over the TEM grid.
Figure 8D:
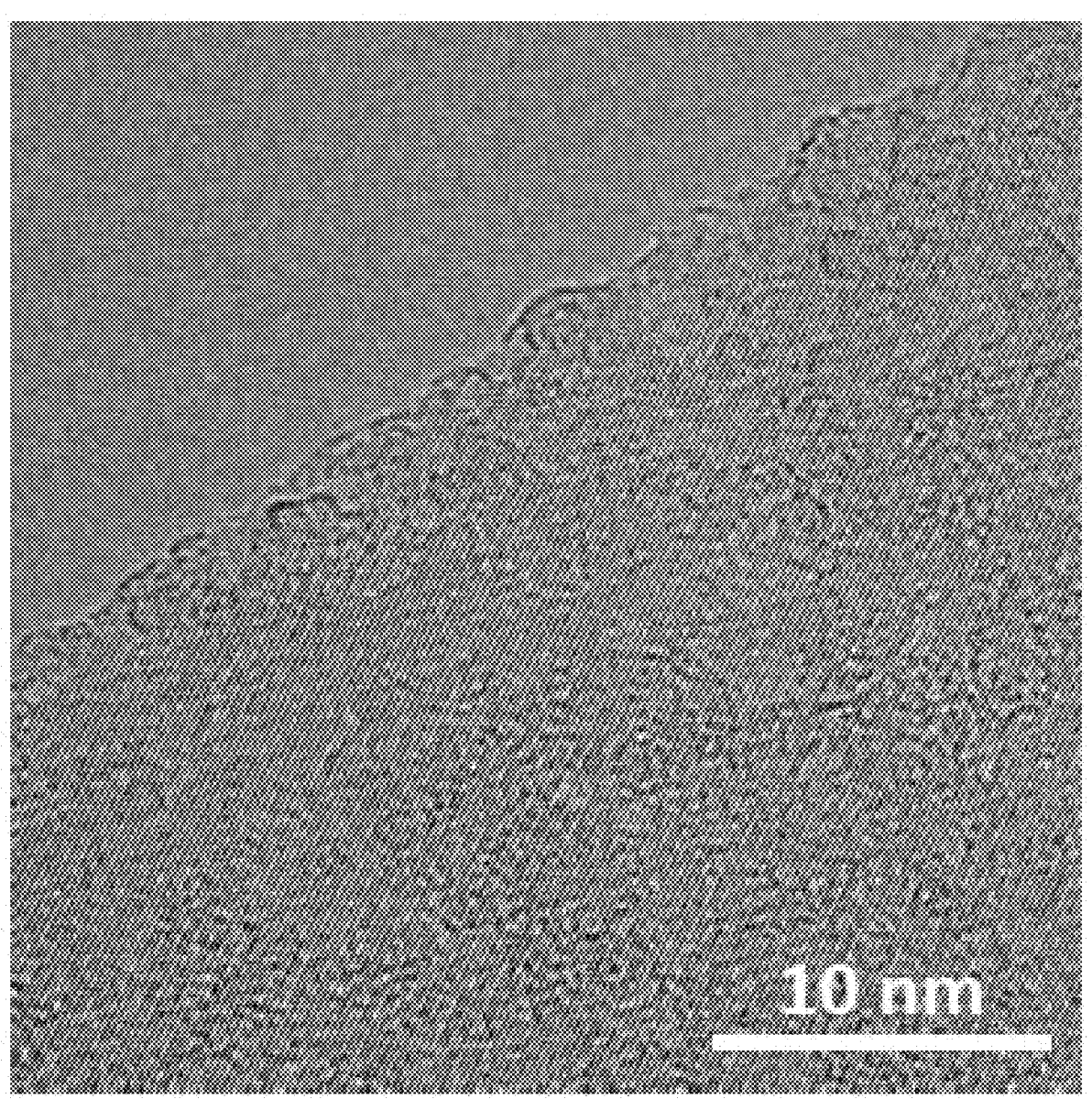
FIG. 8D is a HRTEM micrograph of an edge of a monolayer hBN flake.
Figure 8E:
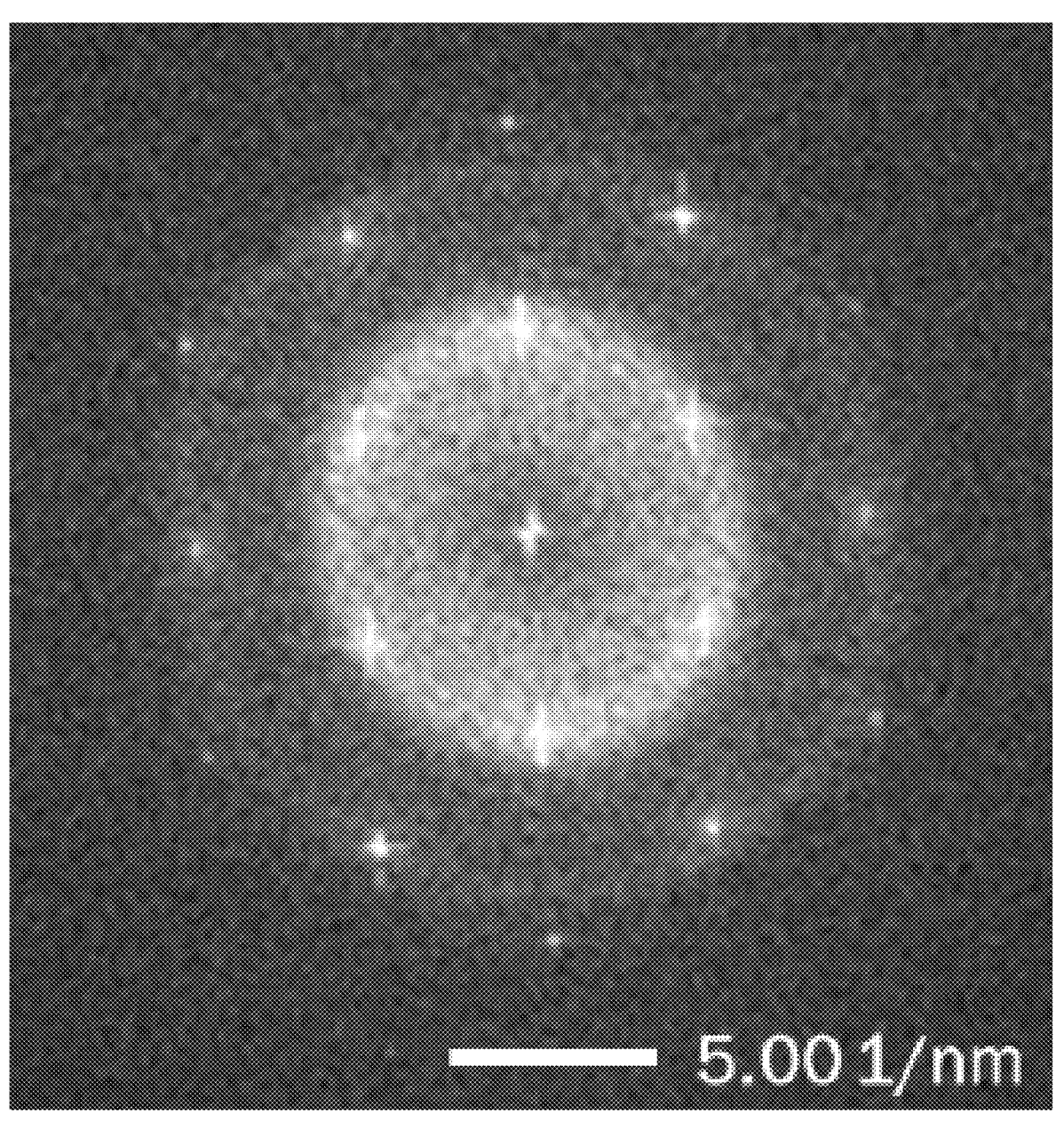
FIG. 8E is electron diffraction taken on a flake revealing the hexagonal lattice pattern of an hBN monolayer flake.
Figure 8F:
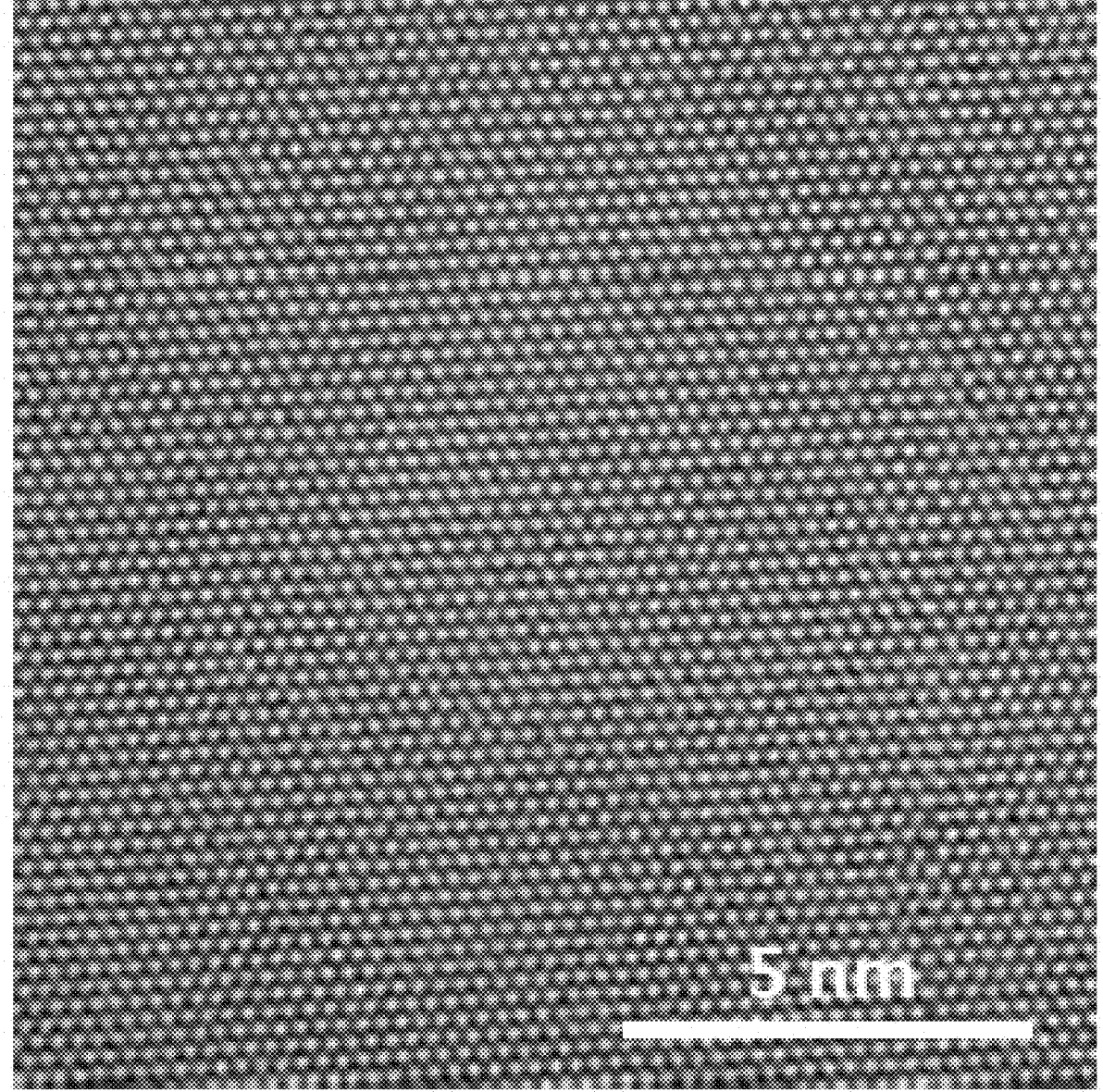
FIG. 8F is atomic-resolution TEM image of a defect free hBN monolayer flake.

FIG. 8A shows topographic images on mica measured using AFM. Thin flakes with uniform thickness are consistently obtained. Statistical analysis on the image in FIG. 8A was performed on 190 flakes, yielding a mean (number) thickness of 1.6 nm and a thickness distribution of 1 to 6 hBN layers. High resolution transmission electron microscopy (HRTEM) was performed to characterize the microscopic structures of the exfoliated 2-dimensional hBN sheets. FIG. 8C reveals the crumpled geometry of a 2-dimensional hBN flakes after deposition. The uniformity of this TEM image contrast is evidence of efficient and homogeneous exfoliation. HRTEM image of a monolayer edge is shown in FIG. 8D. The fast Fourier transform (FFT) in FIG. 8E displays a distinctive six-fold-symmetry pattern from the hBN structure, confirming the retention of high crystallinity in the nanosheets after the chemical intercalation driven exfoliation. FIG. 8F shows an atomic-resolution image taken from the surface of 2-dimensional hBN sheet with clearly visible hexagonal arrangement of boron (B) and nitrogen (N) atoms, suggesting the h-BN of monolayer to a few layers.

Example 7: Preparation and Characterization of 2-Dimensional hBN-Supported Metal Nanoparticle and Metal Oxide Nanoparticle Composites Under inert atmosphere, 150 mg of K-intercalated hBN powder was dispersed in 150 ml of dry THF (1 mg/mL) contained in a 250 ml glass bottle, and this mixture (a black suspension) was tightly sealed and mixed with a magnetic stirrer (600 revolutions per minute (r.p.m.)) as has been described already in example 5. As the mixing continued, the black suspension changed color from black, to deep blue, then sky blue after about 6 hours. The color changes are related to the charge on the hBN flakes and the exfoliation taking place. At this point the stirring was stopped and the suspension was left to stand for an hour to allow undissolved hBN aggregates to form and settle at the bottom. The well dispersed sky blue reduced/negatively charged 2-dimensional hBN dispersion in THE was extracted with a pipette and placed in another 250 mL bottle. Afterwards, a metal chloride solution dissolved in 20 mL of absolute THF was added dropwise to the reduced/negatively charged 2-dimensional hBN suspension in THF. The mixture of the reduced/negatively charged 2-dimensional hBN suspension in THF and metal salt was tightly capped and left stirring on a magnetic stirrer for 24 hours. The 2-dimensional hBN-supported metal nanoparticles and metal oxide nanoparticle composites were precipitated and thoroughly washed using THF, ethanol, 2-propanol, and water. The resulting composite materials were dried under vacuum at room temperature for 36 hours. Chlorides of Pt, Ru, Fe, Ni, Co, Ag, Cu were investigated and yielded 2-dimensional metal nanoparticles or metal oxide nanoparticle composites. The 2-dimensional hBN-supported metal nanoparticle and metal oxide nanoparticle composites produced combined a highly chemically stable and thermally stable 2-dimensional hBN support with active metal nanoparticles and metal oxide nanoparticles with potential use in different catalytic reactions.

Figure 10A:
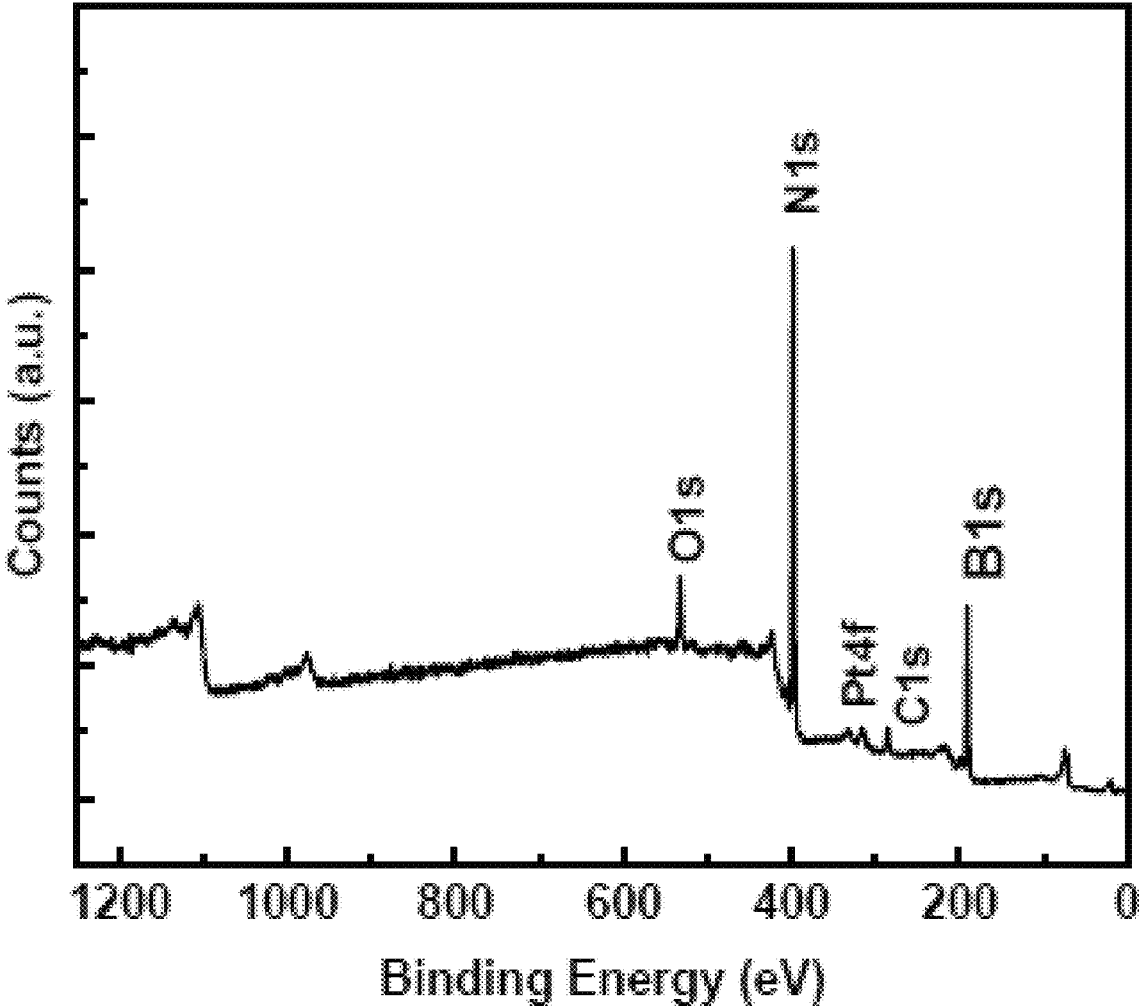
FIGS. 10A-10E show characterization of the chemical and structural properties of the 2-dimensional hBN-supported metal nanoparticles. XPS spectra of 2D hBN-supported platinum metal nanoparticle composite (FIG. 10A) survey, (FIG. 10B) B1s, (FIG. 10C) N1s, and (FIG. 10D) Pt4f.
Figure 10B:
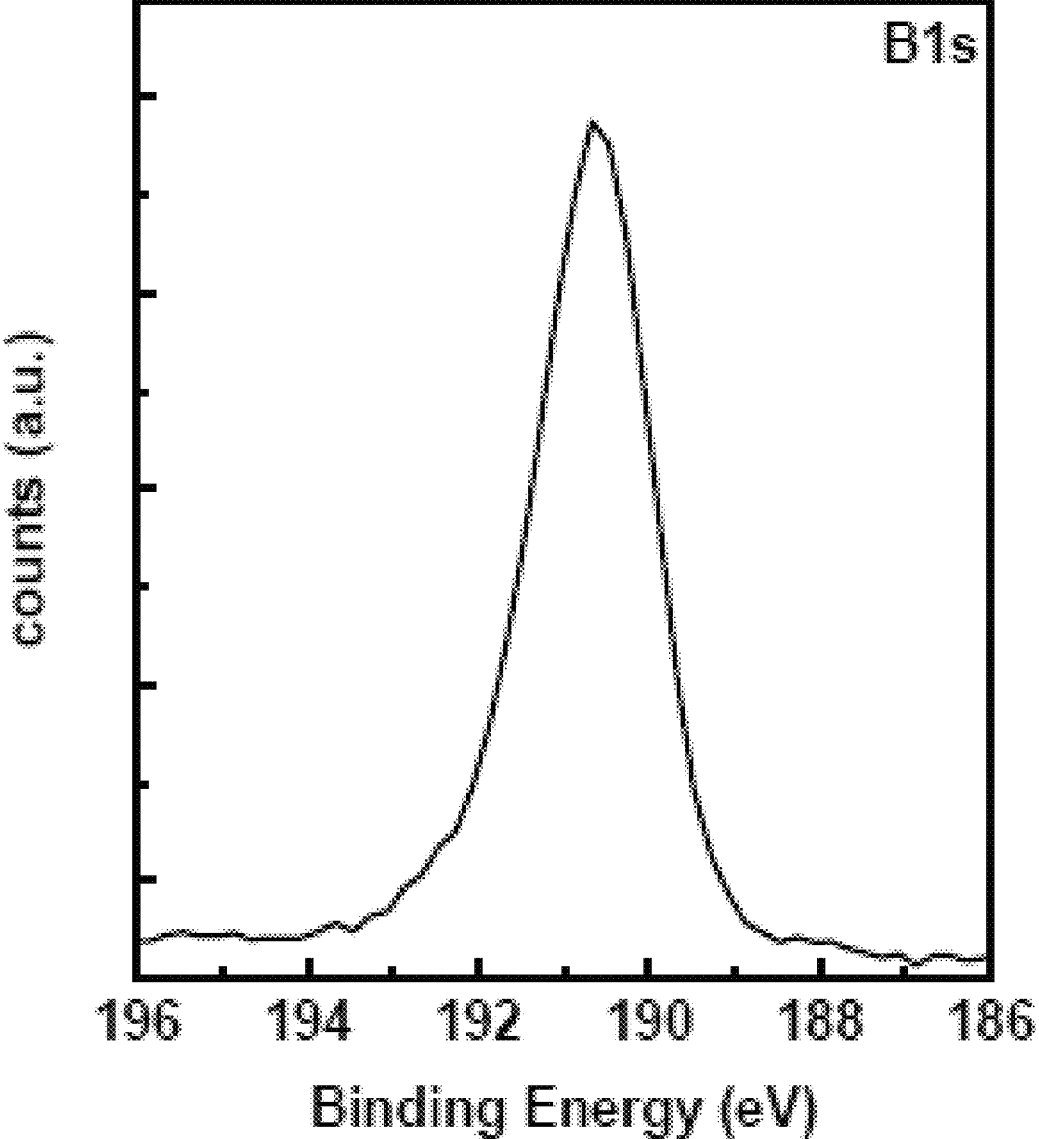
Figure 10C:
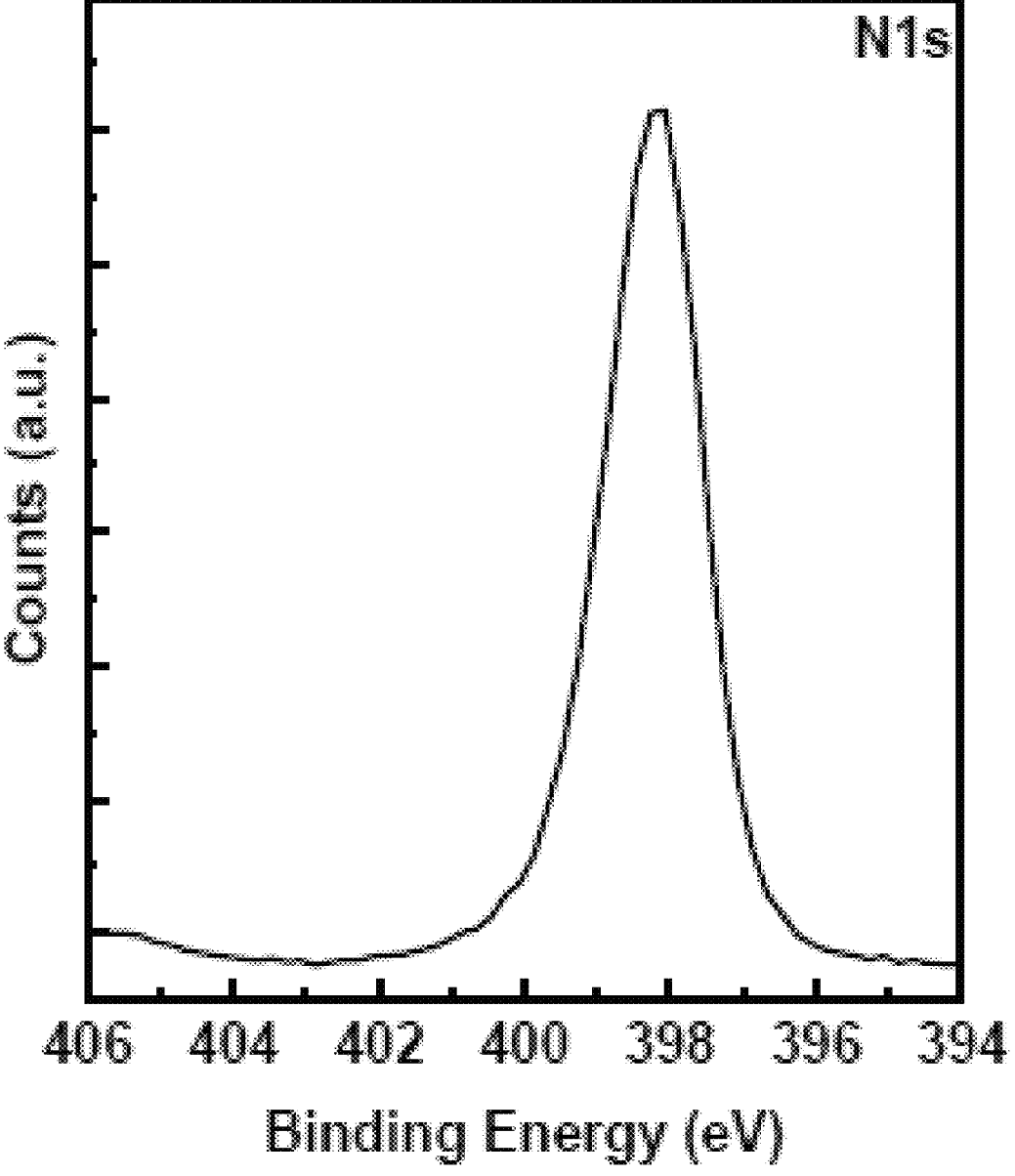
Figure 10D:
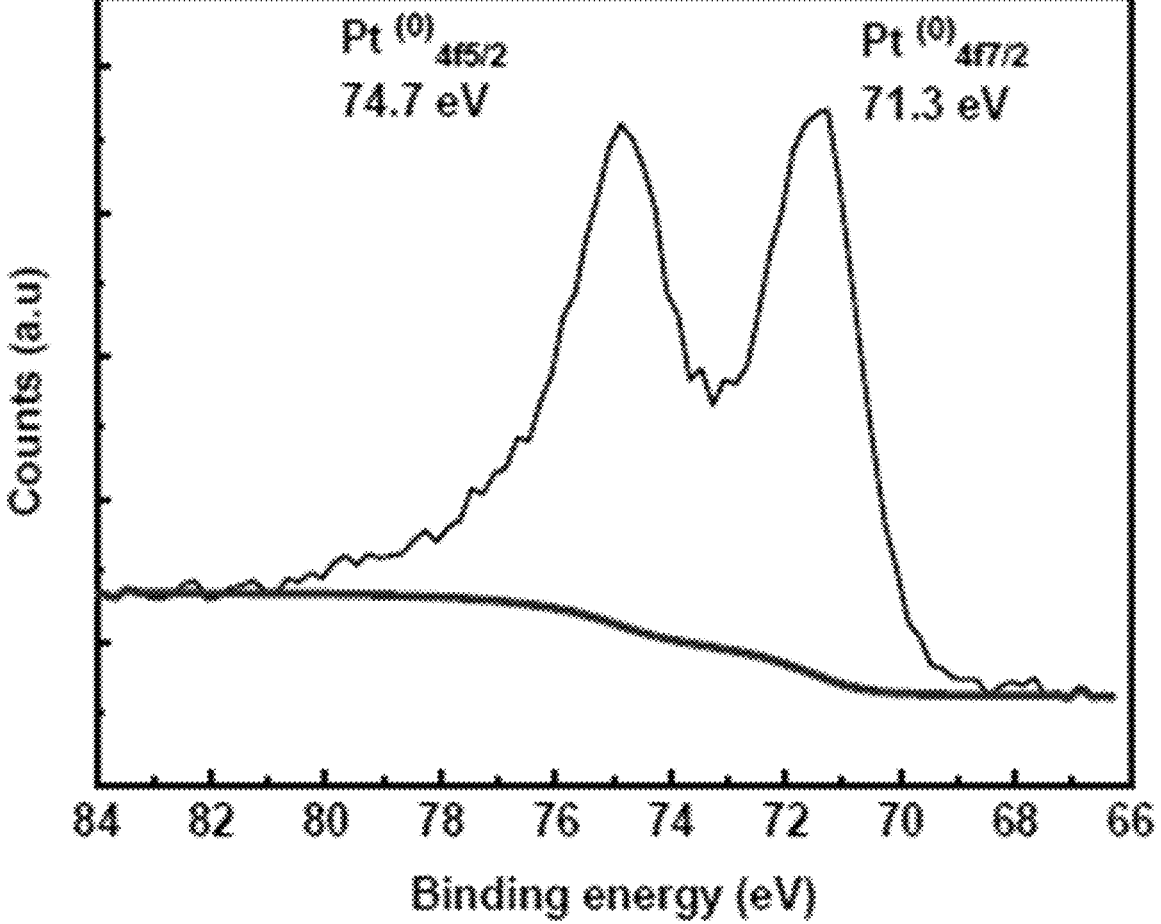
Figure 10E:
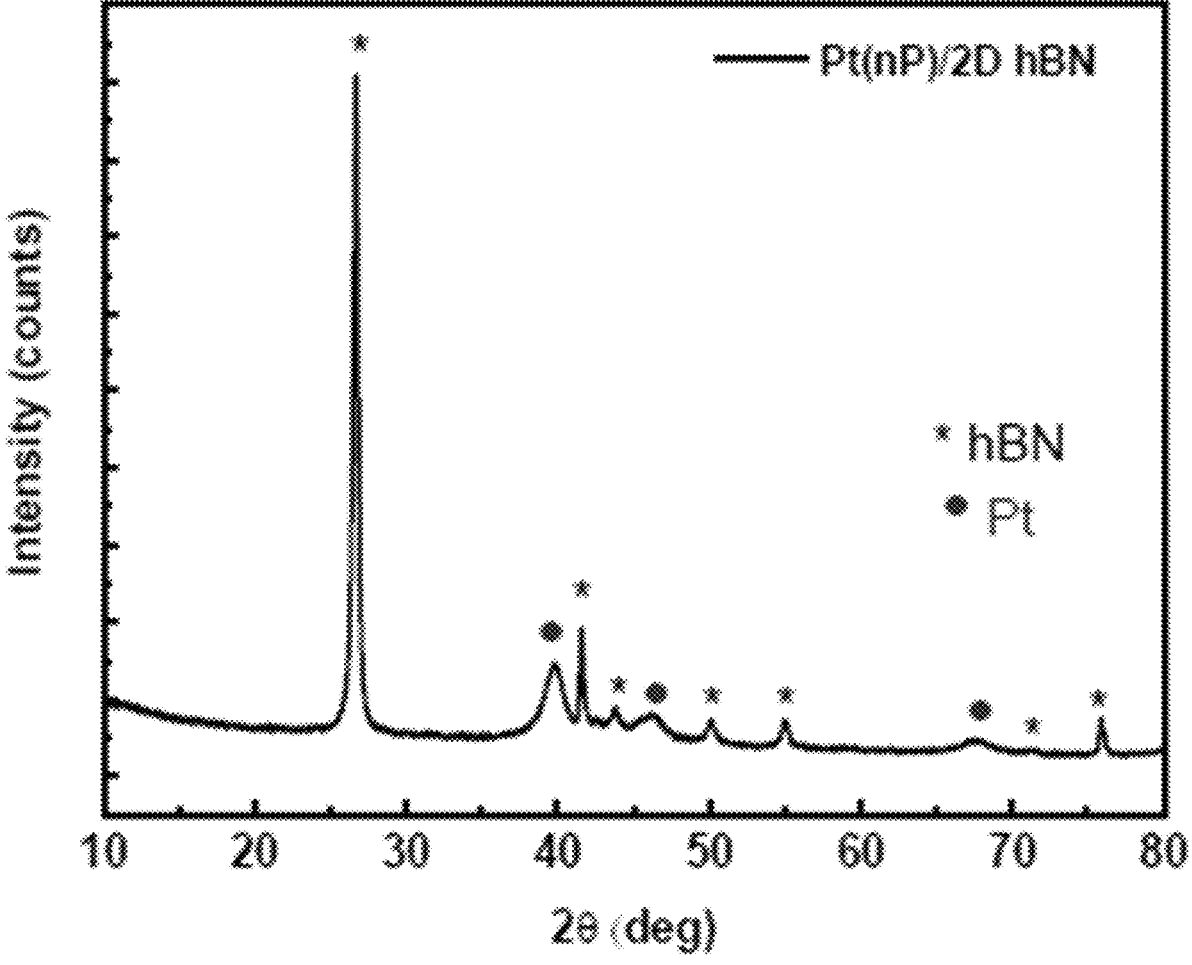

FIG. 7A shows that the synthesis of 2-dimensional hBN-supported metal and metal oxide nanoparticles composites involves the reduction of metal salts by the reduced/negatively charged dispersions of 2-dimensional hBN in THF. The presence of metal or metal oxide in the 2-dimensional hBN-supported metal nanoparticle and metal oxide nanoparticle composites was investigated by X-ray photoelectron spectroscopy (XPS) measurements as indicated in FIGS. 10A-10F for Pt. The survey scan (FIG. 10A) shows that the material is composed of Pt, oxygen, boron, nitrogen and carbon contaminants. High resolution XPS is utilized to determine the atomic percentage of the Pt metal and the chemical nature of the supported metal species. The 2-dimensional hBN-supported Pt nanoparticle composite had a Pt content of between 0.1% and 2.5%. The high resolution XPS spectra of the 2-dimensional hBN-supported Pt nanoparticle composite in the Pt4f region shows the 4f5/2 peak at 74.7 eV and 4f7/2 peak at 71.3 eV indicating that the sample exhibits mainly metallic Pt. The presence of Pt metal nanoparticles was confirmed by XRD measurements. FIG. 10E shows the XRD pattern of the 2-dimensional hBN-supported Pt nanoparticle composite with peaks at 26.1°, 39.9° and 46.5° that can be attributed to the (002) pattern of the 2-dimensional hBN material and the (111) and (200) patterns of metallic nanoparticles respectively.

Figure 11A:
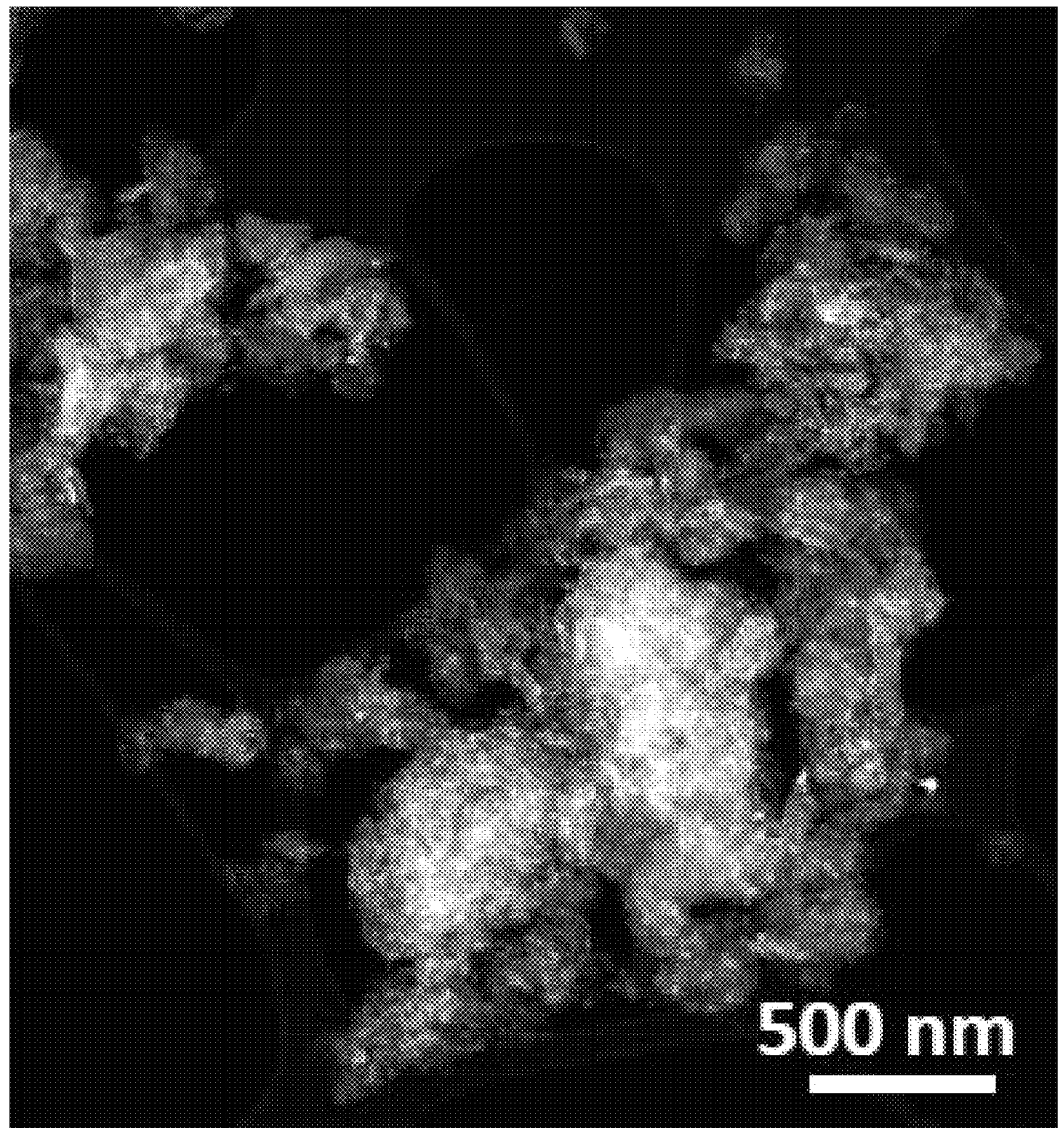
FIGS. 11A-11F shows characterization of the morphology and size of the 2-dimensional hBN-supported metal nanoparticle composites.
Figure 11B:
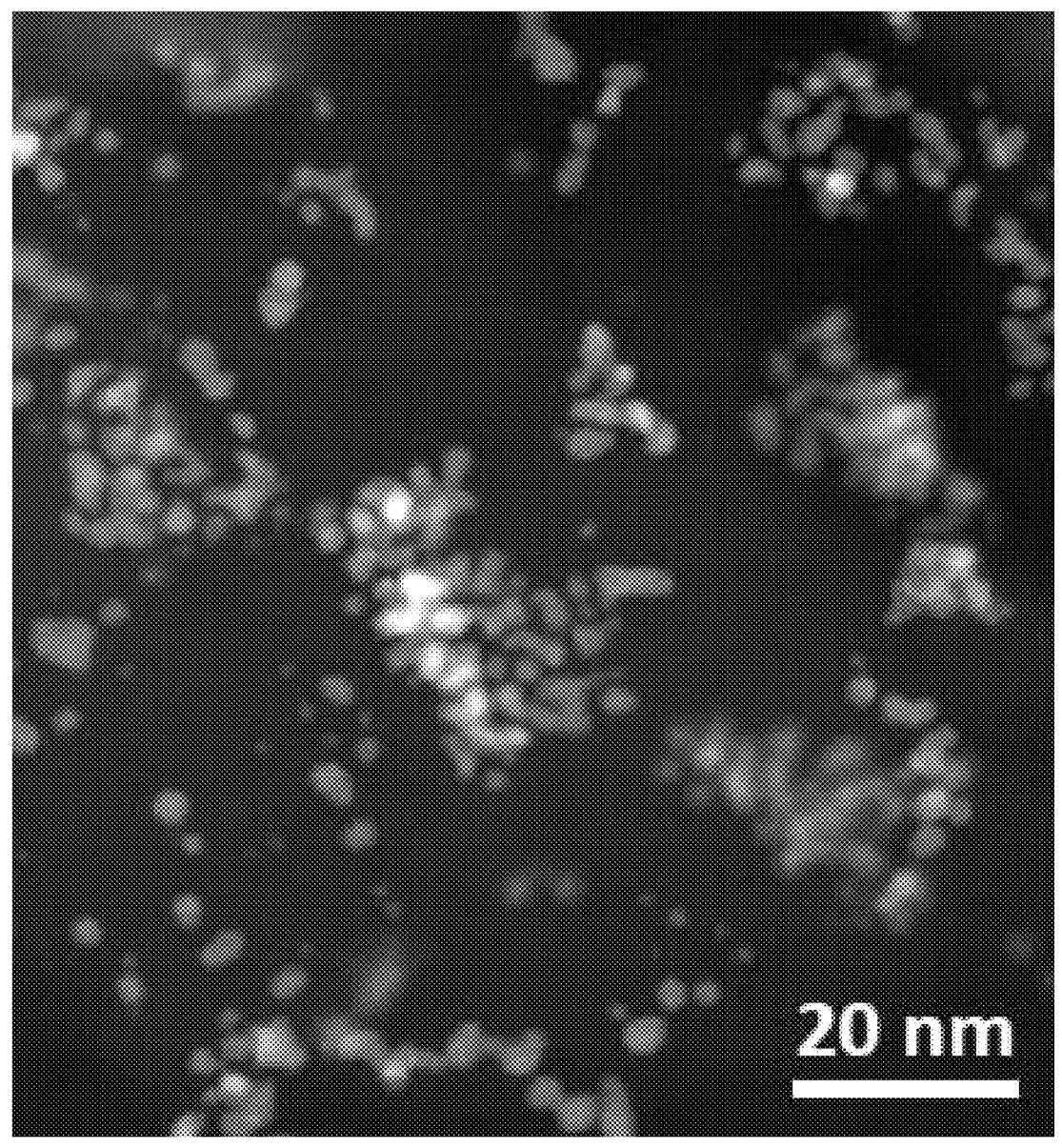
Figure 11C:
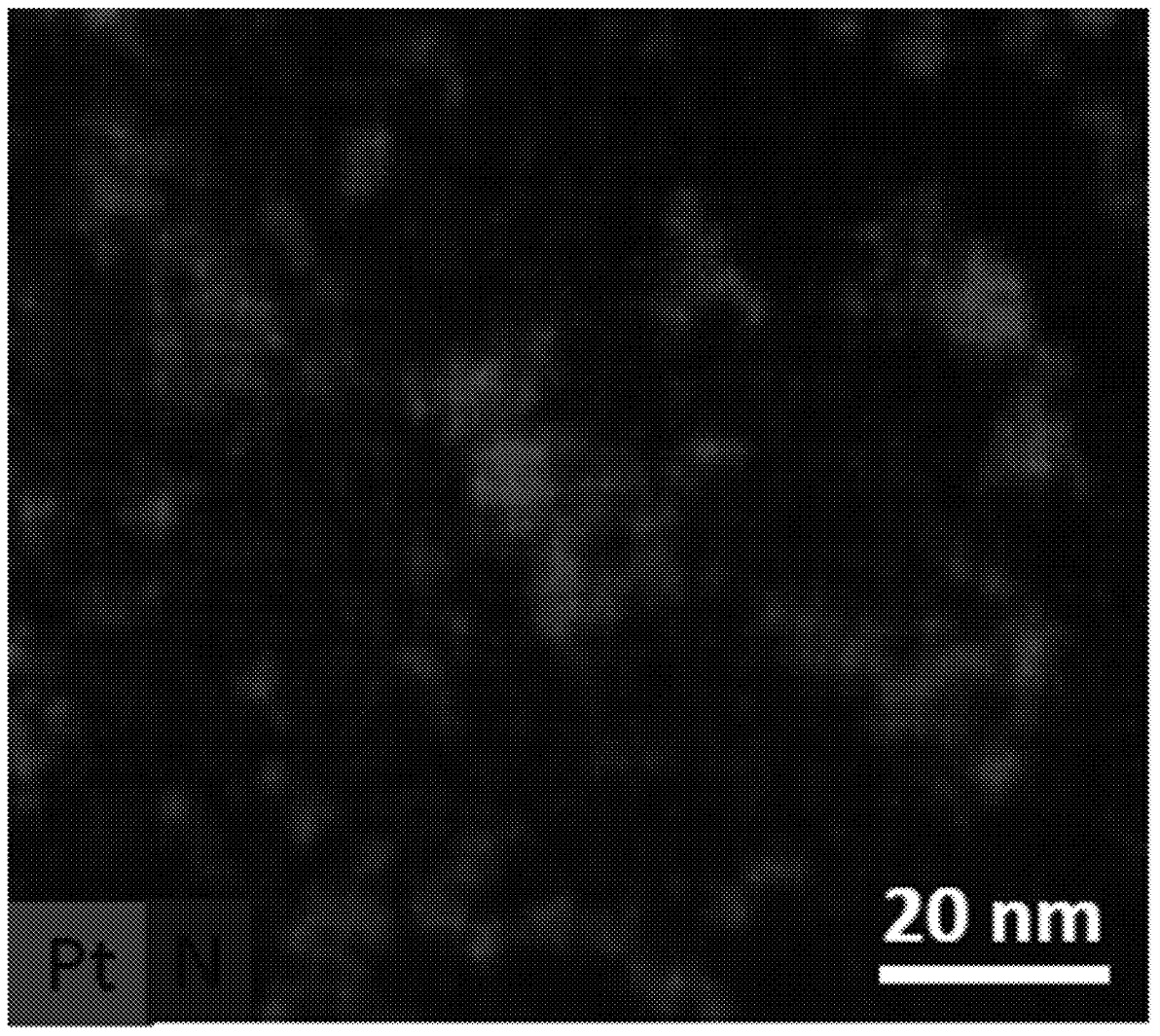
Figure 11D:
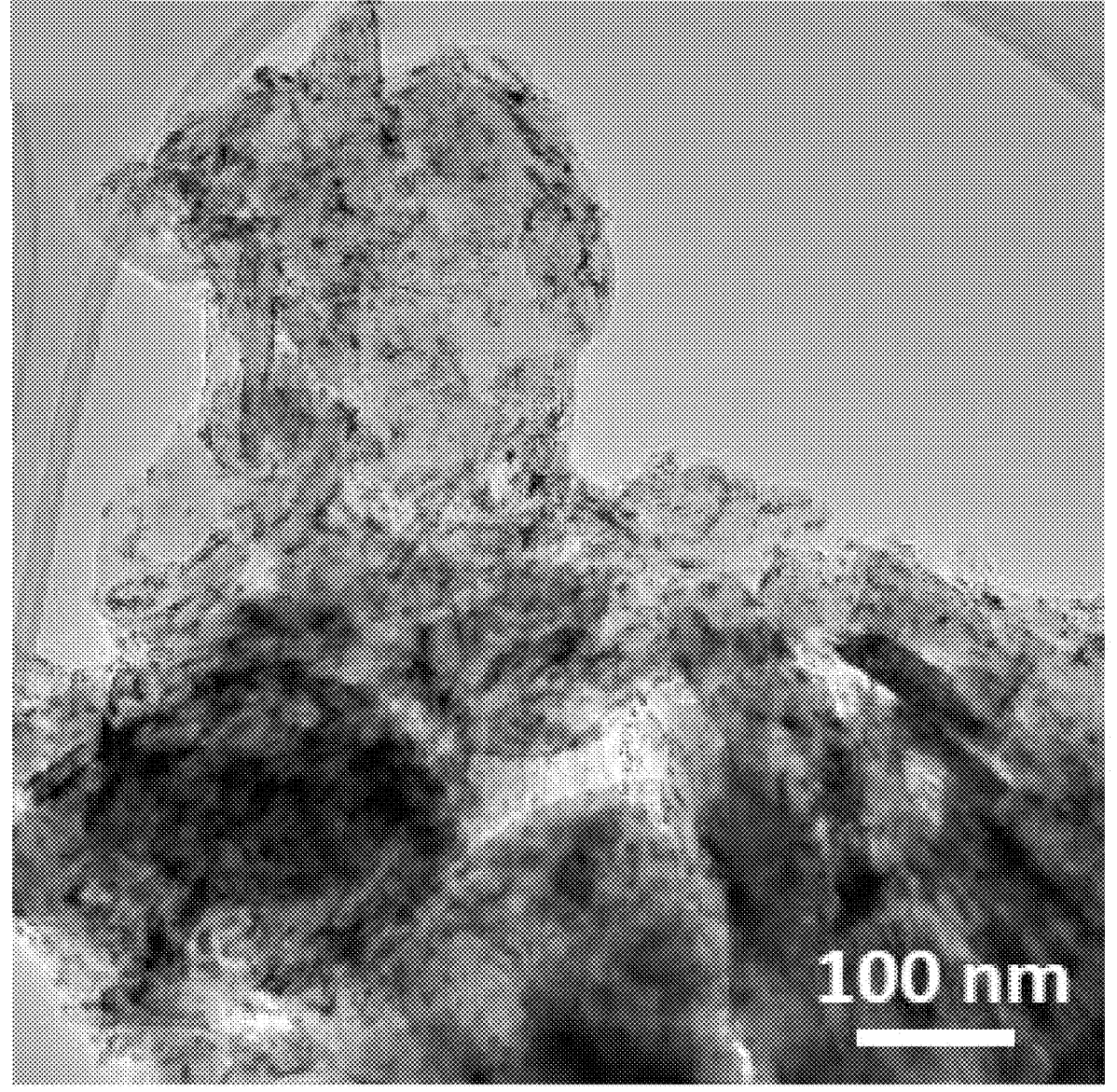
Figure 11E:
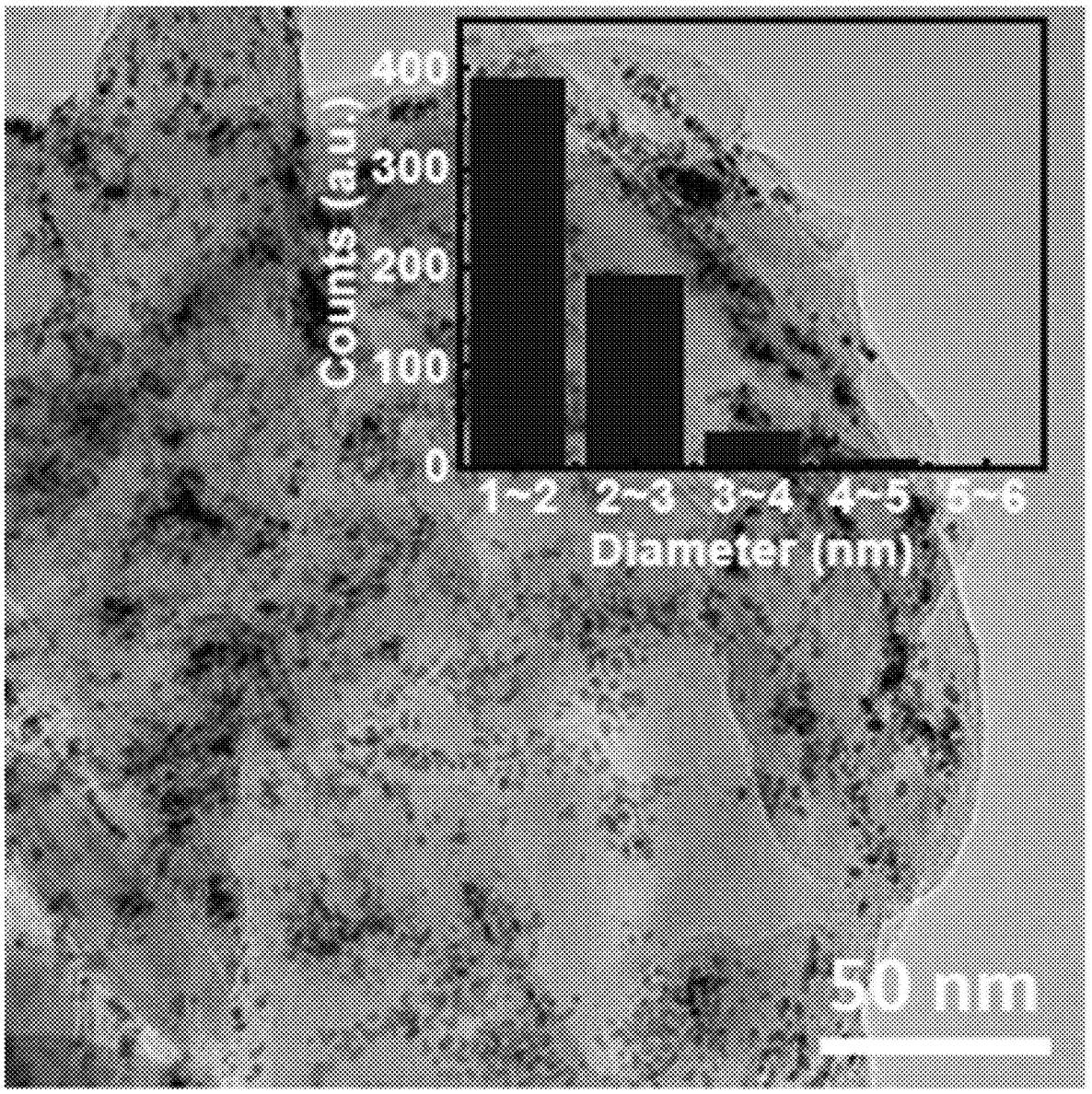
Figure 11F:
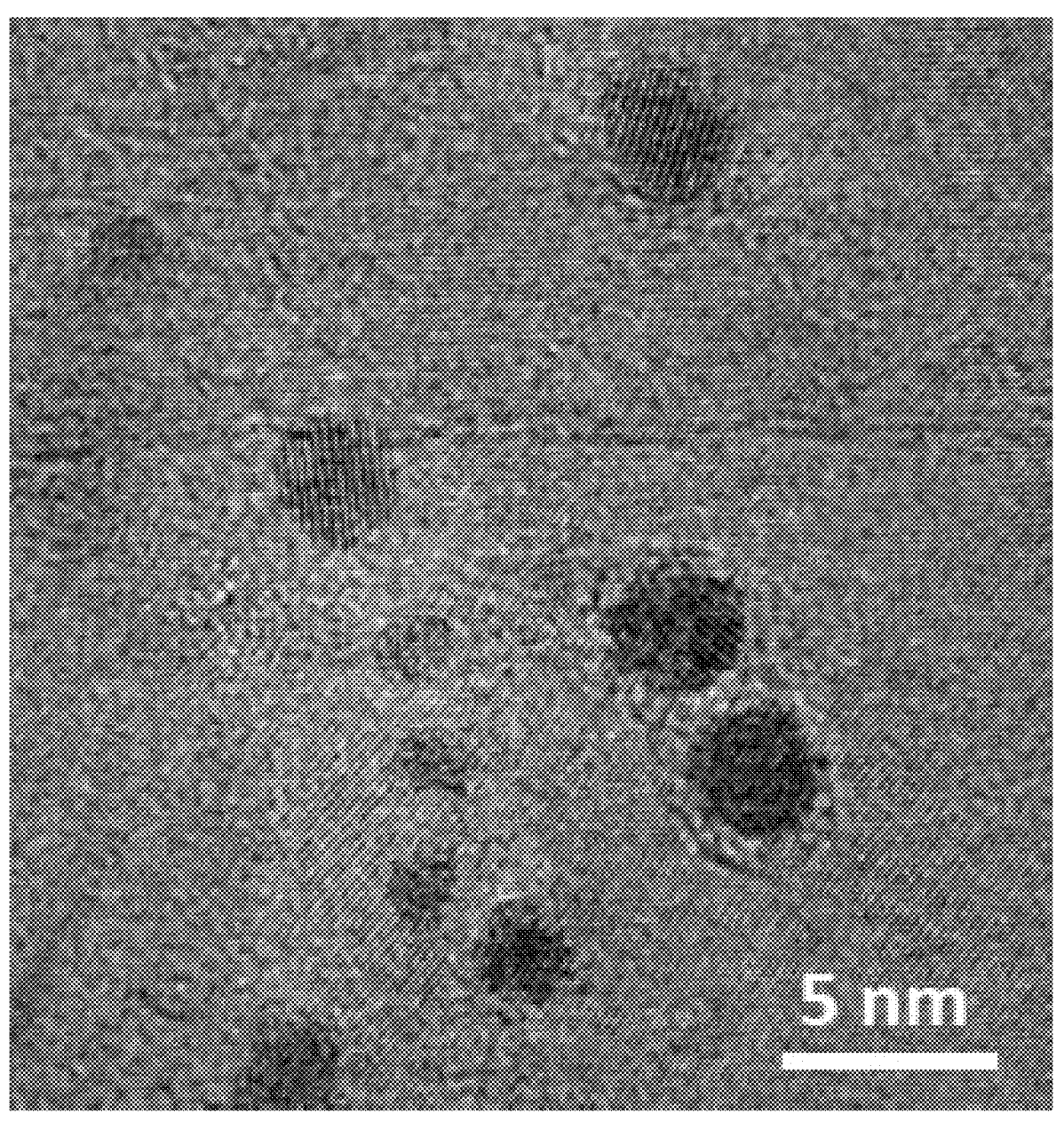

More information about the morphology and the sizes of the 2-dimensional hBN-supported Pt nanoparticle composites were obtained using STEM, HR-STEM/EDX mapping, TEM, and HRTEM. In FIGS. 11A-B the 2-dimensional hBN flakes and Pt nanoparticles can clearly be identified using STEM and HR-STEM. The chemical nature of these materials was studied in more detail by HR-STEM/EDX mapping from the platinum, and nitrogen edge (FIG. 11C). The nitrogen edge is depicted in blue, whereas the platinum edge is depicted in pink. The spatial distribution of the platinum NPs on the hBN is evident. The platinum nanoparticles are found to be attached to the 2-dimensional hBN flakes, which is crucial to prevent leaching in catalytic applications.

Example 8: Characterization of 2-Dimensional hBN-Supported Pt Nanoparticles as an Electrocatalyst in HER Reaction 25 mg of 2-dimensional hBN-supported Pt nanoparticle composite powder was mixed with 5 mg carbon and 100 µL Nafion, 200 µL DI water, and 800 µL isopropanol. The mixture was then sonicated for 1 h to form a slurry. Then, 5 µL slurry was drop-casted on the glassy carbon electrode (3 mm diameter). Thus, the average loading catalyst and support was 1.61 mg cm$^{-2}$. The electrolyte used for HER measurement is purged 0.5 M $H_2SO_4$ with a graphite rod as the counter electrode and Ag/AgCl (3.5 M NaCl) as the reference electrode using a Versa STAT 4 potentiostat with a rotating electrode system (BASI RDE-2). The scan rate of linear sweep voltammetry (LSV) was 5 mV s$^{-1}$ with iR-compensation, and the working electrode was rotated at 3000 rpm during the LSV tests. To stabilize the electrode surface, open circuit potential (OCP) was monitored before the measurements. The LSV was measured only when the OCP was stabilized. The cycling performance was evaluated by repeating LSV 1000 cycles. The $C_{dl}$ which is proportional to ECSA was determined by CV at different scan rates (10 mV s$^{-1}$, 20 mV s$^{-1}$, 30 mV s$^{-1}$, 40 mV s$^{-1}$, 50 mV s$^{-1}$, 60 mV s$^{-1}$, 70 mV s$^{-1}$, 80 mV s$^{-1}$, 90 mV s$^{-1}$, 100 mV s$^{-1}$) within the non-Faradaic region (64 mV vs RHE).

Figure 12A:
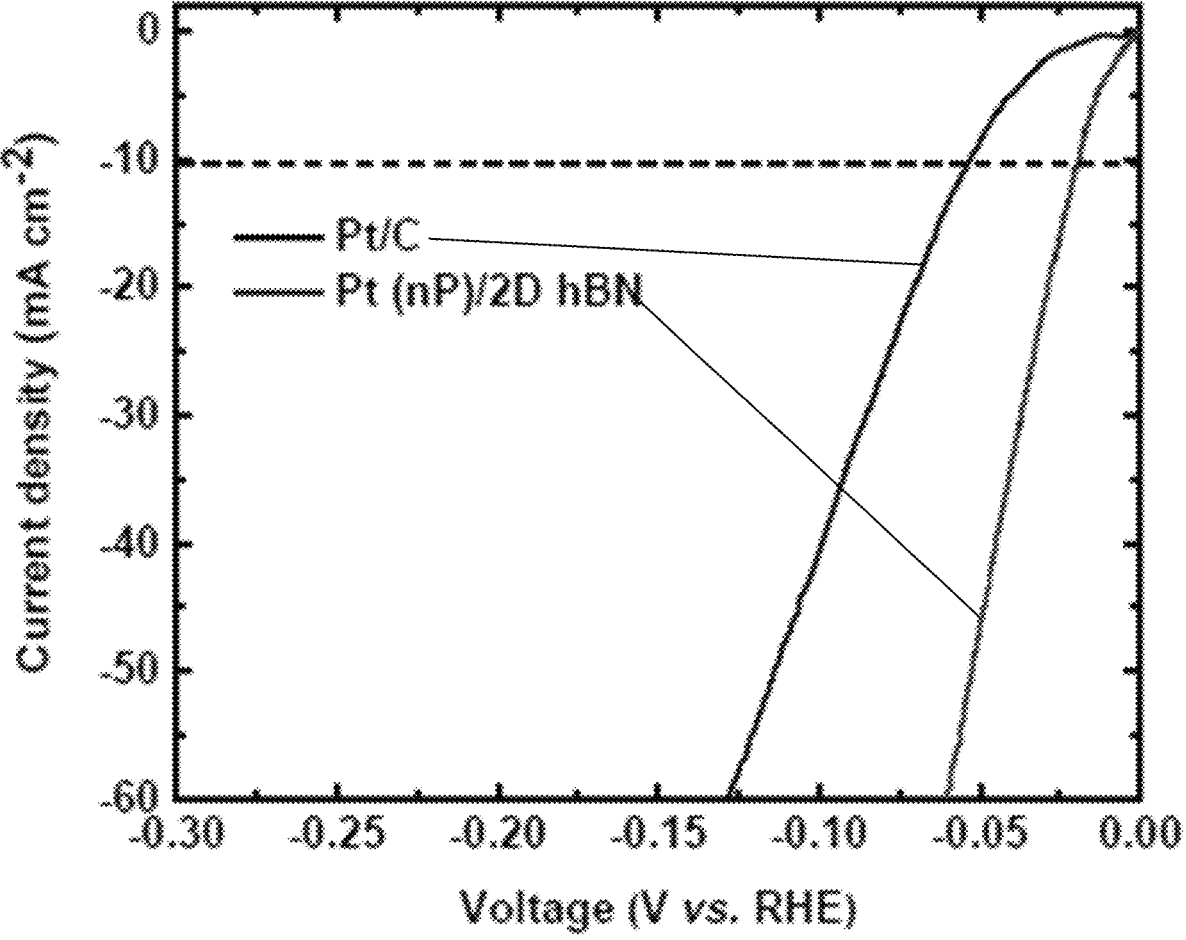
FIG. 12A is electrochemical performance of 2-dimensional hBN-supported Pt NP composite catalyst in the hydrogen evolution reaction compared to commercial Pt/C catalyst showing Linear Sweep Voltammetry (LSV) polarization curves at a scan rate 5 mV s-1.
Figure 12B:
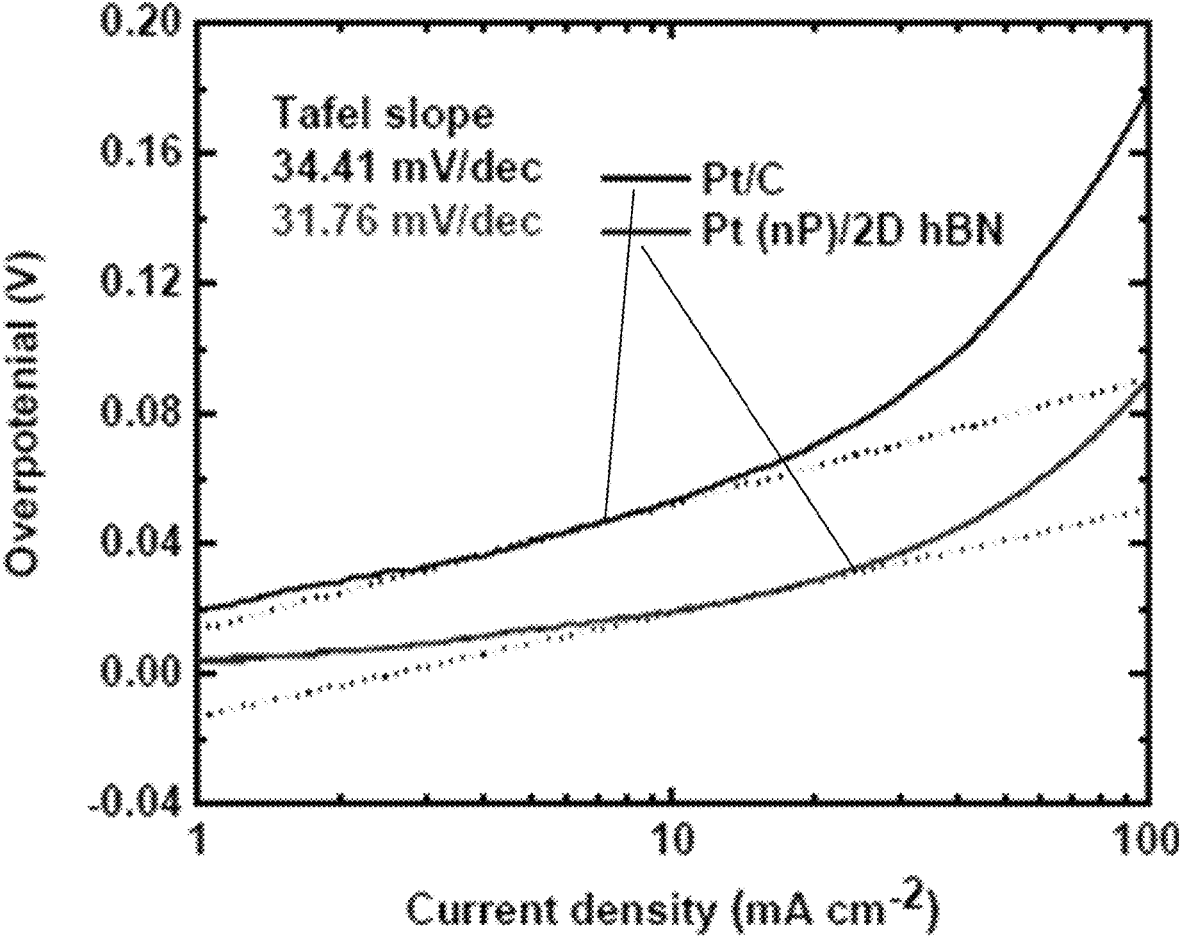
FIG. 12B shows corresponding Tafel plots. The potentials were corrected for electrical potential (iR) drop and calibrated to the reversible hydrogen electrode (RHE).
Figure 12C:
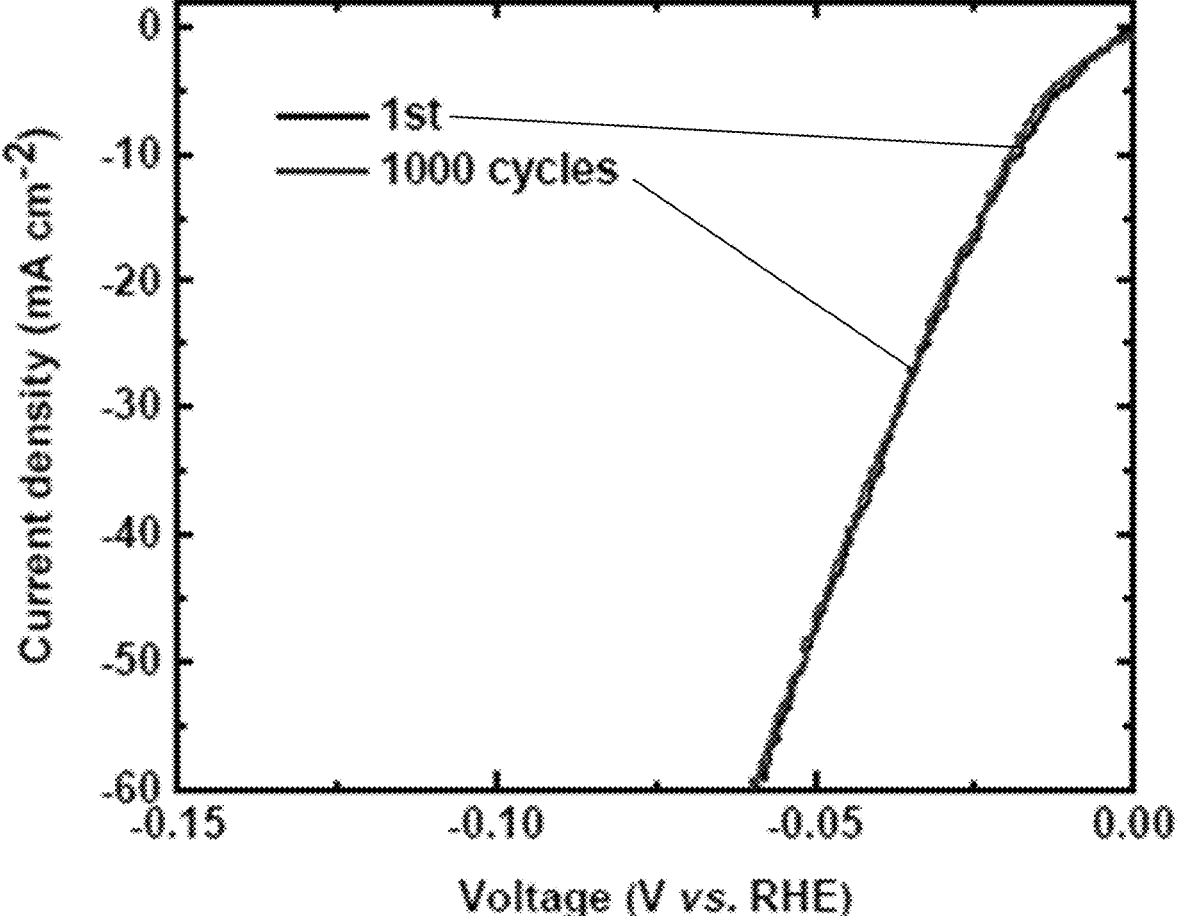
FIG. 12C shows durability measurements of the 2-dimensional hBN-supported platinum NPs composite catalyst, where the polarization curves were recorded at the 1st cycle, and after 1,000 cycles.

Due to the Pt nanoparticle deposition on the 2-dimensional hBN surface, the exposed Pt nanoparticles can serve as the catalytic center for hydrogen evolution reaction (HER) in acidic acid (0.5 $H_2SO_4$). As seen in FIG. 12A, the 2-dimensional hBN-supported Pt nanoparticle composite catalyst show better performance than that of commercial Pt/C electrode, with an onset potential of 19.4 mV at 10 mA cm$^{-2}$ vs. 53.7 mV for the commercial Pt/C catalyst. In addition, the 2-dimensional hBN-supported Pt nanoparticle composite catalyst exhibits the smallest Tafel slope (34.51 mV dec-1), as seen in FIG. 12B. The cycling performance shown in FIG. 12C further confirms the stability of the Pt nanoparticles on 2-dimensional hBN surface, that the performance was not changed after 1000 cycles.

It should be understood that modifications to the embodiments disclosed herein is made to meet a particular set of design criteria. Therefore, while certain exemplary embodiments of the material and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

Example 9: Reductive Intercalation, Exfoliation and Functionalization of Hexagonal Boron Nitride Intercalation of alkali metals into the galleries of layered materials modifies a broad range of physical and chemical properties while also enabling their exfoliation, dispersion and functionalization; these are key steps towards many practical applications of mono- and few-layered systems. However, alkali metal intercalation (and subsequent processing) has been considered impractical for layered insulators because charge transfer into materials with large bandgaps is usually unfavorable. Here we describe a straightforward molten-metal-assisted approach that produces grams of potassium-intercalated hBN. First-principles calculations suggest that the intercalation occurs by coordination of K atoms with nitrogen vacancies which then 'pillar' the hBN layers, facilitating the infiltration of K into the hBN galleries from the edges of hBN particles, along with partial charge transfer from K to hBN layers. The K-intercalated hBN material is easily exfoliated and dispersed in tetrahydrofuran as single/few-layer crystalline hBN nanosheets or as surfactant-free aqueous dispersions when transferred to water. Furthermore, the reaction of the negatively charged hBN nanosheets with transition metal salts yields mixed-dimensional heterostructure materials composed of metal nanoparticles anchored on hBN which exhibit exceptional catalytic properties. By utilizing the intercalation-assisted liquid phase exfoliation (LPE) of hBN, we obtained surfactant-free dispersions containing hBN nanosheets with a narrow thickness distribution (peaking at 1.6 nm) in low boiling point solvents. These dispersions can be readily processed into high-performance composites and can be used to deposit large-area hBN coatings with compact stacking, which is crucial for advanced applications requiring dense and well-ordered layers, such as thermal management, corrosion protection, and dielectric materials in electronic devices.

Weak interlayer interactions in materials such as graphite and transition metal dichalcogenides allow foreign species to be introduced into the interlayer galleries to modify structural, physical and chemical properties. Alkali metal intercalation of graphite typically has a very favorable free energy of reaction and yields compounds with remarkable solid-state properties such as high-capacity electrochemical energy storage and superconductivity. Graphite intercalation compounds such as $KC_8$ and $NaC_8$ can also be exfoliated and dispersed in polar aprotic solvents such as N-methylpyrrolidone (NMP) and tetrahydrofuran (THF), yielding negatively charged graphene nanosheets which can be further functionalized. The reductive exfoliation and functionalization of graphene sheets result in enhanced and tailored properties such as customizable solubility for graphene inks and composites, modified electron transport, and improved sensing and catalytic activity. Alkali metal intercalation into layered semiconductors such as molybdenum disulfide $(MoS_2)$ and black phosphorus can induce charge density waves, magnetism, structural phase transitions and superconductivity; these compounds can be similarly exfoliated and dispersed in organic solvents that could then be used as inks for flexible supercapacitors electrodes, large area electronics and printable superconducting films.

More challenging is the alkali metal intercalation of layered wide-gap semiconductors such as hexagonal boron nitride (hBN), since the large bandgap arising from the B/N sublattice distinction disfavors charge transfer from intercalants. The B and N alignment of AA' stacked hBN also creates an interlayer interaction significantly stronger than that in graphite, thus raising the energetic cost of gallery dilation. First-principles calculations suggest that alkali metal intercalation of hBN may be possible, and it is facilitated by metal coordination to substitutional impurities, and could yield a superconducting state. The accommodation of alkali metals in wide-gap materials such as hBN offers exciting opportunities for exceptional physicochemical properties, including the emergence of metallic behavior, and potential superconductivity at certain temperatures. Prior attempts to synthesize alkali-intercalated hBN have pursued several methods, as described in Sakamoto et al. These include heating a hBN film grown by chemical vapor deposition to 220° C. in the presence of K vapor, by heating a mixture of ball-milled hBN powder and lithium at 700° C., or by heating hBN powder and lithium to 1250° C. Transmission electron microscopy (TEM) revealed a 2×2 potassium superlattice of stage-1 K-intercalated hBN within the intercalated hBN films and X-ray diffraction (XRD) measurements indicated new interlayer dilations at a spacing of 3.76 Å (12.6% expansion) caused by the introduction of Li. In another study, upon heating hBN powder in the presence of Cs vapor at 250° C., TEM revealed dilute Cs doping rather than systematic intercalation. Although these studies reported some intercalation success, the mechanisms involved have not been adequately explained, and subsequent exfoliation, dispersion and functionalization of the intercalated hBN materials—key steps in many potential applications—were not reported.

We report a straightforward method to intercalate alkali metals into hBN to produce a material with excellent dispersibility in tetrahydrofuran (THF). The resulting hBN exfoliated nanosheets—presumably now holding a negative charge—were easily transferred to water, creating a stable dispersion without surfactants. The negatively charged nanosheets can spontaneously reduce transition metal salts such as $PtCl_4$ to produce highly dispersed Pt nanoparticles anchored onto the hBN nanosheets (Pt(Np)/hBN). The synthesis method is versatile and can be extended to other metals salts to form transition metal and transition metal oxide nanoparticles anchored on hBN.

Potassium Intercalation.

Figure 13A:
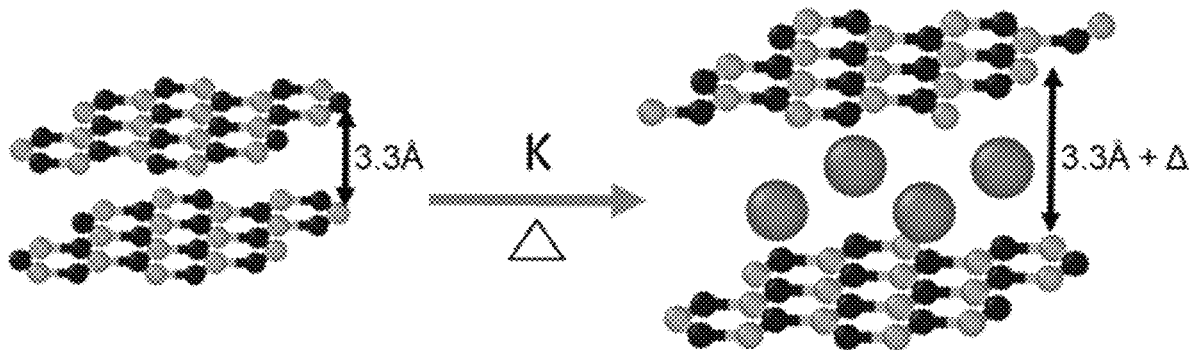
FIGS. 13A-G show an exemplary structure of K-intercalated hBN.
Figure 13B:
Figure 13B:
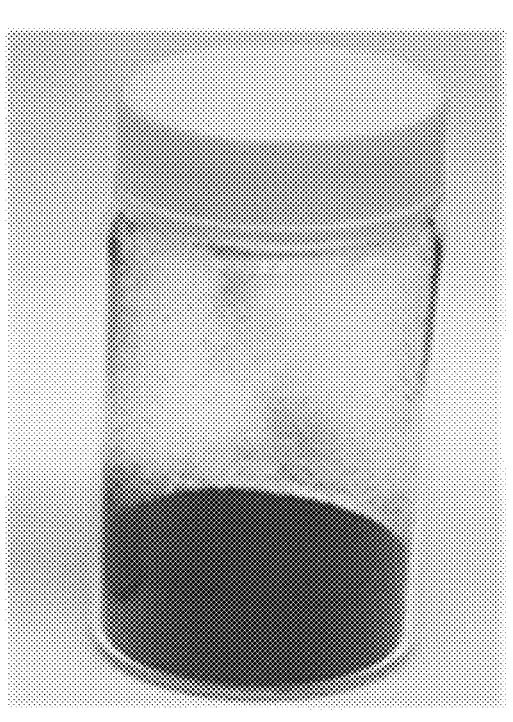
Figure 13C:
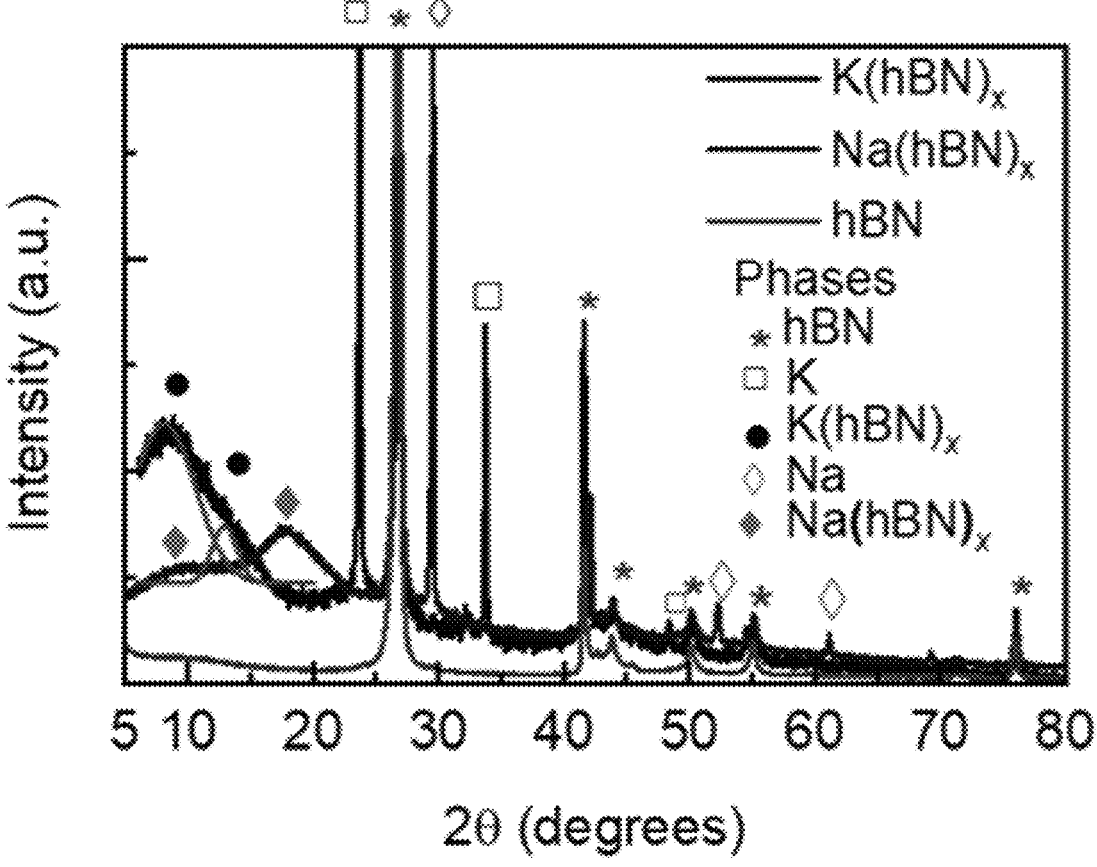
Figure 13D:
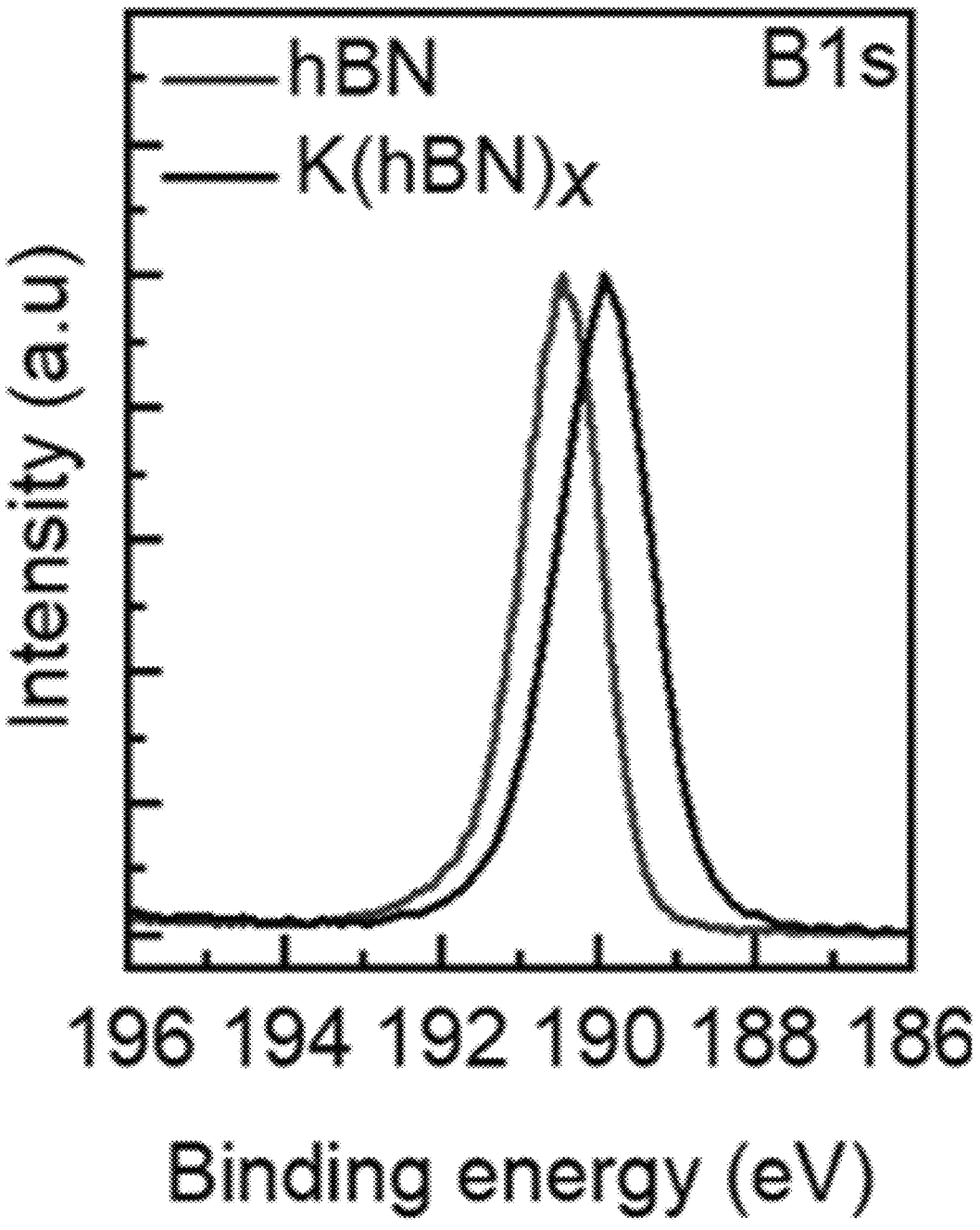
Figure 13E:
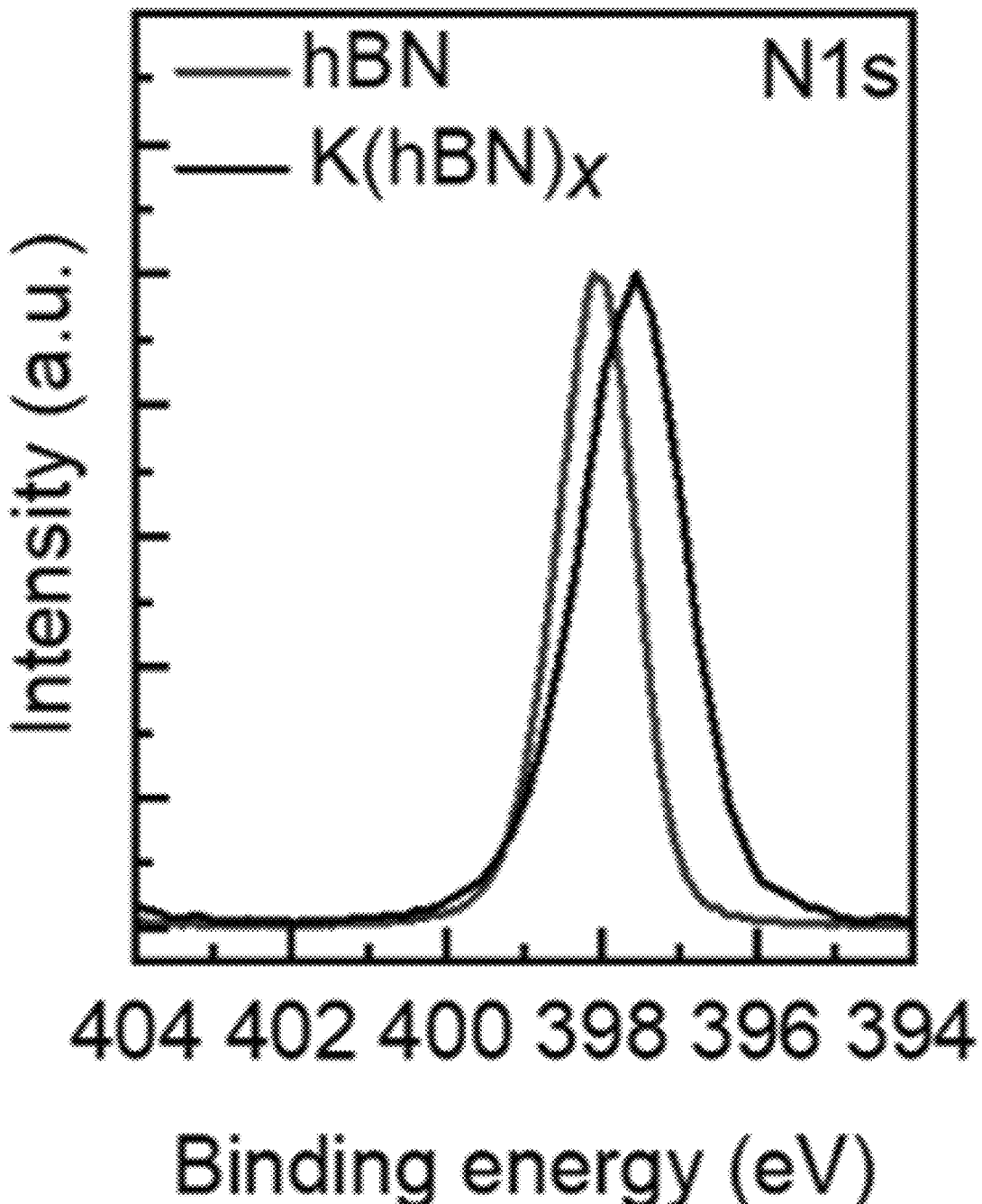
Figure 13F:
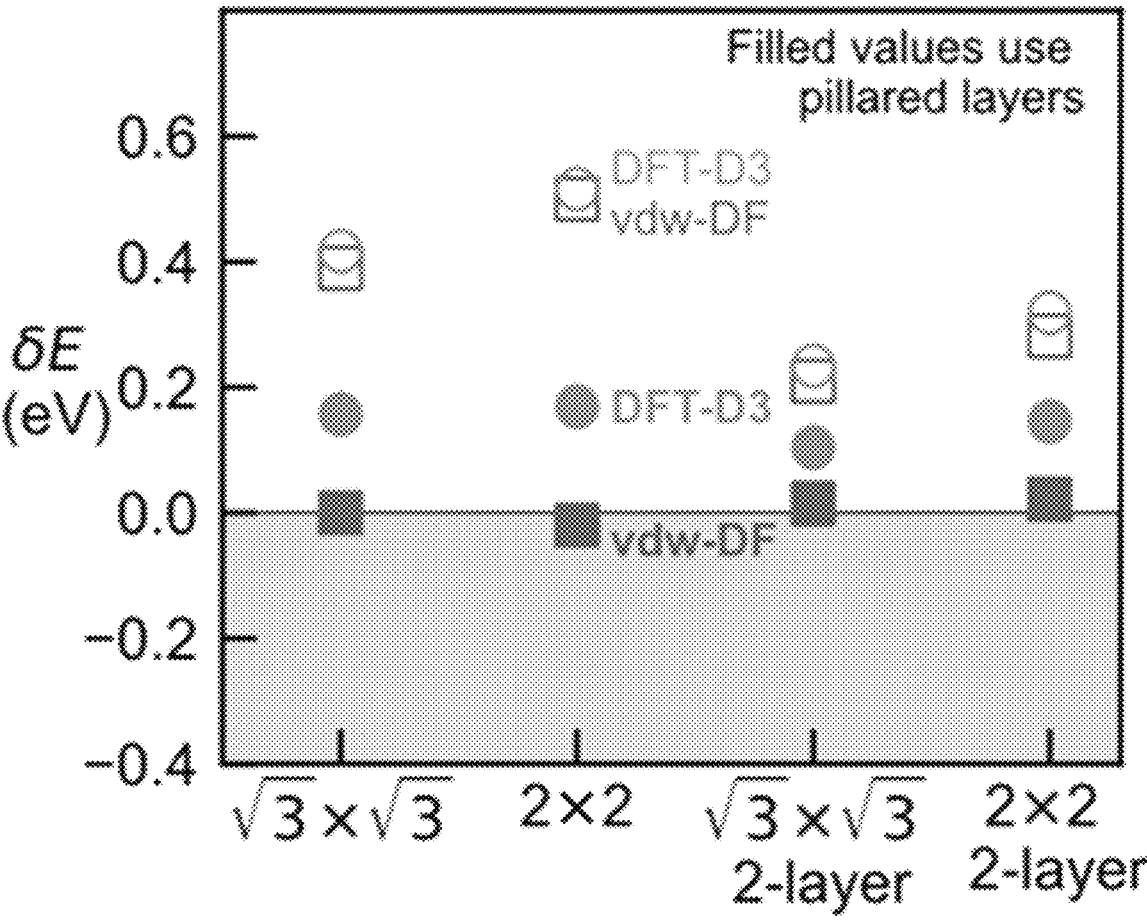
Figure 13G:
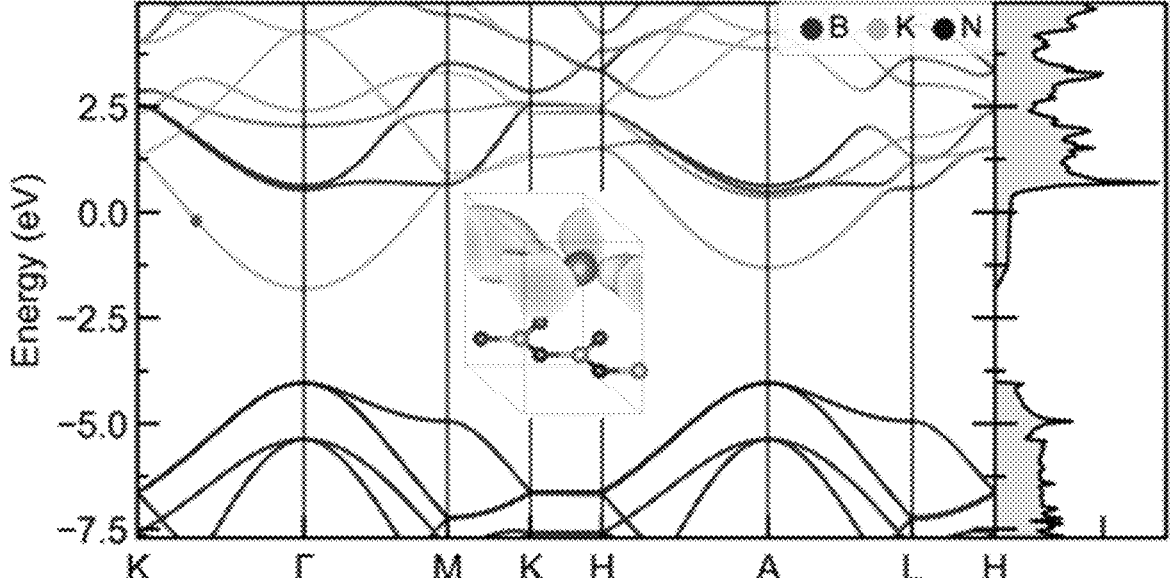

FIGS. 13A-F show an exemplary structure of K-intercalated hBN. FIG. 13A shows a schematic illustration of potassium intercalation in hBN, FIG. 13B shows photographs of hBN powder before and after K intercalation. The left vial contains a sample of white pristine hBN powder while the right vial contains black K-intercalated hBN powder. FIG. 13 C shows X-ray diffraction of pristine hBN powder compared with K-intercalated hBN and Na-intercalated hBN powders. FIGS. 13D and 13E show high-resolution XPS spectra from the (FIG. 13D) N1s and the (FIG. 13 E) B1s regions of pristine hBN compared with K-intercalated hBN powder. FIG. 13 F shows formation energies for mono- and bilayers of K for $\sqrt{3} \times \sqrt{3}$ or 2×2 supercells with vdW-DF and DFT-D3 corrections. Full (hollow) markers represent energies after (before) adjustment for pillaring. FIG. 13GF shows band structure of potassium monolayer in $\sqrt{3} \times \sqrt{3}$ supercell using DFT-D3. Density of states is shown on the side.

A mixture of hBN powder and K metal is heated in a glass vial on a hot plate at 300° C. for 5 hours with intermittent stirring. Initially, the hBN powder is white; as intercalation proceeds, the mixture becomes black. The hBN powder with smaller sizes (500 nm) darkened much more rapidly than powders of larger sizes (>10 μm). This suggest that the intercalation initiates at the edges of hBN particles and the higher edge density in the smaller powder allows more rapid and uniform intercalation, resulting in a more homogeneous intermediate material. X-ray diffraction (XRD) confirmed intercalation through dilation of the hBN interlayer gallery. Pristine hBN shows a prominent peak at 2θ=27.80 and additional peaks at 41.6° and 55.2°; these correspond to the (002), (100), and (004) planes of hBN respectively. The (002) peak reflects the interplanar spacing of hBN, 3.33 Å. Upon K intercalation the resulting black powder, only exhibits minimal changes at high diffraction angles, in agreement with prior intercalation results of hBN with Brønsted acids. A new broad (001) peak is observed at 8.1° and a shoulder at 13.0° suggest two new interlayer dilations at spacings of approximately 10.9 Å and 6.8 Å, respectively. Similar attempts to intercalate lithium were unsuccessful, but sodium reacted with hBN at 400° C. to yield a blue powder displaying a new (001) peak around 17.6° and a shoulder at 9.6°, corresponding to interlayer distances of approximately 5.0 Å and 9.2 Å. The molten metal-assisted intercalation approach is generally applicable to the intercalation of alkali metals, including Cs, Rb, K, and Na. However, this method did not work for Li, as molten Li was unable to wet hBN or react with hBN, even when heated up to 500° C. All alkali metal-intercalated hBN products examined also showed peaks corresponding to the body-centered cubic lattice of alkali metal.

X-ray photoelectron spectroscopy (XPS) survey spectra of pristine hBN and K-intercalated hBN powders show peaks corresponding to N, B and O, with the K-intercalated hBN sample showing additional peaks corresponding to K. FIGS. 13D-E display N1s and B1s core-level spectra, revealing sp²-hybridized N and B in both pristine and K-intercalated hBN. The N1s peak located at 398.1 eV in pristine hBN downshifts to 397.6 eV after K intercalation. The B1s peak similarly downshifts from 190.5 eV to 189.9 eV. These shifts may be attributed to N and B atoms with higher electron density in the K-intercalated material. The B/N atomic ratio changes from 1:0.99 in pristine hBN powder to 1:0.93 after potassium intercalation, suggesting that nitrogen vacancies are created during intercalation. These results suggest that intercalation produces K-intercalated hBN material, as illustrated in FIG. 13A, with charge transfer from potassium intercalants to hBN through interactions with nitrogen vacancies.

Electronic Structure Calculations.

Density functional theory (DFT) was used to constrain structural models of the K-intercalated hBN and to under-stand the interaction of K layers with hBN sheets. Calculations were performed for a wide range of intercalation geometries with different interlayer registries, stages, areal densities, and potassium layer thicknesses and then compared to non-intercalated and bulk phases to establish relative phase stabilities. Dispersion interactions are intrinsically non-local in character, and hence are most commonly treated within density functional methods by empirical means to control computational cost. Considering the empirical nature of these approaches, we employ two different dispersion interaction implementations, Grimme's DFT-D3 method and the nonlocal van der Waals density functional (vdW-DF) method. DFT-D3 uses empirical pairwise potentials based on a semiclassical $-C_6/R^6$ asymptotic form where $C_6$ coefficients are based on fractional coordination numbers to account for-differences in local chemical environment (i.e. ionic, covalent, metallic). In contrast, vdW-DF uses range separation between local and non-local correlation energies, treating the local part in the local density approximation and non-local long-range correlation energy with a full-potential approximation. Since an empirical pair-potential approach will not fully capture non-local effects in the delocalized two-dimensional electron gas within the intercalated potassium layer, we anticipate more accurate results from vdW-DF, but comparing both methods provides information regarding the degree of uncertainty in the conclusions. We also contrast these results with those of the empirical Tkatchenko-Scheffler method.

The formation energy per potassium atom of the intercalated phase is defined as $\Delta E = 1/n_K(E(K,BN)-E(BN))-\mu_K$, where $\mu_K$ is referenced to bulk potassium. Since the X-ray diffraction data suggests stacking periodicities of 6.8 Å and 10.9 Å for potassium intercalated hBN, we consider intercalation geometries with K monolayers or bilayers and also stage-II intercalation of K monolayers between pairs of hBN layers. All cases are examined across a range of potassium areal densities: triangular lattices of potassium with one atom per potassium layer within a $\sqrt{3} \times \sqrt{3}$ R30° or a 2×2 hBN supercell, or a rectangular potassium lattice within the 2×2 hBN supercell. For the intercalated system, various combinations of registries for the potassium layer (on top of B, on top of N, above the hollow) and the hBN stacking pattern (AA, AA', AB, AB1', AB2', SP, SP') are very close in formation energy (differing by less than 2 meV per K atom). Stage II and stage I intercalation of a single potassium layer have nearly identical intercalation energies.

Simple bulk intercalation is unfavorable enthalpically for both DFT-D3 and vdW-DF corrections, by 0.2 to 0.5 eV depending on the areal density, layer thickness, and treatment of van der Waals interactions; see FIG. 13 F. The hBN interlayer distances differ slightly between the two methods: vdW-DF yields 7.4 Å and 11.1 Å for a potassium monolayer or bilayer while DFT-D3 yields 7.6 Å and 11.6 Å. These distances also have ~0.2 Å variance depending on the hBN stacking, potassium registries, etc., but in general vdW-DF binds potassium slightly more strongly with a somewhat smaller interlayer spacing. The computed interlayer spacings are slightly larger than the experimental values, suggesting that some component of interlayer binding is not fully captured with the current level of theory for van der Waals interactions in this system; such a contribution would presumably be favorable for intercalation by some tens of meV, which is the order of magnitude by which the total energy changes upon compressing the simulated systems to the experimental interlayer spacing. There appears to be a slight preference for the $\sqrt{3} \times \sqrt{3}$ R30° hBN supercell, although this energetic distinction is too subtle to be confidently concluded, considering the discrepancy between the dispersion approaches. The difference between our results and prior work may relate to technical differences in implementation. Note also that this level of theory may somewhat overestimate the cohesive energy of bulk potassium. The Tkatchenko-Scheffler treatment of dispersion interactions is sometimes more favorable for intercalation than are DFT-D3 and vdW-DF but it is less consistent across systems.

The calculations above assumed a defect-free hBN layer. However, defects in the hBN layer should provide preferential binding sites for potassium and hence facilitate the kinetics and thermodynamics of intercalation by pillaring the hBN galleries. We model single B or N vacancies inside a 2×2×2 hBN supercell (i.e. one defective and one pristine hBN layer). Boron and nitrogen vacancies bind a single potassium atom with formation energies of −2.5 eV and −0.7 eV, respectively, relative to bulk potassium. For boron vacancies this increases the hBN interlayer spacing to ~4.5 Å while for nitrogen vacancies it becomes ~6.5 Å. This pillaring will facilitate metal intercalation. Our experimental samples are boron-rich, so from here forward we focus on nitrogen vacancies (while keeping in mind that any boron vacancies present would further favor intercalation). In a hypothetical defect-free bulk hBN sample, such pillaring would have an energy cost of $\Delta E = E(BN, d=6.3\ \text{Å}) - E(BN)$ √0.086 eV (0.15 eV) for the DFT-D3 (vdW-DF) correction per BN formula unit. The intercalation energetics for additional potassium near the pillared defect will thus improve by approximately ~$\Delta E$ per BN formula unit, as indicated by the filled markers in FIG. 13F. This brings all of the vdW-DF intercalation energies to within 0.02 eV of enthalpic stability; entropic contributions at the synthesis temperature (with kT~0.05 eV) would likely further favor thermodynamic stability of the intercalated phase. Most of the differences between DFT-D3 and vdW-DF come from the estimation of the energy cost to dilate the hBN galleries. Note that the experimental interlayer spacings are smaller than those calculated, suggesting that the true binding of the intercalated phase is higher than that produced at this level of theory (this is also consistent with the trend from D3 to vdW-DF). These results for coordination specifically to single N vacancies are a lower bound on the effectiveness of defect-facilitated intercalation, in that pillaring should occur cooperatively for potassium coordination to any type of defect in hBN. A single vacancy per 2×2×2 BN supercell yields a defect density roughly twice the nitrogen deficit in our sample, likely similar to that of regions of the sample that are locally dense with defects and thus act to nucleate intercalation, which then propagates through outward pillaring. Additionally, more defects are likely created during the intercalation, as molten alkali metal may act as a solvent for triatomic molecules of $BN_2$ and $N_3$ from the hBN layers.

Intercalation of sodium was studied in a √3×√3 R30° hBN supercell using the DFT-D3 method for one and two sodium layers. Geometry optimization yields 6.3 Å for monolayer and 8.7 Å. The bilayer spacing is in good agreement with experiment, while the calculated monolayer spacing is somewhat larger than the measured value; this discrepancy may relate to alternative intercalation geometries or the accuracy of the van der Waals description. As for potassium, intercalation of sodium into pristine hBN is found to be enthalpically unfavorable, suggesting a defect-mediated intercalation.

FIG. 13G shows the calculated band structure for single-layer K intercalation for a √3×√3 R30° defect-free AA-stacked hBN supercell with potassium positioned above boron. A potassium-derived nearly free-electron band centered at Γ; the inset gives the charge density of this band at the wavevector marked with a red dot. The bands just above the Fermi energy have primarily boron character and are relatively flat from Γ to M. Unlike graphite intercalation, there is little or no charge transfer from the alkali to pristine hBN at this level of theory; in contrast, calculations for alkali coordinated to vacancy defects does show significant charge transfer, which is more consistent with the downshifted and broad N1s and B1s peaks of K-intercalated hBN. The areal density of alkali metals is sufficiently high that the metal layer obtains significant stabilization from in-plane dispersion; the delocalized character of these electronic states may also support electrodynamics that are not captured in simple semiempirical van der Waals treatments, as suggested by the overestimations of the computed interlayer spacing. Charge transfer in pristine areas of hBN may also be facilitated somewhat by a lower interlayer spacing due to stronger Coulombic coupling between charge-separated regions. Exfoliation and Dispersion of K-Intercalated hBN.

Figure 14:
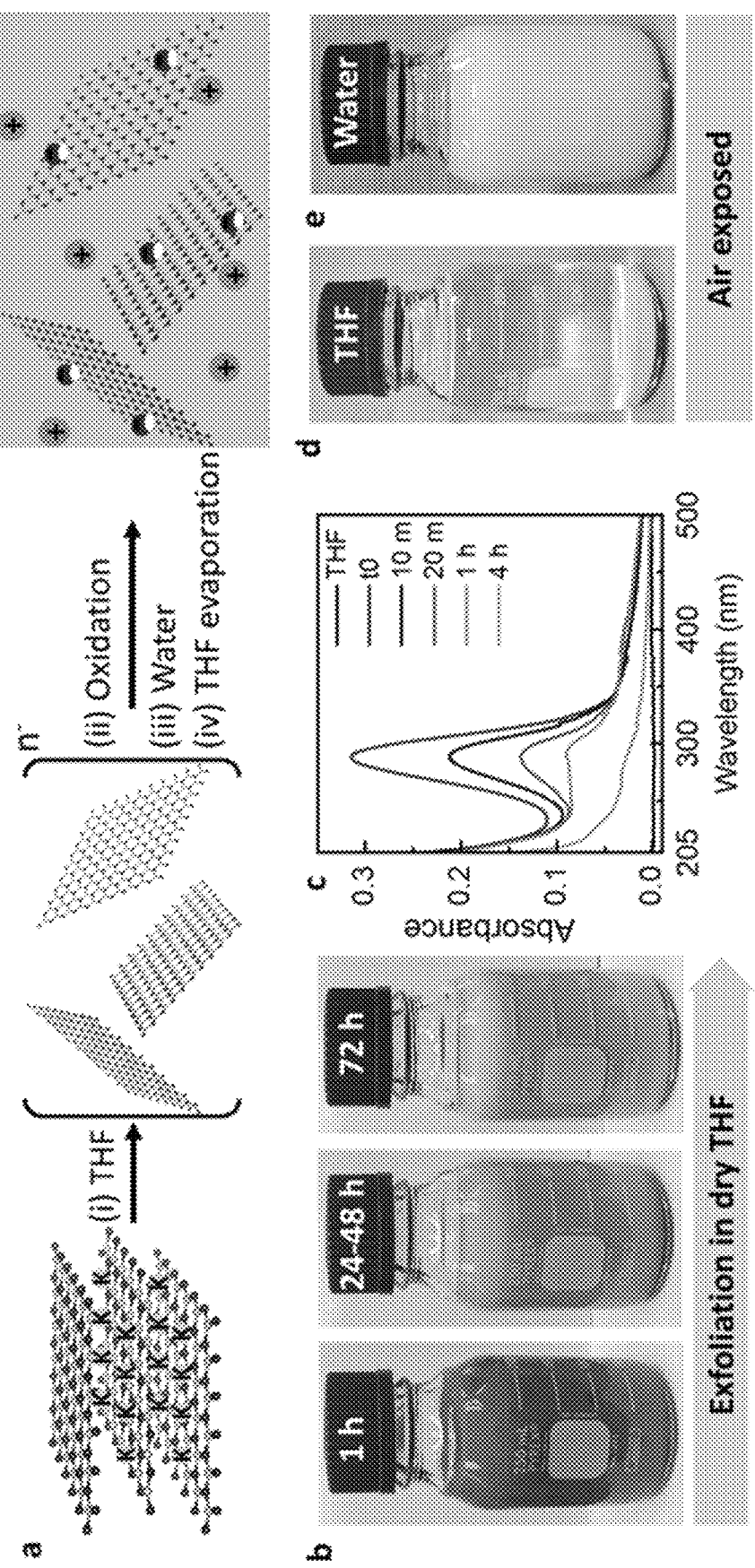
FIG. 14 shows exfoliation and dispersion of hBN nanosheets. Panel (a) is a schematic representation of the exfoliation and dispersion of K-intercalated hBN to form dispersions of negatively charged hBN nanosheets in THF followed by transfer to water to form an aqueous dispersion of hBN nanosheets. Panel (b) shows photographs of color changes in the K-intercalated hBN and THF mixture during exfoliation and dispersion. The left bottle is the K-intercalated hBN and THF mixture after 1 hour of stirring, then after 24 hours of stirring, then on the right after 72 hours of stirring. Panel (c) shows evolution of absorption spectra of the dispersions of negatively charged hBN nanosheets in THF upon air oxidation. Panel (d) shows photographs showing hBN dispersion after air exposure. The left bottle contains an aggregated and sedimented hBN material in THF after air oxidation, while the right bottle contains a homogeneous dispersion of hBN after transfer and stabilization in water.

FIG. 14 shows exfoliation and dispersion of hBN nanosheets. Panel (a) is a schematic representation of the exfoliation and dispersion of K-intercalated hBN to form dispersions of negatively charged hBN nanosheets in THE followed by transfer to water to form an aqueous dispersion of hBN nanosheets. Panel (b) shows photographs of color changes in the K-intercalated hBN and THE mixture during exfoliation and dispersion. The left bottle is the K-intercalated hBN and THF mixture after 1 hour of stirring, then after 24 hours of stirring, then on the right after 72 hours of stirring. Panel (c) shows evolution of absorption spectra of the dispersions of negatively charged hBN nanosheets in THE upon air oxidation. Panel (d) shows photographs showing hBN dispersion after air exposure. The left bottle contains an aggregated and sedimented hBN material in THE after air oxidation, while the right bottle contains a homogeneous dispersion of hBN after transfer and stabilization in water.

A significant outcome of the intercalation of K into hBN is its convenient exfoliation and dispersion in polar aprotic solvents as single- or few-layer hBN. This process enables the separation of individual layers from bulk hBN crystals. The K-intercalated hBN powder was exposed to dry THF, as shown in the scheme presented in FIG. 14 (panel a), under an inert atmosphere (inside a glove box). Upon exposure to THF, the initially black K-intercalated hBN formed a violet dispersion, as shown in FIG. 14 (panel b). After gentle stirring to aid exfoliation and dispersion, the violet dispersion gradually changed to light blue over 24 to 48 hours before ultimately turning greyish white after 72 hours. After allowing the dispersion to settle overnight to remove large unexfoliated particles, the supernatant was decanted into a clean and dry container, ensuring that any remaining unexfoliated sedimented hBN particles were left behind. Notably, a shiny metallic piece of K was recovered at the bottom of the container along with the hBN sediments once the supernatant had been decanted.

Results obtained from atomic force microscopy (AFM) on deposits from the decanted portion of the THF dispersion of K-intercalated hBN indicate that the dispersion contains thin and flat well-exfoliated hBN nanosheets. The dry extract yielded a concentration of 1.4 mg/mL (with a yield of 28% based on the initial quantity of hBN). These dispersions remain stable as long as they are kept under an inert atmosphere. Their absorption spectrum displays a band in the UV range at 288 nm with no tailing to higher wavelengths. Exposure to air leads to a significant decrease in peak intensity of this band within less than 1 hour due to oxidation. XPS analysis conducted on the material drop casted onto $SiO_2$ (without rinsing) reveals not only the presence of hBN, but also residual potassium species. This suggests that after exfoliation and dispersion of K-intercalated hBN, even though potassium metal is recovered, some potassium still remains in the form of K counterions surrounding negatively charged hBN nanosheets in the dispersions. The concentration of these remaining potassium ions can account for up to 20% of the initial amount present in K-intercalated hBN, which may indicate the fraction of intercalated potassium that is most strongly coordinated to defects. Taken as a whole, these data suggest that the absorption peak observed at 288 nm corresponds to negatively charged hBN nanosheets dispersed in solution.

To prevent the oxidation (or other reaction) of potassium and maintain the negative charge on the hBN surface throughout dispersion and exfoliation, it is crucial to use dry oxygen-free THF. It is noteworthy that ultrasonication is not employed during any stage of the process, but instead gentle stirring with a magnetic stirrer bar was used to assist exfoliation and dispersion. Although metallic potassium is recovered after exfoliation and dispersion, some amount remains as counterions surrounding the negatively charged hBN nanosheets in THF; this is consistent with DFT results that suggest charge transfer around defects in the hBN layers. The fact that an alkali/hBN nanosheet polyelectrolyte readily forms in polar organic aprotic solvents without ultrasonication or chemical functionalization is remarkable. The spontaneous exfoliation in THF likely occurs by the solvation of $K^+$ cations and complementary negatively charged hBN nanosheet polyanions. The stability of these dispersions is maintained unless they are exposed to air and undergo oxidation, which induces aggregation and sedimentation.

Figure 15:
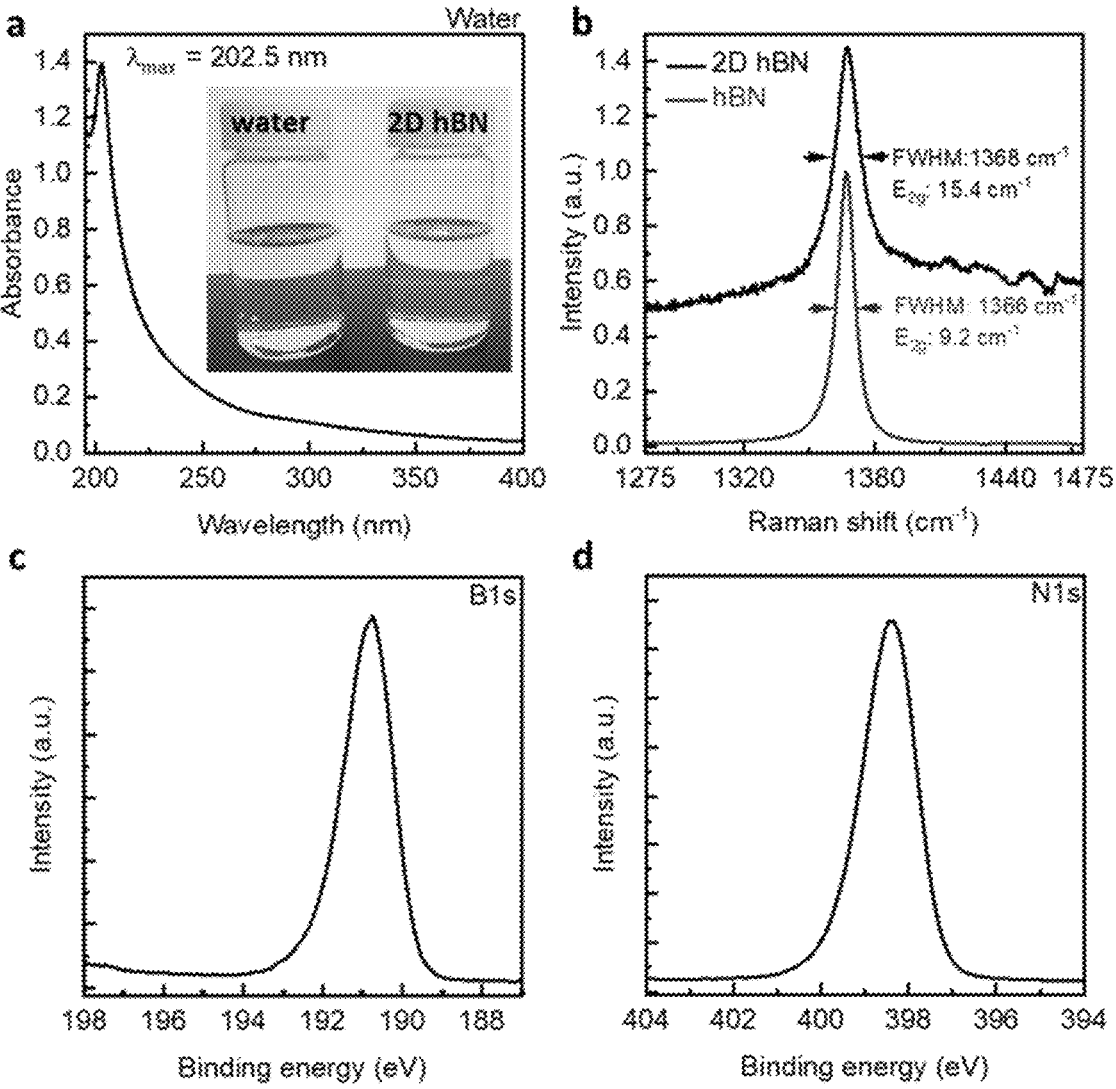
FIG. 15 shows spectroscopic signatures of exfoliated hBN nanosheets. Panel (a) UV-vis absorption spectrum shows an absorption peak at 202.5 nm (6.1 eV), the wavelength reported for the absorption of a single layer of hBN on quartz. Inset: laser light goes through water unscattered (left), whereas the dispersion of hBN nanosheets in water (right) shows the Tyndall effect from the light scattered by large hBN nanosheets. Panel (b) Raman scattering spectra of exfoliated hBN nanosheets deposited on a $SiO_2$ (300 nm)/Si substrate compared to bulk hBN powder. The thin-film spectrum shows a red shift of 2.0 cm$^{-1}$ and broadening of 6.2 cm$^{-1}$ consistent with a substantial reduction in hBN thickness after exfoliation. XPS core-level spectra of panel (c) B1s and panel (d) N1s are measured from exfoliated hBN nanosheets deposited on a $SiO_2$ (300 nm)/Si substrate.

FIG. 15 shows spectroscopic signatures of exfoliated hBN nanosheets. Panel (a) UV-vis absorption spectrum shows an absorption peak at 202.5 nm (6.1 eV), the wavelength reported for the absorption of a single layer of hBN on quartz. Inset: laser light goes through water unscattered (left), whereas the dispersion of hBN nanosheets in water (right) shows the Tyndall effect from the light scattered by large hBN nanosheets. Panel (b) Raman scattering spectra of exfoliated hBN nanosheets deposited on a $SiO_2$ (300 nm)/Si substrate compared to bulk hBN powder. The thin-film spectrum shows a red shift of 2.0 $cm^{-1}$ and broadening of 6.2 $cm^{-1}$ consistent with a substantial reduction in hBN thickness after exfoliation. XPS core-level spectra of panel (c) B1s and panel (d) N1s are measured from exfoliated hBN nanosheets deposited on a $SiO_2$ (300 nm)/Si substrate.

To mitigate the challenges posed by the air sensitivity of this dispersion and to simplify storage and handling, we transferred the THF dispersion to water following the scheme shown in FIG. 15, resulting in a surfactant-free aqueous dispersion of hBN nanosheets. In this procedure, the dispersion in THF was briefly exposed to air, mixed with water before reaggregation could take place, and the THF was then evaporated, as illustrated in FIG. 15. A highly stable surfactant-free dispersion of hBN nanosheets in water was achieved. Similar to other hydrophobic particles like oil droplets, graphene, single walled carbon nanotubes (SWCNTs), or fullerenes, the exfoliated hBN nanosheets may acquire charge when immersed in water due to the spontaneous adsorption of $OH^-$ ions on their surface, thus inhibiting aggregation. This mechanism is supported by a negative zeta potential of $\zeta=-49\pm5$ obtained from measurements conducted on the aqueous dispersions of hBN nanosheets. Thoroughly exfoliated hBN nanosheets can be dispersed in water at a concentration of 0.75 g $L^{-1}$ while maintaining stability over six months The UV-vis absorption spectrum of the hBN nanosheet dispersion in water shows an absorption peak at 202.5 nm, indicating an optical bandgap of 6.12 eV. This value is consistent with previous reports on single-layer mechanically exfoliated and chemical vapor deposited few-layer hBN on a quartz substrate. Notably, the peak located at 288 nm associated with negatively charged hBN species in THF diminishes upon transferring to water. The Tyndall effect (where laser light scatters from the nanosheets) is observed in a dilute dispersion of hBN nanosheets in water. The Raman spectrum of deposits drop cast from the aqueous dispersion onto a $SiO_2$ (300 nm)/Si substrate is compared to that of a bulk hBN powder reference sample. The spectrum shows a characteristic hBN peak ($E_{2g}$) at 1,368 $cm^{-1}$ with a full width at half maximum (FWHM) of ~15.4 $cm^{-1}$. This peak is wider than that for the bulk pristine hBN powder (9.2 $cm^{-1}$), but comparable to that reported for single-crystal monolayer hBN. XPS reveals $sp^2$-hybridized B-bonded and N-bonded atoms within the hBN nanosheets. The B1s spectrum shows a single peak at 190.2 eV (FIG. 3c), while the N1s spectrum has a single peak at 397.9 eV, indicating that only B—N bonds are present in the exfoliated material with an approximate atomic ratio of B/N of 1:0.93 (consistent with a substantial concentration of nitrogen vacancies). XPS analysis suggests that there was no significant additional damage to the hBN framework during its exfoliation and dispersion in THF and subsequent transfer to water.

Figure 16:
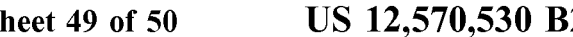
FIG. 16 shows morphology of the hBN nanosheets deposits from the aqueous dispersions of hBN. Panel (a) shows a topographic image on mica by AFM showing the homogeneous thickness of the deposited hBN nanosheets. Panel (b) shows thickness distribution of exfoliated hBN nanosheets obtained by measuring 190 flakes. The mean thickness is 1.6 nm. Panel (c) shows a TEM micrograph of an hBN flake deposited from the aqueous dispersions of hBN over a lacey carbon grid. Panel (d) shows Fast Fourier transform (FFT) shown exhibiting a distinctive six-fold-symmetry pattern, confirming the retention of high crystallinity in the hBN nanosheets after the K-intercalation driven exfoliation and dispersion. Panel (e) shows HRTEM image of a folded edge of an exfoliated bilayer hBN nanosheet. Panel (f) show sHRTEM image of a region of the surface of an hBN nanosheet, revealing a distinct hexagonal arrangement of boron (B) and nitrogen (N) atoms, suggesting that monolayer hBN nanosheets were successfully obtained.

FIG. 16 shows morphology of the hBN nanosheets deposits from the aqueous dispersions of hBN. Panel (a) shows a topographic image on mica by AFM showing the homogeneous thickness of the deposited hBN nanosheets. Panel (b) shows thickness distribution of exfoliated hBN nanosheets obtained by measuring 190 flakes. The mean thickness is 1.6 nm. Panel (c) shows a TEM micrograph of an hBN flake deposited from the aqueous dispersions of hBN over a lacey carbon grid. Panel (d) shows Fast Fourier transform (FFT) shown exhibiting a distinctive six-fold-symmetry pattern, confirming the retention of high crystallinity in the hBN nanosheets after the K-intercalation driven exfoliation and dispersion. Panel (e) shows HRTEM image of a folded edge of an exfoliated bilayer hBN nanosheet. Panel (f) shows sHRTEM image of a region of the surface of an hBN nanosheet, revealing a distinct hexagonal arrangement of boron (B) and nitrogen (N) atoms, suggesting that monolayer hBN nanosheets were successfully obtained.

The morphology of the nanosheets deposited on freshly cleaved mica and on holey carbon grids was examined using atomic force microscopy (AFM) and transmission electron microscopy (TEM). Topographic images show thin hBN nanosheets of uniform thickness. The histogram of suggests that the exfoliated nanosheets vary from one to approximately four hBN layers, where AFM heights under 1.5 nm are generally taken to indicate monolayer and bilayer thick hBN sheets. These AFM results were confirmed by TEM. Representative TEM images show a uniform micron-sized thin hBN nanosheet on a holey carbon grid. The fast Fourier transform (FFT) shows six-fold symmetry, confirming the retention of high crystallinity in the nanosheets after exfoliation and dispersion. The high-resolution TEM (HRTEM) image of the edge of a nanosheet shows two straight lines of contrast that are due to backfolding of a bilayer hBN nanosheet. A HRTEM image of a region of the surface of an hBN nanosheet, reveals a clear honeycomb arrangement of boron (B) and nitrogen (N) atoms reflective of monolayer hBN. Few-layer hBN flakes were also observed in HRTEM, and they indicate a lattice constant of 0.25 nm and high crystallinity. These observations suggest the successful exfoliation of the hBN structure down to the monolayer level.

Formation of Mixed-Dimensional Pt/hBN Heterostructures.

Figure 17:
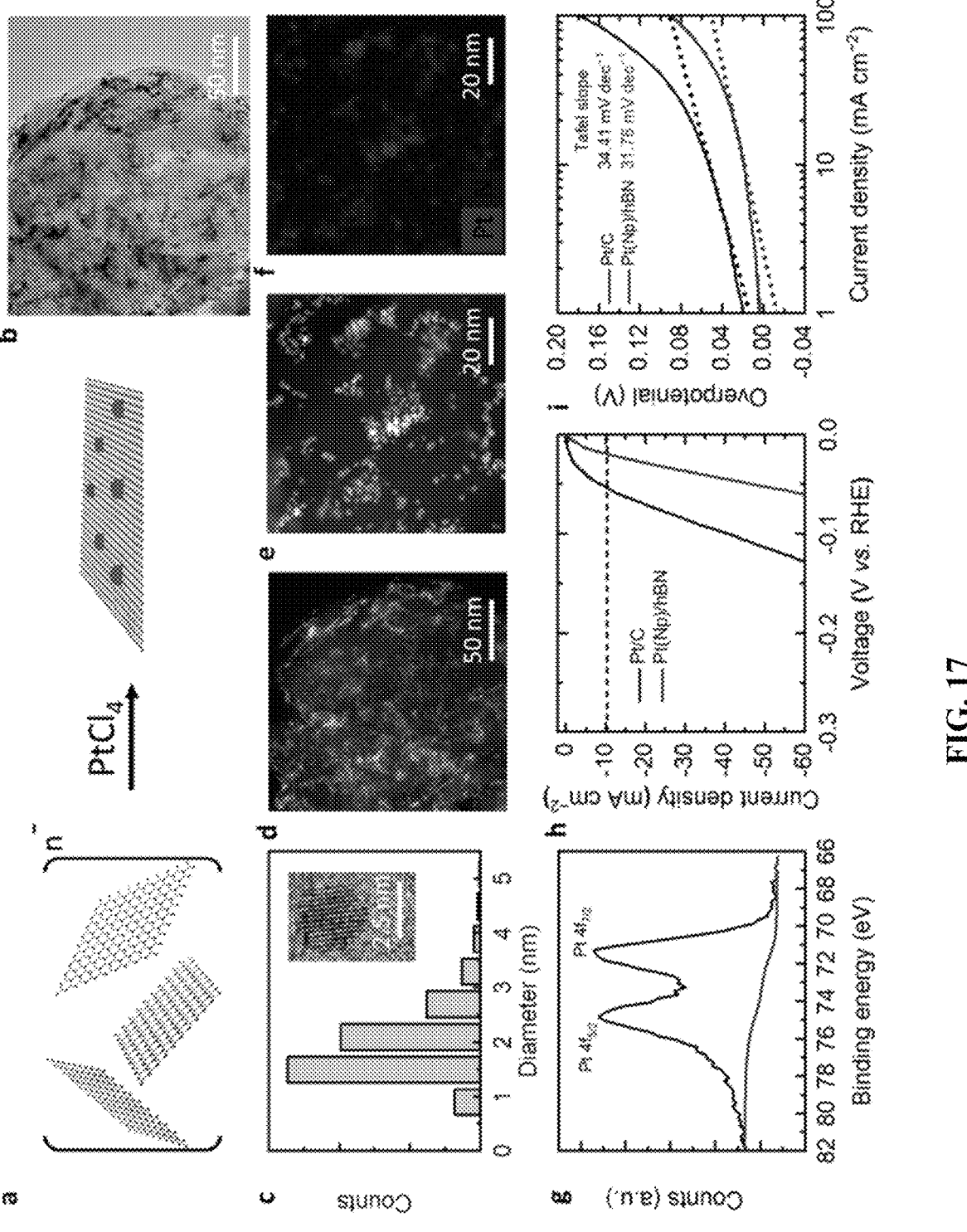
FIG. 17 shows mixed dimensional 0D/2D heterostructures based on Pt nanoparticles and Pt atoms anchored on hBN nanosheets (Pt(Np)/hBN). Panel (a) shows a schematic representation of the reductive functionalization of hBN nanosheets to form Pt(Np)/hBN. Panel (b) shows a typical TEM image of Pt(Np)/hBN clearly displays the Pt nanoparticles randomly anchored on an hBN nanosheet. Panel (c) shows a histogram of the size distribution of Pt NPs (inset: HRTEM of the Pt(Np)/hBN revealing the atomic planes of the Pt nanoparticles). Panel (d) dhows a high angle annular dark field (HAADF) STEM image of the mixed-dimensional Pt(Np)/hBN heterostructure clearly displays the Pt nanoparticles randomly anchored on the hBN nanosheet. Panel (e) shows a typical HAADF STEM image of the Pt(Np)/hBN heterostructure material. Panel (f) shows an EDS elemental map of the Pt(Np)/hBN heterostructure collected from the same location as (e) showing the uniform distribution of Pt over the hBN nanosheet. Panel (g) shows high resolution XPS spectrum of Pt 4f for Pt nanoparticles in the heterostructure showing that the sample exhibits mainly metallic. Pt with minor contributions of Pt 2$^+$. Panel (h) shows a HER polarization curve of the mixed dimensional Pt(Np)/hBN heterostructure catalyst in comparison with 20 wt. % commercial Pt/C. Panel (i) shows a Tafel plots derived from the corresponding polarization curves.

FIG. 17 shows mixed dimensional 0D/2D heterostructures based on Pt nanoparticles and Pt atoms anchored on hBN nanosheets (Pt(Np)/hBN). Panel (a) shows a schematic representation of the reductive functionalization of hBN nanosheets to form Pt(Np)/hBN. Panel (b) shows a typical TEM image of Pt(Np)/hBN clearly displays the Pt nanoparticles randomly anchored on an hBN nanosheet. Panel (c) shows a histogram of the size distribution of Pt NPs (inset: HRTEM of the Pt(Np)/hBN revealing the atomic planes of the Pt nanoparticles). Panel (d) dhows a high angle annular dark field (HAADF) STEM image of the mixed-dimensional Pt(Np)/hBN heterostructure clearly displays the Pt nanoparticles randomly anchored on the hBN nanosheet. Panel (e) shows a typical HAADF STEM image of the Pt(Np)/hBN heterostructure material. Panel (f) shows an EDS elemental map of the Pt(Np)/hBN heterostructure collected from the same location as (e) showing the uniform distribution of Pt over the hBN nanosheet. Panel (g) shows high resolution XPS spectrum of Pt 4f for Pt nanoparticles in the heterostructure showing that the sample exhibits mainly metallic Pt with minor contributions of Pt 2+. Panel (h) shows a HER polarization curve of the mixed dimensional Pt(Np)/hBN heterostructure catalyst in comparison with 20 wt. % commercial Pt/C. Panel (i) shows a Tafel plots derived from the corresponding polarization curves.

Heterostructured composite materials comprising zero-dimensional (0D) metal nanoparticles or single metal atoms anchored to 2D materials have attracted significant interest in catalysis, molecular sensing, and energy storage due to their exceptional metal utilization efficiency. Thus, we assessed the use of negatively charged hBN nanosheets dispersed in THF for the production of nanocomposite materials comprising Pt nanoparticles anchored to a framework of hBN nanosheets (Pt(Np)/hBN). FIG. 17 presents a schematic of the procedure to obtain this material. Anhydrous $PtCl_4$ dissolved in THF was carefully added to the highly reducing dispersion of negatively charged hBN nanosheets in THF, thus spontaneously reducing $Pt^{4+}$ to Pt nanoparticles and Pt atoms on the surface of the nanosheets. A grey precipitate was observed upon the addition of $PtCl_4$. The final Pt(Np)/hBN material was obtained after thorough washing with acetone, IPA, and water.

The presence of Pt nanoparticle on the hBN framework was confirmed by Xray diffraction. The diffraction pattern of the Pt(Np)/hBN material show peaks at 26.1°, 39.9° and 46.5° corresponding to the (002) peak of hBN and the (111) and (200) peaks of metallic platinum respectively. XPS measurements provided additional evidence for Pt nanoparticles on hBN nanosheets. The material consists of Pt, oxygen, boron, nitrogen. The concentration of Pt in these materials can be varied between 0.1% and 2.5% (see Methods). A high resolution XPS spectrum in the Pt 4f region shows the $4f_{5/2}$ peak at 74.7 eV and the $4f_{7/2}$ peak at 71.3 eV, indicating the presence of metallic Pt.

The morphology and the sizes of the Pt nanoparticles were characterized by TEM, HRTEM, and high-resolution scanning transmission electron microscopy/energy dispersive X-ray analysis (HRSTEM/EDX). The HRTEM and HRSTEM images reveal successful anchoring of nanoparticles from 0.5 to 4 nm diameter onto the hBN nanosheets; the smallest of these (<0.5 nm) may be atomically dispersed Pt atoms. The chemical nature of these materials was investigated by HR-STEM/EDX mapping from the platinum, boron and nitrogen edge. The nitrogen edge is depicted in blue, the boron edge in green, and the Pt edge in red. HR-STEM/EDX imaging reveals these nanoparticles to be Pt; their anchoring to the sheets is crucial to prevent aggregation or leaching in catalytic applications. In the reaction between the hBN nanosheets and $PtCl_4$, the reactive vacancy sites and negative charge on the hBN nanosheets in THF allows for reduction of platinum salts to generate heterostructures composed of Pt nanoparticles embedded within the hBN framework. Thus, the redox reaction happens in close proximity to the hBN lattice, facilitating the efficient decoration of the hBN framework with Pt nanoparticles.

The Pt atoms and nanoparticles anchored on hBN can catalyze the hydrogen evolution reaction (HER) under acidic conditions. The HER performance of Pt(Np)/hBN as well as Pt/C was investigated in 0.5 M $H_2SO_4$ solutions with a graphite rod as the counter electrode. To improve kinetic transport, we mixed the Pt(Np)/hBN samples with conducting carbon and Nafion (see Methods). The working electrodes were prepared by coating catalyst inks on the surface of a glassy carbon electrode. The Pt(Np)/hBN nanocomposite shows HER performance superior to that of a commercially available Pt/C catalyst. Its onset potential of 19.4 mV compares favorably to 53.7 mV for the commercial Pt/C catalyst (both measured at 10 mA cm$^{-2}$). The Pt(Np)/hBN nanocomposite catalyst also exhibits a low Tafel slope of 34.51 mV dec$^{-1}$. The cycling performance confirms the durability of the Pt nanoparticles on the hBN nanosheet surface, showing largely unchanged performance after a thousand cycles. The superior performance of this Pt(Np)/hBN nanocomposite catalyst may be ascribed to the robust anchoring of Pt nanoclusters and nanoparticles to the hBN support, and perhaps also synergetic effects between the hBN nanosheets and Pt. Meanwhile, the conducting carbon ensures the electrons can be well transferred from the Pt to the outer circuits. The exceptional chemical stability of this nanocomposite underlines the potential of exfoliated and dispersed hBN in forming catalyst supports. This versatile reaction method, wherein the hBN nanosheet is itself the reducing agent, could provide a general means to anchor transition metal and transition metal oxide nanoparticles such as Fe, Ni, Pd, and Co in an appropriate morphology for catalysis and other applications without using stabilization or capping agents.

Prior to this work, alkali metal intercalation-assisted exfoliation and functionalization had been achieved in metallic and semiconducting 2D materials such as graphene, TMDs, and black phosphorous, but not in insulating materials such as hBN. Using a simple molten metal-assisted intercalation method, we have now extended this powerful technique to hBN. The intercalation of alkali metals into hBN, likely facilitated by vacancy defects in the hBN layers, enables the facile creation of $K(hBN)_x$ and $Na(hBN)_x$ materials suitable for later exfoliation, dispersion, and metal salt reduction to create heterostructures of hBN covered in well-anchored metal and metal oxide nanoparticles. Mechanistically, the interaction of K with nitrogen vacancies in hBN may 'pillar' the hBN sheets, facilitating easier infiltration of K into the hBN galleries, along with partial charge transfer from K to defective regions of hBN layers. The resulting intercalated state supports a 2D electron gas resident on the K layer. This K-intercalated hBN is easily exfoliable and dispersible in THF as a stable negatively charged ultrathin hBN nanosheet dispersion without ultrasonication or shear mixing. These hBN nanosheets can be transferred to water, creating an air-stable surfactant-free aqueous dispersion. Our results clearly highlight the quality, uniformity and scalability of the solution-processed hBN nanosheets. The negative charge on the hBN nanosheets in THF allows for reduction of platinum salts to generate heterostructures composed of Pt nanoparticles embedded within the hBN framework. This mixed-dimensional Pt(Np)/hBN nanocomposite catalyst exhibits superior catalytic performance when compared to commercial Pt/C catalysts under the hydrogen evolution reaction. The reduction process is likely driven and controlled by the reactive vacancy sites and negative charge on the hBN nanosheets so this functionalization strategy can be applied generally by reducing a wide range of transition metal salts, including $FeCl_3$, $CuCl_2$, $NiCl_2$, $PdCl_2$, and $RuCl_3$, to establish a library of transition metal and metal oxide nanoparticle/hBN mixed-dimensional heterostructure materials with diverse functionalities. The simple synthesis reported here, along with the excellent processability of the K-intercalated hBN to form stable organic and aqueous nanosheet inks and metal and metal oxide nanoparticle decorated hBN nanosheets provides a robust pathway to the scalable production of multifunctional mono- and few layered hBN. These materials hold promise for advanced applications in smart nanocomposites, catalysis, energy storage and sensing under extreme environments, printable fabrication of high-temperature devices for aerospace applications and power electronics, and protective coatings. In addition, the alkali metal-intercalated hBN materials are promising candidates for superconductors, paving way for further basic science studies.

Methods

Materials. Hexagonal boron nitride (hBN) powders were obtained from ITT (500 nm) and Alfa Aesar (>10 μm) and were used without additional treatment. XRD, XPS and scanning electron microscopy (SEM) data obtained from the starting powders were consistent with a pure hBN phase composed of good-quality crystals. All chemicals and solvents, potassium, sodium, platinum (IV) chloride, and THF (>99.9%) were commercial products and were used as purchased.

Preparation of K-intercalated hBN. K-intercalated hBN was prepared by reacting 0.81 g potassium metal with 2.0 g hBN powder (ITT, Alafa Aesar) contained in a glass vial inside an argon-filed glove box. The reaction mixture was heated on a hot plate at 300° C. for 5 hours, during which it was occasionally stirred using a stainless-steel spatula. As the reaction progressed, the white hBN powder turned into a black color indicating successful intercalation. Subsequently, the vial was allowed to cool down to room temperature and the resulting K-intercalated hBN product was collected. To ensure its preservation and prevent any reactivity with external factors, the obtained material was stored in a tightly sealed glass vial prior to further characterization and processing steps. All subsequent analysis techniques employed during characterization were conducted under an inert atmosphere within air-tight sample cells.

Preparation of dispersions of negatively charged hBN in THF. Under an inert atmosphere, 500 mg of K-intercalated hBN was dispersed in 250 ml of dry THF (5 mg/mL). This violet-colored suspension was tightly capped and mixed using a magnetic stirrer set to rotate at 600 revolutions per minute (r.p.m.) for a duration of 72 hours. Over time, the initially violet dispersion gradually changed color to become sky blue, until it ultimately turned light grey after 72 hours of stirring. After stirring, the dispersion was allowed to stand overnight to facilitate undissolved hBN aggregates to sediment at the bottom. The resulting well-dispersed dark grey hBN dispersion in THF was carefully extracted using a pipette and retained for subsequent characterization and further processing. To produce a dispersion with predominantly monolayer hBN nanosheets, the well-dispersed white hBN suspension in THF was centrifuged in 15 mL glass centrifuge tubes at 1,000 r.p.m. for 20 min.

Transfer of negatively charged hBN suspensions in THF to water. The centrifuged dispersion of negatively charged hBN nanosheets in THF was exposed to ambient atmosphere for approximately one minute before being added to a volume of deionized water in a glass vial. The vial was then placed in a dust-free environment and left open to allow the THF to evaporate at room temperature, with occasional gentle stirring using a steel needle. This process resulted in the formation of a white dispersion of hBN nanosheets in water after 2-3 days. Different concentrations of hBN nanosheets in water were achieved by adjusting the amount of hBN nanosheet dispersion in THF added to the water. The dispersions were characterized using absorption spectroscopy and zeta potential measurements. Deposits of hBN nanosheets on different substrates including silicon, oxidized silicon surface ($SiO_2$), glass, quartz, or freshly cleaved mica were obtained by dip coating, drop casting and vacuum filtration methods. The deposits of hBN nanosheets were characterized by a combination of AFM, XPS, HRTEM, and Raman spectroscopy.

Functionalization of hBN Nanosheets with Transition Metal Nanoparticles.

Under inert atmosphere, 150 mg of K-intercalated hBN powder was dispersed in 150 ml of dry THF (1 mg/mL) contained in a 250 mL glass bottle, and this mixture (a violet-colored suspension) was tightly sealed and mixed with a magnetic stirrer (600 revolutions per minute (r.p.m.)). As the mixing continued, the black suspension changed color from violet to sky blue after about 24 hours. At this point a $PtCl_4$ solution dissolved in 20 mL of absolute THF was added dropwise to the suspension of negatively charged hBN nanosheets in THF. The mixture was tightly capped and left stirring on a magnetic stirrer for 24 hours. The resulting Pt/hBN heterostructure product was precipitated and thoroughly washed using THF, ethanol, 2-propanol, and water. The Pt/hBN heterostructure was dried under vacuum at room temperature for 36 hours. The Pt content can be adjusted by reacting the suspension of negatively charged hBN with varying amounts of $PtCl_4$.

Characterization.

X-ray diffraction (XRD) was performed using a PANalytical Empyrean II with Cu-Kα radiation. The air sensitive alkali metal-intercalated hBN powders were placed in a non-ambient domed sample stage within the glovebox.

X-ray photoelectron spectroscopy (XPS) measurements were performed using a Physical Electronics VersaProbe II instrument equipped with a monochromatic Al kα x-ray source (hv=1,486.7 eV) and a concentric hemispherical analyzer. The air sensitive alkali metal intercalated-hBN samples were loaded into a special inert sample transfer vessel to avoid exposure to air. Charge neutralization was performed using both low energy electrons (<5 eV) and argon ions. The binding energy axis was calibrated using sputter cleaned Cu (Cu $2p_{3/2}$=932.62 eV, Cu $3p_{3/2}$=75.1 eV) and Au foils (Au $4f_{7/2}$=83.96 eV). Measurements were made at a takeoff angle of 45° with respect to the sample surface plane. This resulted in a typical sampling depth of 3-6 nm (95% of the signal originated from this depth or shallower). Quantification was done using instrumental relative sensitivity factors (RSFs) that account for the x-ray cross section and inelastic mean free path of the electrons. Analysis chamber pressures were in the mid-$10^{-8}$ Torr range during measurements. The pass energy was set at 20 eV and the step size was 0.1 eV for high-resolution scans.

The absorbance of the dispersions of negatively charged hBN nanosheets in THF were recorded in an airtight 1 mm optical path quartz cuvette using a LAMBDA950 UV/vis/NIR spectrometer in the wavelength range of 200-500 nm. A baseline correction was performed using THF. After transfer and stabilization in water, the absorbance of the dispersions of hBN nanosheets in water were recorded in 10 mm optical path quartz cuvette using a LAMBDA950 UV/vis/NIR spectrometer in the wavelength range of 190-400 nm. A baseline correction was performed using water.

The electrophoretic mobility of the dispersions of hBN nanosheets in water was measured using a Zetasizer Nano ZS (Malvern Instruments). An electric field of was applied and the hBN nanosheets mobility was measured by direct particle tracking.

Raman measurements of the hBN deposits on $Si/SiO_2$ substrates were performed using a Horiba LabRAM Raman spectrometer with an excitation wavelength of 523 nm and ~1 μm diameter laser spot. The peak positions were calibrated using the $T_{2g}$ peak of silicon (520.5 $cm^{-1}$).

Atomic force microscopy (AFM) analysis of hBN nanosheets deposited on freshly cleaved mica substrates was performed using a Bruker Icon microscope in peak force tapping mode.

High resolution (HR) transmission electron microscopy (TEM) (HRTEM) and scanning TEM/electron dispersive spectroscopy (STEM/EDS) of the sample was performed using a FEI Titan G2 60-300 microscope, operated at 80 and 200 kV with double spherical aberration correction, offering sub angstrom image resolution. A high angle annular dark-field (HAADF) detector was used for STEM image acquisition and EDS data collection.

Electrochemical Characterization.

The Pt/hBN heterostructure materials were tested as catalyst for the hydrogen evolution reaction (HER). The working electrodes were prepared by coating catalyst inks on the surface of glassy carbon electrode. To prepare the catalyst ink, 25 mg of the Pt/hBN heterostructure powder was mixed with 5 mg carbon and 100 μL Nafion, 200 μL DI water, and 800 μL isopropanol. The mixture was then sonicated for 1 h to form a slurry. Then 5 μL slurry was drop-casted on the glassy carbon electrode (3 mm diameter). Thus, the average loading catalyst and support was 1.61 mg $cm^{-2}$. The electrolyte used for HER measurement is purged 0.5 M $H_2SO_4$ with a graphite rod as the counter electrode and Ag/AgCl (3.5 M NaCl) as the reference electrode using a Versa STAT 4 potentiostat with a rotating electrode system (BASI RDE-2). The scan rate of linear sweep voltammetry (LSV) was 5 mV $s^{-1}$ with iR-compensation, and the working electrode was rotated at 3000 rpm during the LSV tests. To stabilize the electrode surface, open circuit potential (OCP) was monitored before the measurements. The LSV was measured only when the OCP was stabilized. The cycling performance was evaluated by repeating LSV 1000 cycles. The Cal which is proportional to ECSA was determined by CV at different scan rates (10 mV $s^{-1}$, 20 mV $s^1$, 30 mV $s^{-1}$, 40 mV $s^{-1}$, 50 mV $s^{-1}$, 60 mV $s^{-1}$, 70 mV $s^{-1}$, 80 mV $s^{-1}$, 90 mV $s^{-1}$, 100 mV $s^{-1}$) within the non-Faradaic region (64 mV vs RHE).

Density Functional Theory Calculations

DFT calculations employed the VASP[57,58] package, using the Perdew-Burke-Ernzerhof exchange correlation functional[58,59] and Projector Augmented Waves[60,61] with a plane wave energy cutoff of 600 eV and a 11×11×3 Γ-centered k-point mesh. The electronic energy and interatomic forces were converged to $10^{-6}$ eV and 0.01 eV/A. For the nonlocal vdW-DF method the optB86b exchange functional was used.

REFERENCES

The following references are each relied upon and incorporated herein in their entirety.

Pokropivny, V. V. et al. Boron nitride analogs of fullerenes (the fulborenes), nanotubes, and fullerites (the fulborenites). J. Solid State Chem. 154, 214-222 (2000).

Kim, J. H., Pham, T. V., Hwang, J. H., Kim, C. S. & Kim, M. J. Boron nitride nanotubes: synthesis and applications. Nano Converg. 5, (2018).

Clancy, A. J. et al. Charged Carbon Nanomaterials: Redox Chemistries of Fullerenes, Carbon Nanotubes, and Graphenes. Chem. Rev. 118, 7363-7408 (2018).

Pénicaud, A. & Drummond, C. Deconstructing graphite: Graphenide solutions. Acc. Chem. Res. 46, 129-137 (2013).

Bepete, G. et al. Surfactant-free single-layer graphene in water. Nat. Chem. 9, 347-352 (2016).

Hof, F. et al. From Food Waste to Efficient Bifunctional Nonprecious Electrocatalyst. Chem.—A Eur. J. 23, 15283-15288 (2017).

Hof, F. & Pénicaud, A. Graphenide Solutions: A Chemical Platform for Nanoparticle-Nanocarbon Composites. Chem.—A Eur. J. 24, 16246-16250 (2018).

Liu, M. et al. Nanoscale Carbon supported noble metal nanoparticles as efficient catalysts for electrochemical water. 20165-20170 (2020) doi:10.1039/d0nr05659f.

Okada, S. & Otani, M. Stability and electronic structure of potassium-intercalated hexagonal boron nitride from density functional calculations. Phys. Rev. B—Condens. Matter Mater. Phys. 81, 3-6 (2010).

Lončarič, I., Rukelj, Z., Silkin, V. M. & Despoja, V. Strong two-dimensional plasmon in Li-intercalated hexagonal boron-nitride film with low damping. npj 2D Mater. Appl. 2, (2018).

Li, Y.; Lu, Y., Adelhelm, P., Titirici, M. M. & Hu, Y. S. Intercalation chemistry of graphite: Alkali metal ions and beyond. Chem. Soc. Rev. 48, 4655-4687 (2019).

Catellani, A., Posternak, M., Baldereschi, A. & Freeman, A. J. Bulk and surface electronic structure of hexagonal boron nitride. Phys. Rev. B 36, 6105-6111 (1987).

Shimada, N. H., Minamitani, E. & Watanabe, S. Theoretical prediction of phonon-mediated superconductivity with Tc≈25K in Li-intercalated hexagonal boron nitride bilayer. Appl. Phys. Express 10, (2017).

Sumiyoshi, A., Hyodo, H. & Kimura, K. Li-intercalation into hexagonal boron nitride. J. Phys. Chem. Solids (2010) doi:10.1016/jjpcs.2009.12.038.

Doll, G. L. et al. Intercalation of hexagonal boron nitride with potassium. J. Appl. Phys. (1989) doi:10.1063/1.344219.

Kovtyukhova, N. I. et al. Reversible intercalation of hexagonal boron nitride with Brønsted acids. J. Am. Chem. Soc. (2013) doi:10.1021/ja403197h.

Griffin, A. et al. Spectroscopic Size and Thickness Metrics for Liquid-Exfoliated h-BN. Chem. Mater. 30, 1998-2005 (2018).

Lin, Y. et al. Aqueous dispersions of few-layered and monolayered hexagonal boron nitride nanosheets from sonication-assisted hydrolysis: Critical role of water. J. Phys. Chem. C 115, 2679-2685 (2011).

Kahn, E. et al. Functional hetero-interfaces in atomically thin materials. Mater. Today 37, 74-92 (2020).

Eda, G. et al. Photoluminescence from Chemically Exfoliated MoS 2. 5111-5116 (2011) doi:10.1021/nl201874w.

Cullen, P. L. et al. Ionic solutions of two-dimensional materials. Nat. Chem. (2016) doi:10.1038/nchem.2650.

Bepete, G. et al. Surfactant-free single-layer graphene in water. Nat. Chem. 9, (2017).

Homojunction, D. Solution Processing for Lateral Transitional Metal Dichalcogenides Homojunction from Polymorphic Crystal. (2018) doi:10.1021/jacs.8b11656.

Cullen, P. L. et al. Ionic solutions of two-dimensional materials. Nat. Chem. 9, 244-249 (2017).

Kumar, A. & Xu, Q. Two-Dimensional Layered Materials as Catalyst Supports. ChemNanoMat 4, 28-40 (2018).

Valero-Romero, M. J., Rodriguez-Cano, M. Á., Palomo, J., Rodriguez-Mirasol, J. & Cordero, T. Carbon-Based Materials as Catalyst Supports for Fischer-Tropsch Synthesis: A Review. Front. Mater. 7, 1-27 (2021).

Chia, X. & Pumera, M. Characteristics and performance of two-dimensional materials for electrocatalysis. Nat. Catal. 1, 909-921 (2018).

Yoo, E. J. et al. Enhanced electrocatalytic activity of Pt subnanoclusters on graphene nanosheet surface. Nano Lett. 9, 2255-2259 (2009).

Zhang, C. et al. Catalytic mechanism of graphene-nickel interface dipole layer for binder free electrochemical sensor applications. Commun. Chem. 1, (2018).

Huang, X., Qi, X., Boey, F. & Zhang, H. Graphene-based composites. Chem. Soc. Rev. 41, 666-686 (2012).

Deng, D. et al. Catalysis with two-dimensional materials and their heterostructures. Nat. Nanotechnol. 11, 218-230 (2016).

Hof, F. et al. Size Control of Nanographene Supported Iron Oxide Nanoparticles Enhances Their Electrocatalytic Performance for the Oxygen Reduction and Oxygen Evolution Reactions. J. Phys. Chem. C (2019) doi:10.1021/acs.jpcc.9b05843.

Maass, S., Finsterwalder, F., Frank, G., Hartmann, R. & Merten, C. Carbon support oxidation in PEM fuel cell cathodes. 176, 444-451 (2008).

Uosaki, K. et al. Boron nitride nanosheet on gold as an electrocatalyst for oxygen reduction reaction: Theoretical suggestion and experimental proof. J. Am. Chem. Soc. 136, 6542-6545 (2014).

3Liu, Z. et al. Ultrathin higherature oxidation-resistant coatings of hexagonal boron nitride. Nat. Commun. 4, 1-8 (2013).

3Chen, Y. et al. Hexagonal Boron Nitride as a Multifunctional Support for Engineering Efficient Electrocatalysts toward the Oxygen Reduction Reaction. Nano Lett. 20, 6807-6814 (2020).

Wang, D. & Su, D. Environmental Science Heterogeneous nanocarbon materials for oxygen. 576-591 (2014) doi:10.1039/c3ee43463j.

Zhang, Q. et al. Tuning Band Gap and Work Function Modulations in Monolayer hBN/Cu(111) Heterostructures with Moiré Patterns †. (2018) doi:10.1021/acsnano.8b04444.

Falin, A. et al. nitride and the role of interlayer interactions. Nat. Commun. 8, 1-9 (2017).

Lei, Y. et al. Low temperature activation of inert hexagonal boron nitride for metal deposition and single atom catalysis. Mater. 1-9 (2021).

Catalysis, O. F. Preparation, Structure, and Use of Platinum-Graphite Hydrogenation Reactions in. 506, 502-506 (1989).

Fcjrstner, A., Hofer, F. & Weidmann, H. COMPARATIVE INVESTIGATION OF THE MORPHOLOGY OF NICKEL- AND. 29, 915-919 (1991).

Shi, Y. et al. Synthesis of few-layer hexagonal boron nitride thin film by chemical Vapor deposition. Nano Lett. 10, 4134-4139 (2010).

Chilkoor, G. et al. Hexagonal Boron Nitride: The Thinnest Insulating Barrier to Microbial Corrosion. ACS Nano 12, 2242-2252 (2018).

Hannay, N. B. et al. Superconductivity in graphitic compounds. Phys. Rev. Lett. 14, 225-226 (1965).

Dresselhaus, M. S. & Dresselhaus, G. Intercalation compounds of graphite. Adv. Phys. 51, 1-186 (2002).

Szewczyk, K. A., Domagalska, I. A., Durajski, A. P. & Szczesniak, R. Nonadiabatic superconductivity in a Li-intercalated hexagonal boron nitride bilayer. Beilstein J. Nanotechnol. 11, 1178-1189 (2020).

Stark, M. S., Kuntz, K. L., Martens, S. J. & Warren, S. C. Intercalation of Layered Materials from Bulk to 2D. Advanced Materials 31, (2019).

Dresselhaus, M. S. & Dresselhaus, G. Intercalation compounds of graphite. Adv Phys 51, 1-186 (2002).

Clancy, A. J. et al. Charged Carbon Nanomaterials: Redox Chemistries of Fullerenes, Carbon Nanotubes, and Graphenes. Chem Rev 118, 7363-7408 (2018).

Etacheri, V., Marom, R., Elazari, R., Salitra, G. & Aurbach, D. Challenges in the development of advanced Li-ion batteries: a review. Energy Environ Sci 4, 3243 (2011).

Smith, R. P. et al. Superconductivity in graphite intercalation compounds. Physica C: Superconductivity and its Applications 514, 50-58 (2015).

Pénicaud, A. & Drummond, C. Deconstructing graphite: Graphenide solutions. Acc Chem Res 46, 129-137 (2013).

Catheline, A. et al. Solutions of fully exfoliated individual graphene flakes in low boiling point solvents. Soft Matter 8, 7882 (2012).

Bepete, G. et al. Surfactant-free single-layer graphene in water. Nat Chem 9, (2017).

Bepete, G., Pénicaud, A., Drummond, C. & Anglaret, E. Raman Signatures of Single Layer Graphene Dispersed in Degassed Water, "Eau de Graphene". The Journal of Physical Chemistry C 120, 28204-28214 (2016).

Englert, J. M. et al. Covalent bulk functionalization of graphene. Nat Chem 3, 279-286 (2011).

Hof, F. & Pénicaud, A. Graphenide Solutions: A Chemical Platform for Nanoparticle-Nanocarbon Composites. Chemistry—A European Journal 24, 16246-16250 (2018).

Georgakilas, V. et al. Functionalization of Graphene: Covalent and Non-Covalent Approaches, Derivatives and Applications. Chem Rev 112, 6156-6214 (2012).

Bin Subhan, M. K. et al. Charge Density Waves in Electron-Doped Molybdenum Disulfide. Nano Lett 21, 5516-5521 (2021).

Ahamd, H. M. R. & Zhou, J. Intercalation induced ferromagnetism in group-V transition metal dichalcogenide bilayer. AIP Adv 10, (2020).

Voiry, D., Mohite, A. & Chhowalla, M. Phase engineering of transition metal dichalcogenides. Chem Soc Rev 44, 2702-2712 (2015).

Zhang, R. et al. Superconductivity in Potassium-Doped Metallic Polymorphs of MoS2. Nano Lett 16, 629-636 (2016).

Zhang, R., Waters, J., Geim, A. K. & Grigorieva, I. V. Intercalant-independent transition temperature in superconducting black phosphorus. Nat Commun 8, (2017).

Cullen, P. L. et al. Ionic solutions of two-dimensional materials. Nat Chem 9, 244-249 (2017).

Abellán, G. et al. Exploring the Formation of Black Phosphorus Intercalation Compounds with Alkali Metals. Angewandte Chemie 129, 15469-15475 (2017).

Wild, S. et al. Quantifying the Covalent Functionalization of Black Phosphorus. Angewandte Chemie—International Edition 59, 20230-20234 (2020).

Watts, M. C. et al. Production of phosphorene nanoribbons. Nature 568, 216-220 (2019).

Acerce, M., Voiry, D. & Chhowalla, M. Metallic 1T phase MoS2 nanosheets as supercapacitor electrode materials. Nat Nanotechnol 10, 313-8 (2015).

Lin, Z. et al. Solution-processable 2D semiconductors for high-performance large-area electronics. Nature 562, 254-258 (2018).

Li, J. et al. Printable two-dimensional superconducting monolayers. Nat Mater 20, 181-187 (2021).

Cassabois, G., Valvin, P. & Gil, B. Hexagonal boron nitride is an indirect bandgap semiconductor. Nat Photonics 10, 262-266 (2016).

Dai, B. Q. & Zhang, G. L. A DFT study of hBN compared with graphite in forming alkali metal intercalation compounds. Mater Chem Phys 78, 304-307 (2003).

Shen, C. et al. Intercalation of Hexagonal Boron Nitride by Strong Oxidizers and Evidence for the Metallic Nature of the Products. J Solid State Chem 147, 74-81 (1999).

Sumiyoshi, A., Hyodo, H. & Kimura, K. Li-intercalation into hexagonal boron nitride. Journal of Physics and Chemistry of Solids 71, 569-571 (2010).

Okada, S. & Otani, M. Stability and electronic structure of potassium-intercalated hexagonal boron nitride from density functional calculations. Phys Rev B Condens Matter Mater Phys 81, (2010).

Oba, F., Togo, A., Tanaka, I., Watanabe, K. & Taniguchi, T. Doping of hexagonal boron nitride via intercalation: A theoretical prediction. Phys Rev B Condens Matter Mater Phys 81, 20-23 (2010).

Shimada, N. H., Minamitani, E. & Watanabe, S. Theoretical prediction of phonon-mediated superconductivity with Tc≈25K in Li-intercalated hexagonal boron nitride bilayer. Applied Physics Express 10, (2017).

Shimada, N. H., Minamitani, E. & Watanabe, S. Theoretical prediction of phonon-mediated superconductivity with Tc≈25K in Li-intercalated hexagonal boron nitride bilayer. Applied Physis Express 10, (2017).

Sakamoto, M., Speck, J. S. & Dresselhaus, M. S. Cesium and bromine doping into hexagonal boron nitride. J Mater Res 1, 685-692 (1986).

Doll, G. L. et al. Intercalation of hexagonal boron nitride with potassium. J Appl Phys 66, 2554-2558 (1989).

Kim, J., Yamasue, E., Okumura, H., Ishihara, K. N. & Michioka, C. Structures of boron nitride intercalation compound with lithium synthesized by mechanical milling and heat treatment. J Alloys Compd 685, 135-141 (2016).

Sumiyoshi, A., Hyodo, H. & Kimura, K. Li-intercalation into hexagonal boron nitride. Journal of Physics and Chemistry of Solids 71, 569-571 (2010).

Matović, B. et al. Synthesis and characterization of nanocrystalline hexagonal boron nitride powders: XRD and luminescence properties. Ceram Int 42, 16655-16658 (2016).

Paine, R. T. & Narula, C. K. Synthetic routes to boron nitride. Chem Rev 90, 73-91 (1990).

Kovtyukhova, N. I. et al. Reversible Intercalation of Hexagonal Boron Nitride with Brønsted Acids. J Am Chem Soc 135, 8372-8381 (2013).

Ma, K. Y. et al. Epitaxial single-crystal hexagonal boron nitride multilayers on Ni (111). Nature 606, 88-93 (2022).

Bučko, T., Lebègue, S., Hafner, J. & Ángyán, J. G. Tkatchenko-Scheffler van der Waals correction method with and without self-consistent screening applied to solids. Phys Rev B Condens Matter Mater Phys 87, (2013).

Zimmermann, R., Freudenberg, U., Schweiß, R., Kiittner, D. & Werner, C. Hydroxide and hydronium ion adsorption—A survey. Curr Opin Colloid Interface Sci 15, 196-202 (2010).

Bepete, G. et al. "Eau de graphene" from a KC$_8$ graphite intercalation compound prepared by a simple mixing of graphite and molten potassium. Physica Status Solidi—Rapid Research Letters 10, (2016).

Bepete, G. et al. Hydroxide ions stabilize open carbon nanotubes in degassed water. ACS Nano 12, 8606-8615 (2018).

João, J. P., Hof, F., Chauvet, O., Zarbin, A. J. G. & Pénicaud, A. The role of functionalization on the colloidal stability of aqueous fullerene C60 dispersions prepared with fulerides. Carbon N Y 173, 1041-1047 (2021).

Ma, K. Y. et al. Epitaxial single-crystal hexagonal boron nitride multilayers on Ni (111). Nature 606, 88-93 (2022).

Shi, Y. et al. Synthesis of few-layer hexagonal boron nitride thin film by chemical vapor deposition. Nano Lett 10, 4134-4139 (2010).

Tran, T. T., Bray, K., Ford, M. J., Toth, M. & Aharonovich, I. Quantum emission from hexagonal boron nitride monolayers. Nat Nanotechnol 11, 37-41 (2016).

Lin, Y. et al. Aqueous dispersions of few-layered and monolayered hexagonal boron nitride nanosheets from sonication-assisted hydrolysis: Critical role of water. Journal of Physical Chemistry C 115, 2679-2685 (2011).

Griffin, A. et al. Spectroscopic Size and Thickness Metrics for Liquid-Exfoliated h-BN. Chemistry of Materials 30, 1998-2005 (2018).

Gao, Y. et al. Repeated and controlled growth of monolayer, bilayer and few-layer hexagonal boron nitride on Pt foils. ACS Nano 7, 5199-5206 (2013).

Warner, J. H., Rümmeli, M. H., Bachmatiuk, A. & Büchner, B. Atomic resolution imaging and topography of boron nitride sheets produced by chemical exfoliation. ACS Nano 4, 1299-1304 (2010).

Krivanek, O. L. et al. Atom-by-atom structural and chemical analysis by annular darkfield electron microscopy. Nature 464, 571-574 (2010).

Lei, Y. et al. Low temperature activation of inert hexagonal boron nitride for metal deposition and single atom catalysis. Materials Today 51, 108-116 (2021).

Lin, Y.-C. et al. Recent Advances in 2D Material Theory, Synthesis, Properties, and Applications. ACS Nano 17, 9694-9747 (2023).

Yin, Y. et al. Two-dimensional nanomaterials confined single atoms: New opportunities for environmental remediation. Nano Materials Science 5, 15-38 (2023).

Kresse, G. & Furthmüller, J. Efficiency of ab-initio total energy calculations for metals and semiconductors using a plane-wave basis set. Comput Mater Sci 6, 15-50 (1996).

Kresse, G. & Furthmüller, J. Efficient iterative schemes for ab initio total-energy calculations using a plane-wave basis set. Phys Rev B 54, 11169-11186 (1996).

Perdew, J. P., Burke, K. & Ernzerhof, M. ERRATA Generalized Gradient Approximation Made Simple [Phys. Rev. Lett. 77, 3865 (1996)]. (1997).

Kresse, G. & Joubert, D. From ultrasoft pseudopotentials to the projector augmented-wave method. Phys Rev B 59, 1758-1775 (1999).

Blöchl, P. E. Projector augmented-wave method. Phys Rev B 50, 17953-17979 (1994).

Klime, J., Bowler, D. R. & Michaelides, A. Van der Waals density functionals applied to solids. Phys Rev B Condens Matter Mater Phys 83, (2011).

What is claimed is:

1. A method for preparing a dispersion of exfoliated reduced/negatively charged 2-dimensional hexagonal boron nitride (hBN) sheet in a polar aprotic organic solvent, the method comprising performing the following steps within an inert environment:

(i) providing an alkali metal-intercalated hBN, the alkali metal-intercalated hBN comprising hBN with an alkali metal intercalated between the hBN layers, wherein the alkali metal is potassium;

(ii) adding an organic polar aprotic solvent (A) or a mixture (A') of polar aprotic solvents under anhydrous inert atmosphere to the alkali metal-intercalated hBN; and (iii) agitating the mixture formed by (i) and (ii) until a dispersion of reduced/negatively charged exfoliated 2-dimensional hBN sheet is formed.

2. The method of claim 1, wherein agitation occurs for an amount of time.

3. The method of claim 1, wherein agitation occurs longer than 0 minutes.

4. The method of claim 1, wherein the organic aprotic solvent is tetrahydrofuran (THF).

5. The method of claim 1, wherein agitation involves mechanical stirring, magnetic stirring, and/or agitation without stirring.

6. The method according to claim 1, further comprising centrifugation.

7. The method according to claim 1, wherein step (iii) is performed in the absence of sonication.

8. The method of claim 1, wherein the organic aprotic solvent (A) has a dielectric constant between 25 and 200.

9. The method of claim 1, further comprising:
depositing the dispersion on a substrate.

10. The method of claim 1, further comprising:
depositing the dispersion on a substrate via stamping, spin coating, printing, spray coating, or electroplating to form a film, a membrane, or a coating.

* * * * *